(12) United States Patent
Low

(10) Patent No.: US 12,446,811 B2
(45) Date of Patent: Oct. 21, 2025

(54) BIOSIGNAL INTEGRATION WITH VEHICLES AND MOVEMENT

(71) Applicant: NEUROVIGIL, INC., Moffett Field, CA (US)

(72) Inventor: Philip Low, Hillsborough, CA (US)

(73) Assignee: Neurovigil, Inc., Moffett Field, CA (US)

(*) Notice: Subject to any disclaimer, the term of this patent is extended or adjusted under 35 U.S.C. 154(b) by 0 days.

(21) Appl. No.: 18/828,811

(22) Filed: Sep. 9, 2024

(65) Prior Publication Data

US 2025/0083680 A1    Mar. 13, 2025

Related U.S. Application Data

(63) Continuation of application No. PCT/US2024/045698, filed on Sep. 6, 2024.
(Continued)

(51) Int. Cl.
*B60W 60/00* (2020.01)
*A61B 5/00* (2006.01)
(Continued)

(52) U.S. Cl.
CPC .............. *A61B 5/18* (2013.01); *A61B 5/1103* (2013.01); *A61B 5/257* (2021.01); *A61B 5/4809* (2013.01);
(Continued)

(58) Field of Classification Search
CPC .............. B60W 40/08; B60W 60/0016; B60W 50/0097; B60W 2556/10; B60W 2556/45;
(Continued)

(56) References Cited

U.S. PATENT DOCUMENTS

| 8,007,044 B1 * | 8/2011 | Dubey | A47C 7/383 |
| | | | 297/392 |
| 2013/0009761 A1 * | 1/2013 | Horseman | A61B 5/6893 |
| | | | 340/576 |

(Continued)

OTHER PUBLICATIONS

Non-Final Office Action for U.S. Appl. No. 18/828,818, dated Mar. 18, 2025.
(Continued)

*Primary Examiner* — Hoi C Lau
(74) *Attorney, Agent, or Firm* — Mughal Gaudry & Franklin PC

(57) ABSTRACT

The present disclosure relates to methods and system for acquiring and analyzing biosignals or physiological signals of a person sitting in a vehicle and predicting (in real-time) time-varying attention, engagement level or alertness level using the biosignals. The biosignals may be acquired using one or more clusters of electrodes together with a wearable user device or from a sensing device that is embedded in the seat of the vehicle. In some embodiments, the biosignals may be utilized to predict restedness level of the subject, to monitor or predict physiological state of the subject, to detect a distress situation and to adapt a vehicle control accordingly. In some other embodiments, the biosignals can be transformed into communication, for example, speech signals or instructions for the vehicle. One or more actions may be triggered based on the analysis of the biosignals including engaging the person, generating alerts, or adapting the vehicle control.

28 Claims, 21 Drawing Sheets
(3 of 21 Drawing Sheet(s) Filed in Color)

Related U.S. Application Data

(60) Provisional application No. 63/581,367, filed on Sep. 8, 2023, provisional application No. 63/581,244, filed on Sep. 7, 2023.

(51) Int. Cl.

| | | |
|---|---|---|
| *A61B 5/11* | (2006.01) | |
| *A61B 5/18* | (2006.01) | |
| *A61B 5/257* | (2021.01) | |
| *B60N 2/00* | (2006.01) | |
| *B60N 2/02* | (2006.01) | |
| *B60N 2/806* | (2018.01) | |
| *B60Q 9/00* | (2006.01) | |
| *B60W 40/08* | (2012.01) | |
| *B60W 50/00* | (2006.01) | |
| *G06F 3/14* | (2006.01) | |
| *G06V 20/59* | (2022.01) | |
| *G10L 15/22* | (2006.01) | |
| *H04N 7/18* | (2006.01) | |
| *H04W 4/40* | (2018.01) | |
| *H04W 4/80* | (2018.01) | |
| *B60H 1/00* | (2006.01) | |

(52) U.S. Cl.
CPC .......... *A61B 5/6893* (2013.01); *B60N 2/0022* (2023.08); *B60N 2/0252* (2013.01); *B60N 2/026* (2023.08); *B60N 2/0276* (2013.01); *B60N 2/806* (2018.02); *B60Q 9/00* (2013.01); *B60W 40/08* (2013.01); *B60W 50/0097* (2013.01); *B60W 60/0016* (2020.02); *B60W 60/0051* (2020.02); *G06F 3/14* (2013.01); *G06V 20/597* (2022.01); *G10L 15/22* (2013.01); *H04N 7/183* (2013.01); *H04W 4/40* (2018.02); *H04W 4/80* (2018.02); *B60H 1/00742* (2013.01); *B60W 2040/0872* (2013.01); *B60W 2540/221* (2020.02); *B60W 2540/225* (2020.02); *B60W 2540/229* (2020.02); *B60W 2556/10* (2020.02); *B60W 2556/45* (2020.02); *G10L 2015/223* (2013.01)

(58) Field of Classification Search
CPC ..... B60W 2540/225; B60W 2540/221; H04W 4/80
See application file for complete search history.

(56) References Cited

U.S. PATENT DOCUMENTS

| | | | |
|---|---|---|---|
| 2013/0304326 A1* | 11/2013 | Van Dongen | B60W 30/146 |
| | | | 701/1 |
| 2016/0151021 A1 | 6/2016 | Feng et al. | |
| 2017/0197529 A1* | 7/2017 | Hontz | B60N 2/885 |
| 2017/0267138 A1* | 9/2017 | Subat | B60N 2/806 |
| 2017/0347968 A1* | 12/2017 | Maile | A61B 5/7264 |
| 2017/0355377 A1* | 12/2017 | Vijaya Kumar | B60W 50/0098 |
| 2018/0164825 A1* | 6/2018 | Matus | B60W 50/0098 |
| 2018/0257682 A1* | 9/2018 | Brooks | B61L 27/14 |
| 2018/0300964 A1* | 10/2018 | Lakshamanan | G06F 9/5027 |
| 2019/0298273 A1* | 10/2019 | Strupp | G06F 3/015 |
| 2019/0308555 A1 | 10/2019 | Martin et al. | |
| 2020/0148076 A1* | 5/2020 | Main | B60N 2/0273 |
| 2020/0241525 A1* | 7/2020 | Harbour | G05D 1/0088 |
| 2020/0315512 A1* | 10/2020 | Komine | A61B 5/18 |
| 2020/0331463 A1* | 10/2020 | Diamond | B60W 30/085 |
| 2020/0353936 A1* | 11/2020 | Salter | B60W 60/00 |
| 2021/0169417 A1* | 6/2021 | Burton | A61B 5/4857 |
| 2021/0237645 A1 | 8/2021 | Farrell et al. | |
| 2021/0290134 A1* | 9/2021 | Talamonti | A61B 5/37 |
| 2021/0403022 A1* | 12/2021 | Hong | G06F 3/015 |
| 2022/0063686 A1* | 3/2022 | Brooks | B61L 15/0018 |
| 2022/0338814 A1* | 10/2022 | Babu | A61B 5/7214 |
| 2022/0348204 A1* | 11/2022 | Wang | B60W 60/0013 |
| 2023/0182780 A1* | 6/2023 | Uelmen | A61G 3/061 |
| | | | 701/24 |
| 2023/0192115 A1 | 6/2023 | Ono et al. | |
| 2023/0219600 A1* | 7/2023 | Xiao | B60W 60/00 |
| | | | 701/26 |
| 2023/0337961 A1* | 10/2023 | Šarlija | A61B 5/4818 |
| 2024/0092311 A1* | 3/2024 | Jaradi | B60R 22/06 |
| 2024/0127384 A1* | 4/2024 | Aloqaily | G16H 50/20 |
| 2024/0130652 A1* | 4/2024 | Li | B60W 40/08 |
| 2024/0132090 A1* | 4/2024 | Nakayama | B60W 50/12 |
| 2024/0362931 A1 | 10/2024 | Katz | |
| 2024/0389953 A1 | 11/2024 | Barbe et al. | |
| 2024/0428770 A1* | 12/2024 | Kim | G06V 40/15 |
| 2025/0082240 A1* | 3/2025 | Low | B60W 50/0097 |
| 2025/0083680 A1* | 3/2025 | Low | B60N 2/0022 |

OTHER PUBLICATIONS

Non-Final Office Action for U.S. Appl. No. 18/828,818, dated Dec. 17, 2024.
International Search Report and Written Opinion for International Patent Application No. PCT/US2024/045698 dated Jan. 14, 2025.
Notice of Allowance notified Jul. 29, 2025 for U.S. Appl. No. 18/828,818.

* cited by examiner

BIOSIGNAL INTEGRATION WITH VEHICLES AND MOVEMENT

CROSS-REFERENCE TO RELATED APPLICATIONS

This application is a continuation of and claims the priority to and the benefit of International Application No. PCT/US2024/045698, filed on Sep. 6, 2024, entitled "Biosignal Integration with Vehicles and Movement", and U.S. Provisional Application No. 63/581,367, filed on Sep. 8, 2023, entitled "Biosignal Integration with Vehicles and Movement", and U.S. Provisional Application No. 63/581,244, filed on Sep. 7, 2023, entitled "Biosignal Integration with Vehicles and Movement". Each of these applications is hereby incorporated by reference in its entirety for all purposes.

BACKGROUND

Driver inattention and fatigue have been significant contributors to road accidents, often leading to fatalities. For example, drivers with untreated sleep apnea may be three times more likely to be involved in an accident. However, crash risk has been shown to decrease if sleep apnea is treated. Similarly, fifteen to twenty percent of all crashes in Europe may be due to driver fatigue. Existing solutions like seat vibrations and alarms are not usually effective, as they do not directly assess a cognitive state of the driver. Thus, demand exists for a more direct and real-time system to monitor and assess driver attentiveness and take immediate corrective action.

Moreover, disabled individuals commonly face mobility challenges, which can impact their daily lives and limit their independence. While devices like wheelchairs, walkers, or crutches provide appropriate support, they also come with limitations. For instance, navigating uneven terrain or narrow spaces can be challenging. Additionally, using mobility-aid devices may require significant physical effort, which can be exhausting. Repeatedly using mobility-aid devices or adapting to environments that are not designed for accessibility can lead to physical strain and fatigue. Challenges for disabled individuals may extend beyond physical movement difficulties, including, but not limited to, driver safety, alertness, and communication problems, especially in emergency situations like accidents. In the event of an accident, disabled individuals may face additional challenges in communicating a health condition or a distress condition. Traditional methods of communication might be less accessible. Therefore, specialized systems that automatically alert emergency services, transmit the driver's condition, and facilitate real-time communication can be life-saving. Therefore, there is a demand for an improved system to accurately monitor and/or predict the physiological state of the driver and take one or more actions accordingly, such as adapting vehicle control, generating alert signals, and the like.

SUMMARY

Some embodiments of the present disclosure relate to the use of physiological signals of a subject sitting in a vehicle to monitor or predict a physiological state of the subject and to adapt a vehicle control accordingly. A computer-implemented method includes accessing physiological data of the subject sitting in a driver seat of the vehicle. The physiological data is collected by a physiological data acquisition assembly that comprises a sensing device and one or more clusters of electrodes. The sensing device can be utilized to acquire, process and transmit signals from the one or more clusters of electrodes. Each cluster of the one or more clusters of electrodes comprises at least an active electrode. Other electrodes in each cluster may include a reference electrode, or a bias electrode.

In some embodiments, one or more components of the physiological data acquisition assembly may be embedded in the driver seat of the vehicle. The one or more components of the physiological data acquisition assembly may include the sensing device and the one or more clusters of electrodes. The sensing device may include an accelerometer and a gyroscope. In some instances, the physiological data acquisition assembly can be worn by the subject as a sensing patch. The physiological data may be comprised of one or more physiological signals, or one or more pre-processed physiological signals. The one or more physiological signals can be obtained using the one or more clusters of electrodes. Moreover, the one or more clusters of electrodes may include electroencephalogram (EEG) electrodes, electromyography (EMG) electrodes, magnetoencephalography (MEG) electrodes, or electrooculogram (EOG) electrodes.

An alertness level of the subject can be predicted in real-time based on the physiological data by using an alertness prediction model. The alertness prediction model can be a machine learning model that may be trained on a dataset that comprises the alertness level for a plurality of time intervals and corresponding physiological data of one or more subjects. Afterwards, determine whether a condition is satisfied based at least in part by comparing the alertness level with one or more alertness thresholds. The one or more alertness thresholds may be comprised of a population-based threshold or a subject-specific threshold. The population-based threshold can be lower than the subject-specific threshold. The condition can be such that whether the predicted alertness level of the subject is lower than the subject-specific threshold, and/or whether the predicted alertness level is even lower than the population-based threshold.

Based on the determination that the condition is satisfied, one or more actions can be triggered. The one or more actions may include engaging the subject, administering an assessment to the subject, or adapting the vehicle control. Adapting the vehicle control may include transitioning the vehicle to a self-driving mode or pulling over the vehicle to a side of a road. For engaging the subject, the one or more actions may further include lowering a temperature of passenger cabin of the vehicle, increasing a fan speed, increasing a cabin light, increasing an audio volume, generating a sound alarm, generating seat vibrations, and the like.

In some embodiments, the physiological data of the subject sitting in the driver seat of the vehicle was collected over a period of time by the physiological data acquisition assembly. The physiological data that was collected over the period of time may correspond to physiological signals that were collected across a 24-hour period prior to driving the vehicle, or a previous night-time period. The physiological data of the subject may be comprised of a single-channel EEG data. In some instances, the physiological data acquisition assembly is worn by the subject as the sensing patch.

A set of features based on a portion of the physiological data may be extracted for each time interval of a plurality of time intervals within the period of time. The set of features can include fragmentation and/or frequency features. A feature can be generated by processing a spectrogram or normalized spectrogram using a technique, such as a component analysis (e.g., principal component analysis or independent component analysis) The set of features may be associated with one or more frequency bands of the physiological signals corresponding to the time interval. The set of features may include one or more of Delta power, Gamma power, standard deviation, maximum amplitude, Gamma power/Delta power, time derivative of Delta, and time derivative of the Gamma power/Delta power. The set of features may further include features that are derived using component analysis (e.g., principal component analysis PCA, independent component analysis ICA) from a spectrogram or a normalized spectrogram of the one or more frequency bands of the physiological signals for the time interval.

Further, a state can be predicted for each of the set of features corresponding to each time interval. In some instances, a sleep classification model may be used to predict the state. The sleep classification model may include supervised machine learning techniques such as decision trees, support vector machine (SVM), random forest, or neural networks that are trained on labeled sleep data. In some other instances, clustering techniques, for example, k-means clustering, hierarchical clustering or Gaussian mixture model (GMM) can be utilized to predict the state for each time interval. The state may correspond to any of one or more sleep stages or an awake state. The one or more sleep stages may include a rapid eye movement (REM) stage and one or more non-REM stages. According to disclosed technique, a sleep pattern, a relative frequency of a particular state, or a duration of the particular state of the one or more sleep stages or the awake state can be determined based on the prediction of the state corresponding to each time interval.

Furthermore, a restedness level of the subject may be predicted based on the sleep pattern, the relative frequency of the particular state, or the duration of the particular state of the one or more sleep stages or the awake state by using a restedness prediction model. Based on the restedness level, the one or more actions can be triggered to adapt the vehicle control. The one or more actions may include control whether to allow the vehicle to move or not. The one or more actions further include transitioning the vehicle to the self-driving mode, pulling over the vehicle to the side of the road, or setting a limit on a speed of the vehicle according to the restedness level. In some instances, if the autonomous mode is not fully independent of the subject (or human driver) and the subject is not rested (e.g., low restedness level), not paying attention, or is otherwise impaired, then the vehicle may automatically pull over and remain on the side of the road until the driver (or the subject) has regained capacity.

In some embodiments, the one or more physiological signals of the subject sitting in a mobility-aid device, a pod, or the vehicle may be accessed in real-time. The pod may be configured to transport the subject, or to transport the subject inside the vehicle with the mobility-aid device. Similarly, the vehicle can be configured to receive, engage, and secure the mobility-aid device or the pod substantially close to a driver position. Moreover, the vehicle, the pod, and the mobility-aid device may be in communication with each other and with a user device via a short-range connection. The vehicle may include one or more latching elements configured to secure a connection with the pod or the mobility-aid device in response to executing a latching instruction.

A set of features may be computed by using the one or more physiological signals for a given time interval. The given time interval corresponds to a scanning window that is used to segment the one or more physiological signals. For each segment or the given time interval, the one or more physiological signals can be transformed from a time domain to a frequency domain. The set of features is associated with one or more frequency bands of the one or more physiological signals for the given time interval. The set of features may include one or more of Delta power, Gamma power, standard deviation, maximum amplitude, Gamma power/Delta power, time derivative of Delta, and time derivative of the Gamma power/Delta power. The set of features may further include features that are derived using component analysis (e.g., PCA, ICA) from a spectrogram or a normalized spectrogram of the one or more frequency bands of the physiological signals for the time interval.

A biometric pattern may be determined in real-time based on the set of features or based on the one or more physiological signals for the given time interval. In some instances, the biometric pattern may be comprised of neural signatures corresponding to each of intended movements of the vehicle, the pod, or the mobility-aid device. The biometric pattern may be further comprised of neural signatures corresponding to intended movements of a left hand, a right hand, a left foot, or a right foot. In some other instances, the biometric pattern may be comprised of ocular signatures corresponding to eye movements or blinks including a left eye blink, a right eye blink, or a double blink. In some other instances, the biometric pattern may be comprised of muscular signatures including an upper jaw movement, or a lower jaw movement, and the like. In some instances, blinks can be spontaneous and can be used to assess or predict impairment, for example, based on a blink count or a blink frequency and can be detected using the components of the physiological data acquisition assembly such as capacitively coupled electrodes.

One or more instructions may be generated based on the biometric pattern to control one or more of the pod, the mobility-aid device, or the vehicle. The one or more instructions may include a driving instruction, a movement instruction, or the latching instruction. In some instances, the one or more instructions can be generated by selecting one or more predefined instructions from a list or a table according to the biometric pattern. The one or more instructions may be executed to control behavior of the pod, the mobility-aid device, or the vehicle by controlling one or more motors or actuators.

In some other embodiments, a communication-tree or at least a partial communication-tree may be displayed to the subject sitting in the vehicle. The communication-tree or the partial communication-tree comprises a plurality of nodes. Each node of the plurality of nodes may represent a letter, a word, a phrase, a sentence, or a command. The communication-tree or the partial communication-tree can be displayed on a windshield of the vehicle, a console of the vehicle, an augmented reality/virtual reality (AR/VR) headset, a vehicle display device, or the user device such as cell phone, smartwatch. The vehicle display device may include touch screens that are embedded or attached to the seat of the vehicle.

In some instances, an indication of a crash event or a distress situation may be assessed. Based on the indication, one or more alert signals may be generated automatically. The one or more alert signals may be transmitted to emergency services or caregivers if the subject did not interrupt or cancel the one or more alert signals within a specific time period. Moreover, a speech facilitation tool may be activated that can initialize the communication-tree or the partial communication-tree for the subject sitting in the vehicle. Moreover, the communication-tree or the partial communication-tree can be configured to include a path or a leaf node that corresponds to a request to contact emergency services in response to the indication of the crash event or the distress situation.

One or more cues can be generated to instruct the subject how to navigate through the communication-tree or the partial communication-tree. The one or more cues may include an audio cue, or a visual cue. Afterwards, sensor data associated with the subject may be accessed for a given time interval. The sensor data may be comprised of the one or more physiological signals or signals from a camera. The biometric pattern may be determined in real-time based on the sensor data for the given time interval. The biometric pattern may be comprised of the neural signatures, the ocular signatures, or the muscular signatures corresponding to intended movements (e.g., of limbs, eyes, jaws etc.).

Further, a node of the plurality of nodes can be selected based on the biometric pattern to navigate through the communication-tree or the partial communication-tree. The selected node may result in generation of the word, the sentence, a message, a set of sentences, the command, or a set of commands. The command may include a delete command, the send command, a text to speech conversion command, or a language change command for the communication-tree or the partial communication-tree. In some instances, the communication-tree or the partial communication-tree may be updated at run-time based on the selected node.

Afterwards, the disclosed technique may determine whether the selected node is a leaf node or whether the selected node corresponds to a send command. Based on the determination that the selected node is the leaf node or representing the send command, outputting a communication using a computing system of the vehicle or a user device of the subject. The communication corresponds to the selected node (e.g., the leaf node or the send command node) and previously selected nodes (e.g., nodes that are selected from the top or root of the communication tree until the selected node or current node). The communication comprises one or more of alert signals, vehicle-control signals, speech signals, the message, or the command. The vehicle-control signals may include transitioning the vehicle to a self-driving mode or pulling over the vehicle to the side of the road.

According to some embodiments, one or more physiological signals of the subject sitting in the vehicle may be accessed. The one or more physiological signals are collected by a physiological data acquisition assembly that comprises the sensing device and one or more clusters of electrodes. The physiological data acquisition assembly can be worn by the subject as the sensing patch. In some instances, one or more components of the physiological data acquisition assembly can be embedded in the seat of the vehicle, for example, in the headrest of the vehicle. The one or more components of the physiological data acquisition assembly include the sensing device and the one or more clusters of electrodes.

The set of features can be computed by using the one or more physiological signals for the given time interval.

One or more health metrics may be predicted by using the set of features with one or more machine learning models. The one or more health metrics may correspond to measures indicating a health status of the subject. One or more health metrics may include a stress level, a cognitive impairment, a sleep disorder, or a neurodegenerative abnormality. The cognitive impairment may include but not limited to road rage.

Furthermore, an extent to which each of the one or more health metrics are deviated from a corresponding baseline value may be determined. The baseline value (or the corresponding baseline value) may represent a population-based average (or normal range) of a health metric of the one or more health metrics. Based on the determination one or more actions can be triggered. The one or more actions may include outputting the one or more health metrics, generating an alert signal to the subject or a caregiver, or adapting the vehicle control.

In some other embodiments, one or more physiological signals of the subject sitting in a seat of the vehicle may be accessed. The set of features can be computed by using the one or more physiological signals for the given time interval. The set of features may be comprised of values that are derived from the one or more frequency bands of the one or more physiological signals. According to disclosed technique, at least an anomaly in the one or more physiological signals or the set of features may be detected by using an anomaly detection technique. Anomaly detection techniques may include but are not limited to statistical methods (e.g., Z-score, Grubbs test), machine learning techniques such as supervised learning (e.g., SVM, NNs), unsupervised learning (e.g., clustering), deep learning techniques (e.g., convolutional neural networks CNNs, recurrent neural networks RNNs, autoencoders), or time-series based analysis such as moving average, auto-regressive models.

Further, a distress situation may be detected based at least in part by comparing a degree of the anomaly with a predefined threshold. The predefined threshold can be set using multiple variables corresponding to the set of features or the one or more physiological signals. In case the anomaly detection technique may detect n-dimensional anomaly (e.g., n individual anomalies in the set of features), then the predefined threshold may represent a n−1 dimensional plane in a n-dimensional space. The distress situation may correspond to a health incident or a crash event. The health incident may include a stroke, an epileptic seizure, or a heart attack. In addition, based on the degree of the anomaly, one or more configurations of a passenger cabin can be adapted. The one or more configurations may include adjusting a firmness of the seat of the vehicle and adjusting an angle of the seat of the vehicle.

In some instances, the distress situation may further be detected by accessing sensor data of the vehicle or the user device in real-time and detecting the crash event based on the sensor data of the vehicle or the user device. The sensor data may comprise data collected by an accelerometer or a gyroscope. One or more audio or visual cues may be generated for the subject. The physiological data can be collected for a specific time period after the one or more audio or visual cues are executed. An extent to which the physiological data is deviated from baseline physiological data may be determined. The baseline physiological data may represent average or normalized values of the physiological data that was collected from the subject or from a plurality of subjects in response to the one or more audio or visual cues.

One or more actions may be triggered based on the detection of the distress situation. The one or more actions may include activating a speech facilitation tool for the subject, transmitting a alert signal to emergency services, or adapting the vehicle control. The alert signal that is sent to the emergency services includes data indicating an inference of the crash event, an identifier of the subject, an emergency contact, health information, and the like. Adapting the vehicle control may include transitioning the vehicle to the self-driving mode or pulling over the vehicle to the side of the road.

According to some aspects of the present disclosure, the physiological data acquisition assembly may be configured to transmit the one or more physiological signals of the subject sitting in the vehicle to a computing system. One or more components of the physiological data acquisition assembly can be embedded in a seat of the vehicle. The seat of the vehicle can also help in determining a body position and a head position of the subject. The seat may measure a tone for each of multiple muscles of the subject. The one or more components of the physiological data acquisition assembly include the sensing device and the one or more clusters of electrodes. The physiological data acquisition assembly may further include capacitively coupled electrodes or non-contact electrodes that are configured to measure EEG signals and to detect blinks or microsleep of the subject based on the EEG signals. The seat may include one or more sensors to collect data to generate an EMG signal. Blinks may be detected based on EOG signals.

The seat of the vehicle may include a headrest. Moreover, the headrest may include a curved portion that extends from a supporting portion positioned behind the subject head when the subject is seated and extends towards a forehead or ear of the subject. In some instances, the curved portion may be adjustable, for example, in curvature, or length.

A vehicle computing system may include a transceiver that can be communicatively connected to the physiological data acquisition assembly, or the user device. Further, the computing system may include the user device, the vehicle computing system, a pod computing system, a mobility-aid device computing system, or a cloud computing system. The vehicle computing system, the pod computing system, and the mobility-aid device computing system can be communicatively connected with each other and with the user device via a short-range connection.

Furthermore, a vehicle controller may be comprised of one or more processors and control circuits. The vehicle controller may be configured to autonomously control a plurality of vehicular components to execute one or more instructions. The one or more instructions may be determined based on the one or more physiological signals. The plurality of vehicular components may include a vehicle brake system, a vehicle electronic throttle control system, a vehicle steering system, a vehicle gear system, a vehicle turn signal system, a vehicle heads-up display system, a vehicle digital instrument gauge cluster, a vehicle speaker system, a vehicle camera-based collision avoidance system, a vehicle radar-based proximity detection system, a vehicle lidar-based proximity detection system, or a vehicle sonar-based proximity detection system.

The vehicle may include one or more sensors that can be configured or utilized to detect the presence of the subject. The one or more sensors may include an accelerometer sensor, a gyroscope sensor, a pressure sensor, or a door sensor. The one or more sensors can be further configured to detect the crash event of the vehicle. In some instances, the vehicle may additionally include a dashboard camera configured to capture a face or eyes of the subject and to transmit captured data to the computing system. Similarly, the vehicle may include a projector that is communicatively connected to the vehicle computing system or the user device. The vehicle may further include a vehicle display device that is communicatively connected to the vehicle computing system or the user device. The vehicle display device or the projector can be configured to display a communication-tree or a partial communication-tree to facilitate physiological signals or biosignals based communication.

Finally, the vehicle may be configured to receive, engage, and secure a mobility-aid device or a pod substantially close to a driver position. The vehicle may include one or more latching elements configured to secure a connection with the pod or the mobility-aid device in response to the latching instruction.

In some embodiments, a system is provided that includes one or more data processors and a non-transitory computer-readable storage medium containing instructions which, when executed on the one or more data processors, cause the one or more data processors to perform part or all of one or more methods disclosed herein.

In some embodiments, a computer-program product is provided that is tangibly embodied in a non-transitory machine-readable storage medium and that includes instructions configured to cause one or more data processors to perform part or all of one or more methods disclosed herein.

In some embodiments, a system is provided that includes one or more means to perform part or all of one or more methods or processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1A:
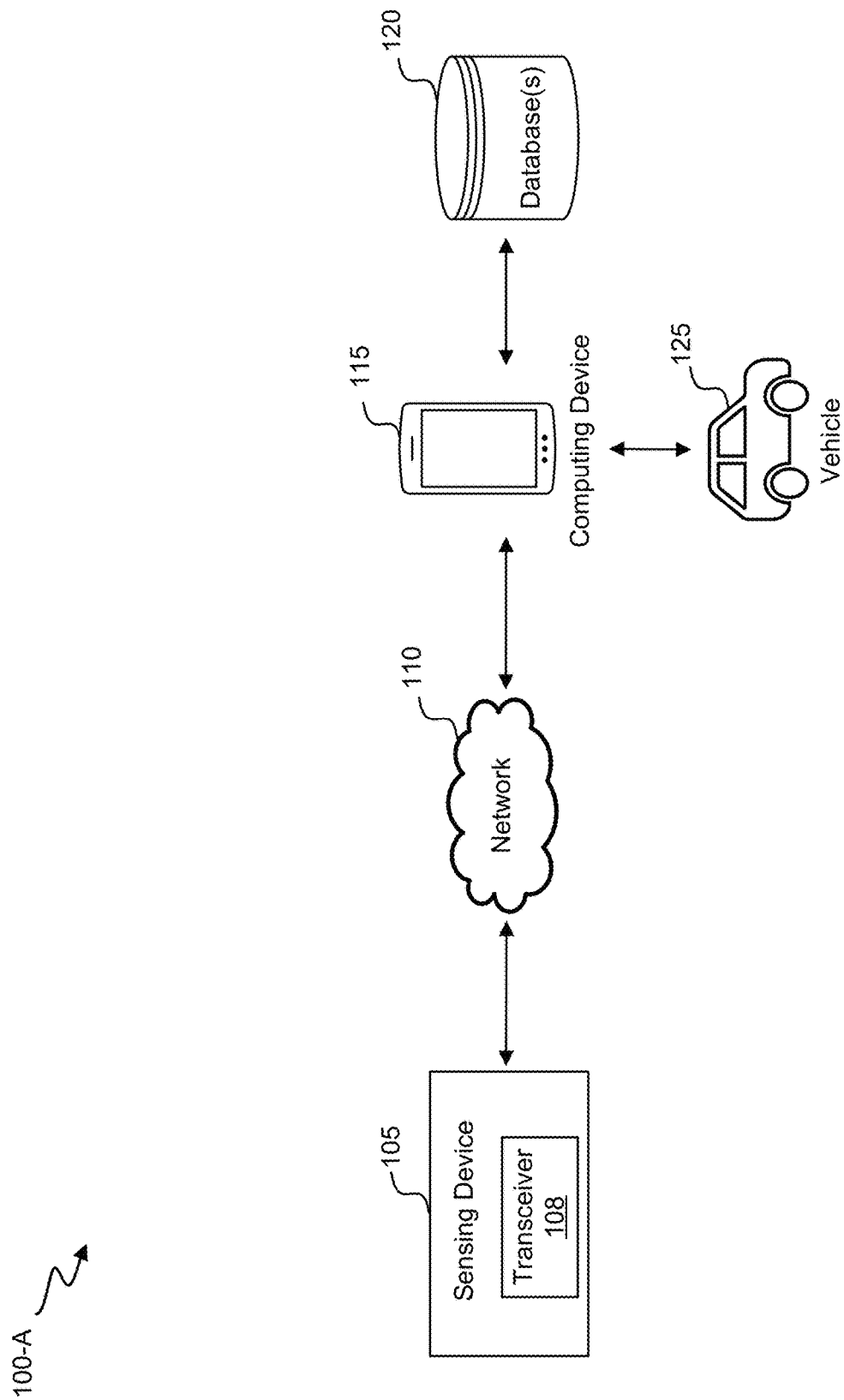
FIG. 1A illustrates an example overview of a system for integrating physiological signals with a vehicle and movements in accordance with some embodiments of the present disclosure.

Some embodiments of the present disclosure relate to collecting biosignals of a person or a subject sitting in a driver seat of a vehicle (e.g., an automobile, an airplane, a helicopter, a space shuttle, etc.) and predicting (in real-time) time-varying attention, engagement level, or alertness level using the biosignals. In some embodiments, the biosignals may be utilized to predict a restedness level of the subject, to monitor a physiological state of the subject, or to detect a distress situation. In some other embodiments, the biosignals can be transformed into communication, such as speech signals or instructions for the vehicle. According to some embodiments, a technical solution is provided in the present disclosure to a technical problem of real-time monitoring or predicting the engagement level of the subject (or a driver) in an accurate and quick manner.

The biosignals can be collected via a physiological data acquisition assembly. The terms 'physiological signals' and 'biosignals' are used interchangeably within the present disclosure. The physiological data acquisition assembly may include a sensing device and one or more clusters of electrodes. The one or more clusters of electrodes can be connected. Each cluster of the one or more clusters of electrodes includes at least one active electrode. The one or more clusters of electrodes may further include a reference electrode or a ground electrode. The electrodes can include electroencephalogram (EEG) electrodes, electromyography (EMG) electrodes, magnetoencephalography (MEG) electrodes, and/or electrooculogram (EOG) electrodes. The electrodes may be dry contact electrodes, dry non-contact (capacitively coupled) electrodes, or wet contact electrodes.

The sensing device may include a processing component that may perform initial processing using the biosignals recorded by the electrodes. Such processing may occur using execution of software code and/or using hardware elements. The initial processing may include amplification of the biosignals recorded by the electrodes, determining a differential signal, applying a filter (e.g., to remove signals around 50-60 Hz or to focus on frequency bands of interest), and/or downsampling the signals. A differential signal may be determined by subtracting a signal from one electrode. For example, a signal from a reference electrode may be subtracted from a signal from an active electrode or a signal from a first active electrode may be subtracted from a signal from a second active electrode.

The sensing device may further include a transmitter and potentially a receiver (which may be a single transceiver). The transmitter can be configured to communicate data corresponding to biosignals recorded by the electrodes to a computing device. The computing device may be a device operated by the subject (e.g., smartwatch, cell phone, tablet, laptop, augmented reality/virtual reality (AR/VR) headset, etc.), a vehicle computing system, or a cloud computing system. Such communication can occur using a variety of commercially available protocols, such as a wireless network, including a short-range connection (e.g., a Bluetooth, Bluetooth low energy (BTLE), or ultra-wideband connection) or over a WiFi network, such as the Internet, etc. In some instances, a receiver is configured to receive an instruction or request from the computing device, such as an instruction to begin recording signals or a request to send data to the computing device.

According to some aspects of the present disclosure, the physiological data acquisition assembly in part or all can be embedded into a headrest in a seat in the vehicle (e.g., the driver seat which is positioned in proximity to driving controls, such as a steering wheel, an acceleration pedal, etc.). For example, the headrest in the seat of the vehicle may include a curved portion that extends from a supporting portion positioned behind a person's head (when the person is seated) towards a forehead or ear of the person. For example, the curved portion may be an adjustable curved portion that can be adjusted in terms of its curvature, length, etc. Further or alternatively, the headrest may be configured such that a height of an anchor point of the curved portion is relative to a height of the seat. The curved portion may alternatively or additionally be configured to be a partial or full head band or cap that is tethered and/or connected to a portion of the headrest and that can be worn by a driver or the subject.

Any electrodes in the headrest may be integrated into a padding or a surface material of the headrest (or connected or tethered component). The headrest may be configured to include a flexible or a conductive material that can adapt according to contours of a driver's skull. Such a configuration can promote high-quality and stable recordings without requiring the use of conductive gel and the like.

Wiring and electronic components (e.g., the sensing device) can be seamlessly integrated into the headrest, which can promote user comfort and to maintain the aesthetic integrity of the vehicle's interior. A low-profile design minimizes bulk, allowing for a form factor nearly identical to traditional vehicle headrests. The sensing device that includes microprocessor, power supply, Bluetooth transmitter for external connectivity, and any additional components (e.g., external power supply) can be housed in a small, shielded compartment within the headrest or the seat. This compartment is easily accessible (e.g., via a zipper in a material of the seat) for maintenance, updates, or replacement of components without requiring disassembly of the whole headrest or the seat.

Furthermore, the physiological data acquisition assembly can be implemented as a wearable device, for example, a sensing patch. The sensing patch may be comprised of an adhesive film, the electrodes, and the sensing device. In some embodiments, the electrodes, along with connecting wires (or electrode leads), may be implemented using a flexible printed circuit board (PCB) and can be attached to the subject using an adhesive material (e.g., the adhesive film) or some type of gel for better signal acquisition. The sensing device 105 may be adhered to the flexible printed circuit board and can be connected to the electrodes through PCB traces. In some other instances, the sensing device and the electrodes may be implemented jointly on the flexible PCB to develop the sensing patch. Moreover, the electrode structure (e.g., the number of electrodes or channels, their locations, size etc.) on the flexible PCB can be controlled during the fabrication process. The sensing patch may include at least one active electrode and a microprocessor (e.g., inside the sensing device) configured to transmit a signal collected by the active electrode or a processed version thereof.

In some instances, the physiological data acquisition assembly may include a wearable component such as a head harness, one or more straps, one or more bands, a hat, or a cap, where each of multiple electrodes are positioned in locations that are expected to align with specific brain regions when the sensing device is being worn. The wearable component may have receiving components (e.g., an opening to receive a sensing patch or an electrode). The wearable component can facilitate ensuring that the electrodes, or the adhesive films are positioned at target positions on a subject. In addition, instructions may be provided to a subject to indicate where the electrodes or the adhesive films are to be placed.

The biosignals or physiological signals (e.g., neural signals) may be collected while, before, or after the vehicle is in motion. For example, the biosignals may be collected upon detecting that a person has sat in the driver seat (e.g., using a weight sensor in the driver seat), that a driver door has been closed, that a vehicle has been started, etc. As another example, the neural signals may be collected across a prior 24-hour period, a previous night-time period (e.g., 11 pm-5 am, a time period during which an accelerometer and/or a gyroscope in a wearable device collected data consistent with a user laying down, etc.), etc. In some instances, signals are collected continuously, periodically, in response to a trigger, etc., though the signals may be selectively processed, selectively stored, and/or selectively transmitted (e.g., based on a time period, sensor data, etc.).

The sensing device may be configured to communicate with one or more other systems. For example, the sensing device may communicate with an external computing system (e.g., via the Internet), a nearby computing system (e.g., via Wifi, Bluetooth, etc.), etc. Thus, various computations or partial computations may be performed on the device, the external computing system, the nearby computing system (e.g., a smartphone, smartwatch, laptop, computer, server, etc.), and/or various combinations thereof.

Exemplary computations may be performed to (for example) predict a person's alertness, engagement, physical impairment, injury, and/or communication detriment. Other additional or alternative computations may be performed to transform signals from a person into speech signals, vehicle-control signals, alert signals, and/or communication signals.

As noted, the sensing device may include one or more active electrodes and at least one reference electrode. Regarding each of the one or more active electrodes, a corresponding differential signal can be computed, for example, by subtracting a signal from at least one reference electrode. The differential signal may be analyzed within each of a series of sliding or non-overlapping time windows. For instance, the differential signal can be segmented based on a predefined or given time interval. Within each time window, the differential signal may be transformed into a frequency space. In some instances, multiple transformations can be performed on the differential signal (e.g., in accordance with the SPEARS algorithm, which is disclosed in U.S. application Ser. No. 11/431,425, filed on May 9, 2006, which is hereby incorporated by reference in its entirety for all purposes). One or more normalizations may be applied in the time domain and/or in a frequency domain. Moreover, one or more features may be defined or extracted from the differential signal corresponding to each time window of the series of sliding or non-overlapping time windows. The one or more features may include or be based on the power (or normalized power) in the transformed signal at each of one or more frequency bands. The frequency bands may include a band corresponding to Delta, Theta, Gamma, Alpha, or Beta frequencies or any other frequency range.

A feature may include a statistic that is determined based on one or more power values or weighted power values. For example, a feature may include a maximum or minimum power (or normalized power) in a spectrum corresponding to a segment of the differential signal, a standard deviation (across frequency bands) of power, etc. As another example, a feature may include a standard deviation of power values associated with a given frequency band (or weighted power values) across segments. As yet another example, a feature may include a z-score, which can include a normalized unit that reflects the amount of power in the signal, relative to the average of the signal. The z-scores can be converted into mean deviation form, by subtracting the mean from each score. The scores can then be normalized relative to standard deviation. All of the z scored normalized units can have standard deviations that are equal to unity.

As one illustration, features may be defined to include normalized power in a low frequency band (e.g., Alpha band), normalized power in a high frequency band (e.g., Gamma band), and the sort. Further features can be defined such as Gamma power/Alpha power, time derivative of Delta, time derivative of Gamma power/Alpha power and the like. Time derivatives can be computed over preceding and successive segments.

Monitoring real-time drowsiness and recent sleep patterns can improve the safety of any driver and or others. In some embodiments, the subject may wear or carry a user device prior to entering the vehicle. The user device may be configured to collect biometric data or physiological data. The user device may include a program code that, when executed, evaluates sleep stages based on the biometric data or the physiological data. The user device and/or the vehicle (e.g., the vehicle onboard processor) may access physiological data of the subject from a prior night, or a rest period, to assess the quality and/or duration of sleep. For example, EEG data can be collected using a first user device (e.g., the sensing patch, head harness, etc. with a set of EEG electrodes) and transformed (e.g., on the first user device or on another user device such as smartwatch or smartphone) into data identifying a sleep duration from one or more prior nights. The physiological data can be segmented, and a sleep stage or state (including an awake state) is assigned for each segment in accordance with U.S. application Ser. No. 11/431,425, which is hereby incorporated by reference for all purposes. Furthermore, a sleep pattern, a relative frequency or duration of each of the one or more sleep stages or the awake state can also be determined and may be used to predict a restedness level of the subject using a machine learning model. The machine learning model may include but is not limited to regression techniques (e.g., linear regression, polynomial regression), or classification techniques such as decision trees, random forests, support vector machines, neural networks or deep learning models.

The user device worn by the subject may be connected with the vehicle. The sleep duration, the quality and/or the restedness level may be communicated to a computing system in the vehicle (e.g., the vehicle computing system). A vehicle-control condition may be assessed on the user (wearable) device or on the vehicle computing system based on the physiological data and/or evaluation thereof (e.g., estimated sleep-stage contributions, total duration, or restedness level). The assessment of the vehicle-control condition will determine whether to allow the vehicle to move and/or an extent to which to allow the user to control the vehicle (e.g., versus having the vehicle controlled by a self-driving or via auto-pilot feature).

In some instances, the assessment may be used to control a threshold of when various driving features are engaged or disengaged. For example, if the duration of sleep is lower, a reliable auto-control driving feature (or auto-pilot feature) may activate sooner than otherwise. As another example, a maximum speed may be more tightly constrained if the quality of sleep or the restedness level (e.g., as assessed in terms of sleep-stage distribution) is lower than normal for a given subject or population.

In some embodiments, biosignals or physiological signals may be utilized to monitor or predict an alertness level of the driver (or the subject). For example, power in a Gamma band of current or recent EEG recordings can be used to predict the alertness level of the driver. Similarly, microsleeps and/or drops in attentiveness may be detected using EEG recordings. The drop in attentiveness may further be inferred based on camera recordings (e.g., a camera of the AR/VR headset or smart goggles, a dashboard camera etc.). Moreover, sensors or electrodes that are embedded in the headrest of the driver seat can be capacitively coupled to detect when the driver is blinking. A blink count or frequency can be determined using the capacitively coupled sensors or using the camera recordings. The blink count or frequency (e.g., alone or with one or more other factors) may be used to predict drowsiness or lower alertness level. Drops in predicted alertness may trigger the vehicle to switch to autonomous driving mode, pull over to the side of a road and park, alert the driver, not initiate a trip, etc. To alert the driver, a vehicle controller may initiate vehicle controls, such as lowering the temperature of passenger cabin, increasing fan speed, increasing cabin light, increasing audio volume, generating a sound alarm, generating seat vibrations, and the like.

In some embodiments, constraints may be imposed on a degree to which a person can control a vehicle (e.g., via motor signals, EEG signals, EOG signals, EMG signals, MEG signals, etc.) irrespective of whether it is detected that the user is looking ahead (e.g., towards a road in front of a car).

In some embodiments, an engagement of the driver or the subject is assessed by presenting a task. The engagement assessment may occur before a driver begins operating a vehicle and/or at one or more points while a driver is operating a vehicle (e.g., using auto-pilot feature). After inferring that the driver has entered or is already in the vehicle, using, for example, a signal from a weight sensor, then the task may be presented. The task may include, for example, requesting the driver to provide a responsive action that may be detected by the sensing device disclosed herein. The task may request that the driver attend to a given object (e.g., a depicted object presented at one location versus another depicted object presented at another location). The given object may be projected onto a display in the vehicle, such as a windshield or a dashboard.

For example, the task may request that a driver attend to a specific one of multiple presented visual objects. To illustrate, one or two dots may be presented at a time-one above the other and with differing colors. An instruction may be presented via text or via an audio signal that identifies one of the dots (via a relative position or color) to which the driver is to attend or imagine (or to stop attending or imagining). For instance, a green dot may be displayed indicating a command to start the task (e.g., imagining, squeezing a hand or a foot etc.). After some time, a red dot may be displayed indicating a command to stop the task. Various sensor measurements may be recorded during the task and may be used to assess whether and/or an extent to which a driver accords with the instructions. For example, ocular, muscular, or neural signals may be used to assess whether, an extent to which, and/or how quickly the driver accorded with the instructions. A predefined condition may be evaluated to determine whether to allow and/or an extent to which to allow the driver to operate the vehicle.

As yet another illustration, neural signals and/or eye gazes may be used to predict an extent to which the driver is attending to a situation. In some situations, recordings from one or more EEG electrodes are used to assess the power or normalized power within the Gamma band.

If a condition for a task is not satisfied, the vehicle may refuse to start or move. Similarly, if a vehicle is in motion (e.g., in self-driving mode) and the task is not satisfied, a vehicle with automated driving may self-park and/or administer another test and/or transition into a fully autonomous driving mode.

It will be appreciated that disclosures herein may relate to vehicles such as cars, vans, trucks, planes, etc. Such disclosures may also relate to pods and/or mobility-aid devices (e.g., wheelchairs). In some instances, a vehicle is configured to receive, engage and secure a mobility-aid device and/or pod. As one example, a pod may be configured to engage (e.g., secure via one or more latches) a wheelchair and to move itself and the engaged wheelchair into a position within a vehicle, where the pod can then be secured (e.g., across a transportation session via one or more locking mechanisms).

A mobility-aid device, pod and/or associated vehicle may be configured such that neural signatures may be detected from the subject and transformed into movement controls of the mobility-aid device, pod, or vehicle. For example, a device (e.g., the sensing patch, the headrest with the sensing device, or the computing device etc.) that receives neural signals may be connected via wires or wirelessly to one or more of the mobility-aid device, pod, or vehicle, and/or any of the mobility-aid device, pod, or vehicle may communicate such neural signals (or features thereof) to another of the mobility-aid device, pod, or vehicle. The signals may be processed to detect, for example, neural-signal power in a gamma band, direction and/or velocity of eye movements, intensity of neural features indicative of intention, etc. Any such signal feature (or combination thereof) or other biosignals (may be transformed into an instruction for driving the vehicle, moving the pod, or moving the mobility-aid device. Further, the vehicle, pod, or mobility-aid device may be configured such that biosignals of a user can be used to determine whether and when a user intends to control or disengage with the vehicle, pod, or mobility-aid device. Such signals may be based on, for example, gamma-band neural signatures, eye-blink signatures, eye-movement signatures, jaw-movement signatures, etc. It will be appreciated that, in some instances, the pod is partly or fully autonomous (e.g., in that it follows a set path to exit a vehicle and/or enter a vehicle, that is creates and follows a self-generated path between a vehicle docking sight and a user site identified by a user-device location or Bluetooth signal, etc.).

In some embodiments, biosignals are transformed, in real-time, to control a movement of a vehicle, pod and/or mobility-aid device (e.g., wheelchair). The pod may be configured to transport one or more persons. In some instances, the pod is configured to transport a person in and/or with a mobility-aid device. For example, the pod may be configured to transport a person and a wheelchair from outside to inside the vehicle (e.g., in a driver seat). The vehicle may also be configured to receive such a pod in a driver position. For example, the vehicle may be configured without a seat in an area typically associated with a driver. Instead, the vehicle may include one or more latching and/or connection elements configured to secure a connection with a pod upon detecting a latching instruction or trigger. In some instances, the vehicle does not even include a steering wheel or an acceleration control (e.g., pedal).

The pod may include one or more motors and may be configured to move in two, three or four dimensions. For example, the dimensions may correspond to an x, y, or z dimension and/or a speed dimension. The mobility-aid device may include one or more motors and may be configured to move in two or three. For example, the dimensions may correspond to an x, y, and/or a speed dimension.

Biosignals recorded from a person (e.g., who is in the vehicle, the pod, or the mobility-aid device) may be transformed into movement instructions along the dimensions. For example, a user may wear a wearable device (e.g., the sensing patch, head harness, cap, etc.) that includes one or more active electrodes and one or more reference electrodes. The electrodes may record EEG, EMG, EOG, or MEG signals. In some instances, the current biosignals may be compared with the baseline signals (e.g., subject-specific or population-based) or recent past biosignals through coherence to detect signal anomalies.

As one example, EOG signals may detect eye movements and/or blinks that may be translated into movement instructions. Moreover, the blinks can further be detected by EEG signals (e.g., using raw EEG signals or preprocessed EEG signals) and/or EOG signals (e.g., using raw EOG signals or preprocessed EOG signals). In an example embodiment relating to pod movement, EOG signals corresponding to upward eye movements may be transformed into upward movement instructions for the pod. EOG signals corresponding to a leftward eye movement may be transformed into a leftward movement instruction for the pod. EOG signals corresponding to a double blink may be transformed into a braking instruction for the pod. In an example embodiment relating to the movement of a mobility-aid device, EOG signals corresponding to upward eye movements may be transformed into forward movement instructions for the mobility-aid device. EOG signals corresponding to a leftward eye movement may be transformed into a leftward movement instruction for the mobility-aid device. EOG signals corresponding to a double blink may be transformed into a braking instruction for the mobility-aid device.

As another example, EMG signals may detect jaw movements that may be translated into movement instructions. In an example embodiment relating to pod movement, EMG signals corresponding to upward jaw movements may be transformed into upward movement instructions for a pod. EMG signals corresponding to a leftward jaw movement may be transformed into a leftward movement instruction for the pod. In an example embodiment relating to pod movement, EMG signals corresponding to upward jaw movements may be transformed into upward movement instructions for a mobility-aid device. EMG signals corresponding to a leftward jaw movement may be transformed into a leftward movement instruction for the mobility-aid device. EMG signals corresponding to an upward jaw movement may be transformed into a forward movement instruction for the mobility-aid device.

As yet another example, EEG signals may represent neural signals (e.g., from the frontal cortex, prefrontal cortex, motor cortex, etc.). A training process may be used to associate each of multiple pod-movement intentions with a neural-signal signature and/or one or more neural-signal features. Such association may be generated using, for example, a technique disclosed in U.S. application Ser. No. 13/749,619, which is hereby incorporated by reference in its entirety for all purposes. Such association may be learned by collecting a training set that includes, for each of multiple types of movement, a set of EEG signals (collected from a single user or from multiple users) that are generated in response to a user being instructed to envision moving in accordance with the type of movement. A machine-learning model (e.g., a neural network, a classifier, a transformer model, a deep neural network, a model that uses a component analysis, etc.) can then be trained to learn features of EEG signals that are predictive of each of the multiple types of movement. The trained model may be specific for one user or applicable to multiple users. In some instances, the model is first trained using a training data set associated with multiple users and is then finetuned using data associated with a specific user. Once the model is trained, EEG signals can be processed in real-time to detect various movement instructions, which can cause a corresponding movement of a mobility-aid device. It will be appreciated that, in some instances, EEG signals are used to control movement of a vehicle (e.g., instead of or in addition to a pod) using a similar training and/or model-implementation technique.

According to some aspects of the present disclosure, biosignals can be utilized to monitor a physiological state of the driver or passengers (e.g., in robotaxis) and to detect a distress situation. For instance, the driver may experience a health incident and/or the driver may have been in an accident. The driver may require and/or may benefit from assistance, though—depending on the circumstance—the driver may be unable to seek such assistance. For example, the driver may be unable to move either arm or hand to reach a phone or escape from a vehicle. Some embodiments of the current disclosure relate to transforming the biosignals into communication that is transmitted by the vehicle.

A vehicle may detect a signal anomaly (e.g., which may be indicative of a crash). The signal anomaly may be detected based on measurements from, for example, an accelerometer in the vehicle, an impact-sensor in the vehicle, a pressure sensor in the vehicle, an accelerometer in the user device owned by the driver in the vehicle, etc. The signal anomaly may potentially trigger an interim check of a status of the driver. For example, the vehicle or the user device may visually or audibly present a question. If a response is not received within a defined period of time, a distress-condition may be activated. As another example, a sensor in the vehicle or user device may estimate whether and/or an extent to which eye movements or eye blinks match those of unimpaired humans (e.g., in response to instructions for eye movement or blinks or at a default level). As yet another example, neural signatures may be evaluated to predict the alertness level, awareness, and/or health of the driver. Such an assessment may depend on power within a Gamma-band frequency range. As another example, such an assessment may depend on changes in intensities in each of one or more frequency bands representing neural signals. As yet another example, the mobility-aid device and/or the pod may include a sensor that detects a movement signature characteristic of a potential crash injury.

It will be appreciated that the vehicle, pod, or mobility-aid device may be in communication with the user device via a short-range connection. Thus, even if wide-range connections are impaired for the vehicle, pod, or mobility-aid device, the communication can be sent with data that indicates an inference of a crash, an identifier of a user, an emergency contact, pertinent health information, and/or a combination thereof. Even if the vehicle computing system is not operational, a pod computing system or a mobility-aid device computing system (or connected user device) can be used to support the communication and/or to generate vehicle-control signals for the vehicle, pod, or mobility-aid device.

If an interim check generates a result consistent with a follow-up action (e.g., due to the distress-condition be activated, eye movements/blinks sufficiently matching those of impaired humans, neural signatures not sufficiently according with threshold alertness, awareness and/or health), a speech-facilitation tool may be initiated and/or configured. The speech-facilitation tool may include one or more configurations and/or functionalities as disclosed in U.S. Provisional Application No. 63/452,268, which is hereby incorporated by reference in its entirety for all purposes. For example, the tool may be configured to present a tree and to trigger recording of the one or more physiological signals (e.g., EEG signals, EMG signals, MEG signals, or EOG signals) that detects a signal corresponding to a movement or intention from a user as to how to navigate through a path of the tree. Such navigation can result in generation of a sentence, a message, a set of sentences, a command, or a set of commands. In the vehicular context and in accordance with an embodiment of the current disclosure, a communication-tree or a partial communication-tree may be presented on a console or windshield of the vehicle. In some instances, the communication-tree may be configured (e.g., by default or upon detecting sensor readings consistent with strong impact) to include a path or a leaf node that corresponds to a request that emergency personnel be contacted. If such a path is completed or if the leaf node is reached, emergency personnel may be automatically contacted (e.g., global positioning system (GPS) coordinates may be conveyed). Such contact may occur through the vehicle and/or from any connected user device. Additionally, or alternatively, the communication-tree may be navigated to select particular letters, letter combinations, symbols, or phrases so as to generate a customized message. In a similar manner, a recipient may be identified without the user having to use their hands at all. In some instances, a distress signal or the alert signal may be transmitted automatically unless cancelled by the driver (or passengers) within a specific time interval.

Similarly, the computing system of the vehicle or the user device can be configured to receive sensor input that detects EEG, EMG, MEG, EOG signals or signals from the AR/VR headset (e.g., smart goggles) that can then be used to navigate the communication-tree to generate the communication. For example, a driver may have been in an accident that has prevented the driver from using his/her hands. However, sensors embedded in the headrest of the seat may then be activated, such that the driver may be able to communicate by controlling navigation through a communication-tree by biosignals. The communication-tree may be presented on, for example, the windshield, the console, the AR/VR headset, or the user device. Instructions for navigating the communication tree may be presented visually or audibly. Even if all sensors in a vehicle have failed, a user device (e.g., a patch with EEG electrodes) may be independently supported, may detect activation, and may support such communication.

The techniques disclosed in the present disclosure can be utilized for the passengers sitting in the back seat of the vehicle, next to the driver seat, or the driver seat (e.g., in fully autonomous mode, robotaxis etc.).

FIG. 1A illustrates an example overview of a system for integrating physiological signals with the vehicle and movements in accordance with some embodiments of the present disclosure. Exemplary system 100-A comprises a sensing device 105, a network 110, a computing device 115, one or more database(s) 120 and a vehicle 125. The sensing device 105 may include a transceiver 108 to communicate with the computing device 115. The sensing device 105 may be connected to the computing device 115 through the network 110. The transceiver 108 can be configured to communicate physiological data recorded by the sensing device 105 to the computing device 115 that is part of the biosignals integration with vehicle and movements system. In some embodiments, the sensing device may be embedded into the vehicle 125 such as in the headrest or an extended headwear from the seat of the vehicle 125.

The computing device 115 may include a mobile device (e.g., a smartphone), personal digital/data assistants (PDA), a tablet, a laptop, a desktop computer, a computer server, an AR/VR device (e.g., goggles) or the like. The computing device 115 can also be referred to as the user device and/or a vehicle computing system, pod computing system and/or the mobility-aid device computing system. In some instances, the transceiver 108 and/or the sensing device 105 can be configured to receive an instruction or request from the computing device 115, such as an instruction to begin recording signals or a request to send data to the computing device 115. Moreover, the communication between the sensing device 105 and the computing device 115 can occur using the network 110, which can be a wireless network based on a commercially available communication protocols, for example, Bluetooth, Bluetooth low energy, ultra-wideband connection, or Wi-Fi network, such as the Internet, etc. The network 110 may include, internet, an intranet, a wired LAN (local area network), a wireless LAN (Wi-LAN), a WAN (wide area network), a MAN (metropolitan area network), a PSTN (public switched telephone network) and other types of communications networks. The network 110 may further include communication devices such as one or more gateways, routers, or bridges. The network 110 may be any type of network familiar to those skilled in the art that can support data communications using any of a variety of available protocols, including without limitation TCP/IP (transmission control protocol/Internet protocol), SNA (systems network architecture), IPX (internet packet exchange), AppleTalk®, and the like.

In some embodiments, the sensing device 105 is configured to acquire, record, process, and transmit physiological data associated with the brain of the subject. In some instances, the physiological data can be recorded using EEG, EOG, EMG, MEG, electrodes attached to the scalp or on the forehead of the subject. The sensing device 105 may be configured with at least one active electrode and a reference electrode. EEG signals correspond to summed electrical signals. EMG and EOG signals are generated by muscle and eye movements, for example, spontaneous and/or intentional movements. The active electrode acts as a primary sensor that detects the electrical activity that is directly or indirectly generated by the neuronal firing in the brain and nervous system. The active electrodes pick up the electrical activity generated by the brain and nervous system and further, transmit these signals to the sensing device 105 for initial processing (e.g., signal amplification, analog to digital conversion, denoising etc.) and analysis. The reference electrode provides a baseline or common point of comparison for the active electrodes. The sensing device 105 may further include a ground (or bias) electrode. The ground or bias electrode is often placed behind the ear of the subject. The bias electrode functions to stabilize the baseline or electrical potential of an EEG system and reduces noise or interference from external electrical sources. In some instances, the physiological data acquisition assembly may omit the ground or bias electrode and may utilize the reference and active electrodes for data recording. This is because modern differential amplifiers can be designed to operate without a dedicated ground electrode by using a virtual ground created internally by the amplifier circuitry.

In some other embodiments, the sensing device 105 may be configured to record and store physiological data in encrypted format and to transmit wirelessly to a remote center or the computing device 115 for further display, storing, processing, and analysis. In another aspect of the present disclosure, the recorded and stored physiological data may be transmitted wirelessly in real-time to the computing device 115 including a cellular telephone, smartphone, tablet, and/or computer. The recorded and stored physiological data may also be transmitted directly to a computer, cellular telephone, smartphone and/or tablet via universal serial bus (USB) transfer capabilities incorporated within the sensing device 105.

During physiological data acquisition, an initial or pre-amplification may be performed at or near the electrodes to reduce noise. For example, the electrode snap connector assemblies may include a noise reducing or cancelling filter at the electrode connection level to reduce any electrical noise that may be picked up by the lead wires. To further improve the physiological data acquisition process, the sensing device 105 or the electrode snap connector assemblies can be configured to continuously monitor electrode impedance and may include lights indicative of the current status of the integrity of the electrode connection with the scalp or forehead. The sensing device 105 may comprise hardware and software components (e.g., firmware or signal processing code) and can be used to perform initial processing. The initial processing may include amplification of the signals recorded by the electrodes, determining a differential signal, applying a filter (e.g., to remove signals around 50-60 Hz or to focus on frequency bands of interest), and/or downsampling the signals. A differential signal may be determined by subtracting a signal from one electrode. For example, a signal from a reference electrode may be subtracted from a signal from an active electrode, or a signal from a first active electrode may be subtracted from a signal from a second active electrode.

The sensing device 105 may further include a battery power component that can include a rechargeable small form factor, high-capacity battery. The sensing device 105 may further include a memory, a processor, and the transceiver 108 for transmission, for example, to the vehicle 125, the computing device 115, or the one or more database(s) 120. The sensing device 105 includes a power supply and recharging circuitry for receiving power through an electrical power cord and alternating current (AC) unit. The electrical power cord is coupled to the sensing device 105 for recharging the small form factor, high-capacity battery through a port, which may be but is not limited to USB, D-subminiature (DB)-25, or the like. The sensing device 105 includes a power on and off function for preserving the power supply of the small form factor, high-capacity battery when not in use. The sensing device 105 may also include power on and off indicator lights indicative of the current status of the sensing device 105. In some instances, the sensing device 105 may be recharged through a USB connection to a computer. In some other instances, the sensing device 105 may be recharged wirelessly, for example, in the vehicle 125.

The exemplary system 100-A may further include the one or more database(s) 120 for storing and future processing of data (e.g., EEG, EOG, MEG, EMG signals of the subject). The physiological data of the subject may be stored with metadata. The metadata may include subject information, type, and placement location of each electrode etc. One or more database(s) 120 may be elemental to a memory system on the computer or in secondary storage such as a hard disk, floppy disk, optical disk, or other non-volatile mass storage devices. In addition, the computing device 115 may be used to execute signal processing techniques or algorithms on the physiological data (previously recorded signals or real-time signals) and to store the results in the one or more database(s) 120.

The integration of the physiological data acquisition assembly may be adjusted in various ways to enhance driver safety and overall vehicle intelligence. Such assemblies often include the sensors to be strategically positioned to provide reliable signal quality. The collected physiological data may be transmitted to the computing device 115, which can serve as the central hub for processing and analyzing the signals. The computing device 115 may be integrated into an existing infotainment system (or vehicle display device) of the vehicle 125 or operate as a standalone unit dedicated to safety and driver monitoring functions. The existing infotainment system or the vehicle display device can be used to modify the configurations of the passenger and/or driver cabin to improve resting or relaxing conditions for the passenger and/or driver such as adjusting a firmness of the seat and/or adjusting an angle of the seat of the vehicle 125. In some instances, the physiological data acquisition assembly in part or all the components can be embedded into the headrest or the seat of the vehicle 125. In some other instances, the physiological data acquisition assembly may be embedded into the sensing patch 100-B. In some other instances, a combination can be utilized wherein the physiological data assembly may be embedded in the vehicle 125 and also in the sensing patch 100-B.

Figure 1C:
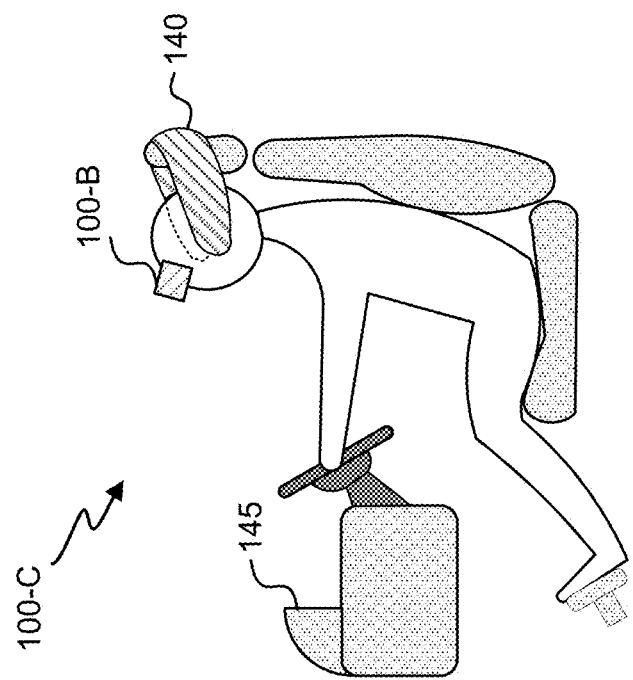
FIG. 1C shows a headrest with a curved portion and having embedded electrodes to capture the physiological signals from a subject head in accordance with an example implementation of the present disclosure.
Figure 1B:
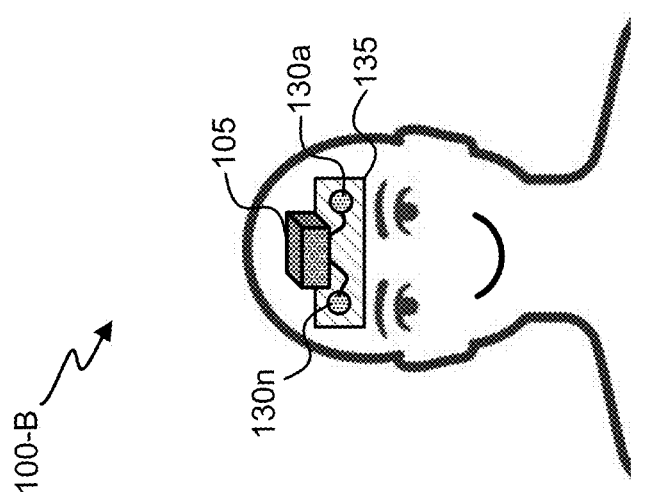
FIG. 1B illustrates an example placement of an adhesive film, electrodes, and a sensing device on a subject forehead in accordance with some embodiments of the present disclosure.

FIG. 1B illustrates an example placement of an adhesive film, electrodes, and a sensing device on a subject forehead in accordance with some embodiments of the present disclosure. According to the example placement, one or more electrodes 130*a-n* and the sensing device 105 may be adhered to the adhesive film 135 to capture the physiological signals. In some instances, the adhesive film 135 can be a single long adhesive film that is attached to the forehead of the subject. The one or more electrodes 130*a-n* may include the active electrodes and the reference electrodes. Both active and reference electrodes can be placed close to each other but are not electrically connected. In some instances, a bias electrode may be attached to the ear (e.g., ear lobe or back side of ear) of the subject using an electrode lead. In some instances, the bias or ground electrodes can be embedded in a sensing patch 100-B.

In some embodiments, the adhesive film 135 may be comprised of stretchable materials. In some instances, the one or more electrodes 130*a-n*, along with connecting wires, may be implemented using a flexible printed circuit board (PCB) and can be attached to the subject using an adhesive material or some type of gel for better signal acquisition. The sensing device 105 may be adhered on the flexible printed circuit board and can be connected to the two or more electrodes 130*a-n* through PCB traces. In some other instances, the sensing device 105 and the one or more electrodes 130*a-n* may be implemented jointly on the flexible PCB that may act as a singular sensing patch. Moreover, the electrode structure (e.g., the number of electrodes or channels, their locations, size etc.) on the flexible PCB can be controlled during the fabrication process. The physiological data or signals may be acquired during a resting state, sleeping state, or a task-specific state (e.g., eyes closed, thinking task etc.).

The collective composition of the adhesive film 135, the one or more electrodes 130*a-n*, and the sensing device 105 may be referred to as the sensing patch 100-B. The sensing patch 100-B may have a surface or the adhesive film 135 that extends across a length and width dimension. An adhesive material may be disposed across part or all of the surface or the adhesive film 135 (e.g., across part or all of one or more edges of the surface). The length may be (for example) less than 10 cm, less than 8 cm, less than 6 cm, less than 4 cm, less than 2 cm, etc. The width may be (for example) less than 10 cm, less than 8 cm, less than 4 cm, etc. The length may be (for example) greater than 0.5 cm, greater than 1 cm, greater than 2 cm, greater than 4 cm, etc. The width may be (for example) greater than 0.5 cm, greater than 1 cm, greater than 2 cm, greater than 4 cm, etc. The length may be (for example) between 0.5-10 cm, between 1-6 cm, between 2-4 cm, between 2-8 cm, between 2-8 cm and/or between any other semi-closed or closed range having a threshold disclosed herein. The length may be (for example) between 0.5-10 cm, between 1-6 cm, between 2-4 cm, between 2-8 cm, between 2-8 cm and/or between any other semi-closed or closed range having a threshold disclosed herein.

In some embodiments, two or more sensing patches may be used to acquire biosignals of the subject, which can have various compositions. In one composition, one sensing patch 100-B (or patch) may have EMG and EOG sensors and other patch may include EEG and MEG sensors. In some other instances, the sensing patch 100-B may incorporate a range of physiological sensors such as EEG, EOG, EMG, and MEG sensors. These sensing patches can be strategically placed on various parts of skull to capture a comprehensive set of physiological data. Each sensing patch 100-B may operate independently yet communicates with the computing device 115, providing continuous monitoring even if one patch experiences a temporary failure or interference. The redundancy provided by multiple patches enhances reliability, enabling the detection of subtle physiological changes that may be missed by a single sensor. For example, one sensing patch 100-B may be focused on monitoring neural signals (e.g., EEG, MEG), while another may track eye movements (EOG) and muscle activity (EMG). Multiple placements of the sensing patch 100-B allow the system to better account for variations in sensor placement, movement, and individual differences in physiological signal strengths.

In some instances, the physiological data acquisition assembly may include wearable components in addition to or instead of the adhesive film(s). The wearable components may include one or more straps, one or more bands, or a cap and may have receiving components (e.g., an opening to receive a patch or an electrode). The wearable components can facilitate ensuring that the one or more electrodes 130*a-n* and/or films are positioned at target positions on a subject. In some cases, the sensing device 105 can be housed in the wearable components such as a head harness. The head harness comprises of straps, and fasteners (e.g., Velcro, hook, button, etc.) for custom fit, adjustment, and comfort of the subject. The head harness may further include plurality of slots for attaching electrodes or electrode snap connectors at specific positions. For example, the bias electrode and the reference electrode may be attached behind the left and right ear and the reference electrodes on the forehead of the subject.

FIG. 1C shows a headrest with a curved portion and having embedded electrodes to capture the physiological signals from a subject head in accordance with an example implementation of the present disclosure. The headrest 140 may serve in place of the sensing patch 100-B, as the headrest 140 can be configured to include all the physiological sensors. The headrest 140 features an extended, curved portion designed to provide comfort and functionality for the subject. The curved section extends from the main body of the headrest 140 and wraps around the sides of the head of the subject, providing support near the ears. The extended portion ensures that the head is securely cradled, reducing lateral movement and offering additional stability, particularly during sudden vehicle movements. Furthermore, the curved portion may house various physiological sensors. The sensors embedded within the headrest 140 can be strategically positioned to maintain consistent signal quality. Moreover, the seat of the vehicle can also help in determining a body position and a head position of the subject. The seat may measure a tone for each of multiple muscles of the subject.

Dry or semi-dry electrodes may be embedded in the headrest 140 to provide consistent signal quality. The composition with dry or semi-dry electrodes allows the one or more electrodes 130*a-n* to be embedded directly in the headrest 140 of the seat of the driver or the subject in the vehicle 125. The headrest 140 may further include capacitively coupled electrodes or non-contact electrodes that are configured to measure EEG signals, EMG signals, EOD signals and/or MEG signals and to detect blinks or microsleep of the subject based on the signals. Equipped with wireless communication capabilities, the headrest 140 can transmit data in real-time to connected devices such as smartphones, tablets, or vehicle systems for further analysis. Additionally, onboard processors can perform initial data processing, filtering out noise and enhancing signal quality before transmitting the data. Moreover, the vehicle 125 may include a vehicle dashboard 145. The vehicle dashboard 145 may include a dashboard camera, a projector, or a vehicle display device.

According to some embodiments of the present disclosure, the headrest 140 in the vehicle 125 may include a curved portion that extends from a supporting portion located behind the head of the subject towards the ear, the area of the head above the ears or the forehead of the subject. The curved portion of the headrest 140 may be adjusted in terms of the curvature or the length, ensuring contact with the scalp while maintaining comfort during extended use. Multiple or multi-modal sensing electrodes in the headrest 140 may be integrated into the padding or surface material of the headrest 140. The headrest 140 may include flexible and/or conductive material that molds or adapts to the contours of the driver's skull. Such a configuration can promote high-quality and stable recordings even if the conductive gel or other similar means are not used.

The curved portion may alternatively or additionally be configured to be a partial or full headband or cap that is tethered and/or connected to a portion of the headrest 140, and that can be worn by the subject.

Wiring and electronic components (e.g., a microprocessor) can be seamlessly integrated into the headrest 140, which can promote user comfort and maintain the aesthetic integrity of the interior of the vehicle 125. A low-profile design minimizes bulk, allowing a form factor nearly identical to conventional vehicle headrests. The microprocessor, power supply, and additional components, such as a Bluetooth transmitter for external connectivity can be housed in a small, shielded compartment within the headrest 140 or seat. This compartment may be easily accessible (e.g., via a zipper in a material of the seat) for maintenance, updates, or replacement of components. Such composition bypasses the need of disassembly of the headrest or seat. The headrest 140 may include a rechargeable battery or may be configured to be vehicle-powered.

In another instance, the headrest 140 could include additional features such as onboard filtering, amplification, and analog-to-digital conversion of the physiological signals or data. The headrest 140 embedded with the one or more electrodes 130*a-n* may provide safety and comfort in various settings, especially when integrated with advanced systems for real-time monitoring and adaptive control.

Figure 2:
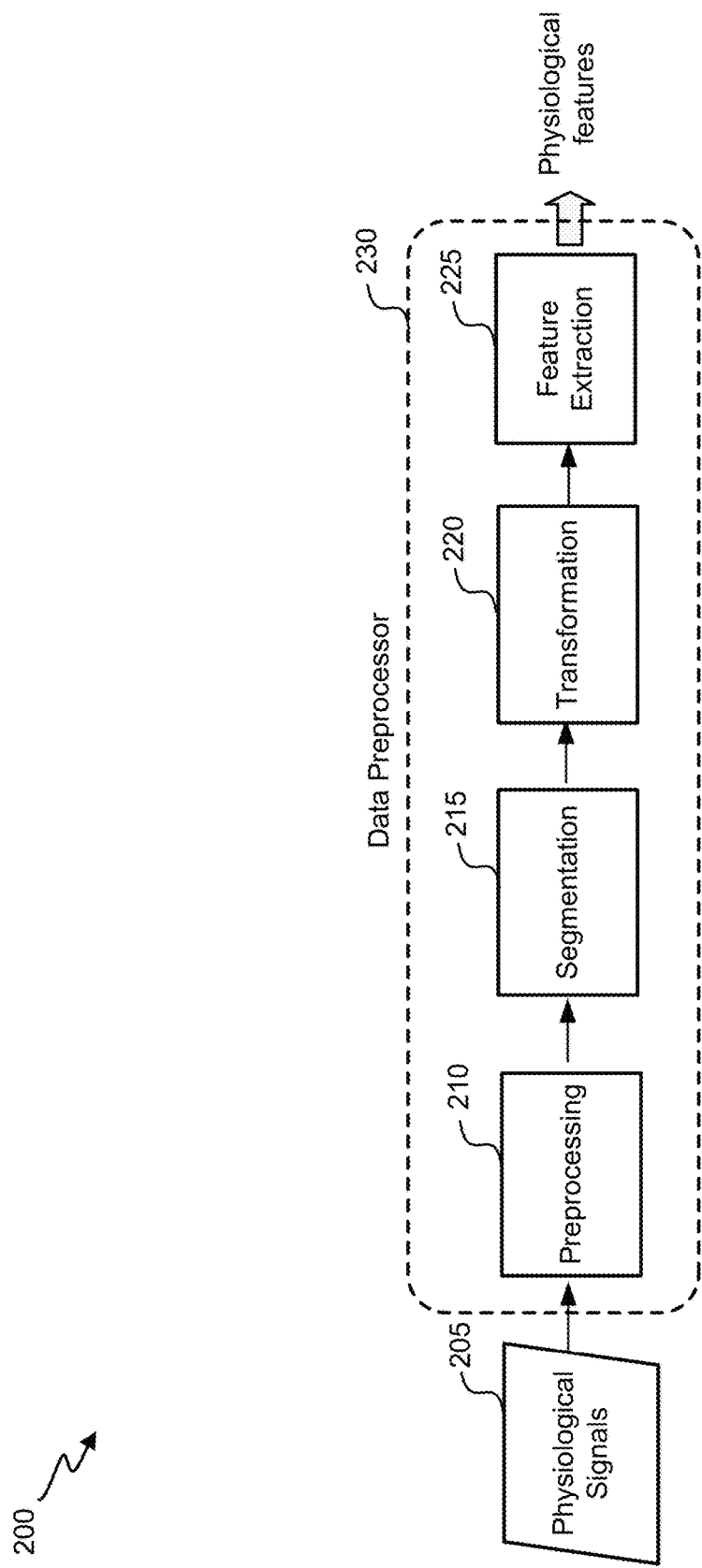
FIG. 2 illustrates an example pipeline to process the physiological signals and to extract physiological features in accordance with some embodiments of the present disclosure.

FIG. 2 illustrates an example pipeline 200 to process the physiological signals and to extract physiological features in accordance with some embodiments of the present disclosure. The physiological data may include physiological signals 205 from the sensing patch 100-B or the headrest 140. After accessing the physiological data, further processing and analysis can be performed on the computing device 115, as illustrated in FIG. 2. EEG, MEG, EOG, and EMG data may be processed using a data preprocessor 230. The data preprocessor 230 includes modules such as preprocessing 210, segmentation 215, transformation 220, and feature extraction 225.

Physiological signals 205 may be processed to remove noise and other signal artifacts at preprocessing 210. During preprocessing 210, the physiological signals 205 may optionally be treated for removing artifacts, where an artifact refers to any part of the physiological signals 205 that misrepresents the data intended to be received. These artifacts may occur due to e.g., muscle activities such as head movements causing high-frequency noise, periodic disturbances caused by electrical activity of the heart, or other environmental artifacts such as electromagnetic interferences, thereby impacting the accuracy of recorded physiological data. These artifacts can be removed from the physiological signals 205, for example, by automatically filtering out the physiological signals 205 via a filtering (e.g., direct current (DC) filtering) or data smoothing technique.

The physiological signals 205 can also be pretreated with component analysis, i.e., by decomposing the physiological signals 205 into independent components, identifying and removing artifacts based on the spatial and temporal characteristics. Physiological data artifacts may also be removed by estimating the artifact subspace using methods, e.g., principal component analysis (PCA) and projecting the physiological signals 205 onto orthogonal subspace for artifacts removal. In other instances, template matching may be performed that may identify and remove known artifact patterns by comparing the physiological signals 205 with predefined templates. Additionally, wavelet transform may be applied that decomposes the physiological signals 205 into different frequency components and removes artifacts in specific frequency bands.

After preprocessing 210, segmentation 215 may be performed on the physiological signals 205 that splits the physiological data into multiple time series increments (also referred herein as epochs) of similar or varying lengths. During segmentation 215, the time series increments or epochs may be segmented further into different sections using a scanning window, where the scanning window defines different sections of the time series increment (or epoch). The scanning window can move via a jumping window, resulting in non-overlapping sections or segments. For example, a one-hour epoch or time series increment of the physiological signals 205 can be scanned or segmented in increments of 1 minute (i.e., a scanning window of 1 minute), thus resulting in 60 disjoint or non-overlapping sections of the one-hour epoch. The scanning window can use a sliding window, where sections (or segments) of the sliding window may have overlapping time series sequences. For example, the one-hour epoch of the physiological signals 205 can be scanned with a 1-minute scanning window that begins every 30 seconds (i.e., a sliding window of 30 seconds), thus resulting in a 1-minute scanning window that overlaps by 30 seconds. Alternatively, a whole time series of the physiological signals 205 may correspond to an epoch.

The segments of the physiological signals 205 (e.g., which can include a differential signal and/or a preprocessed signal) can be transformed from a time domain to a frequency domain by transformation 220 module. For this purpose, power spectrum may be calculated e.g., by calculating power spectral density of each segment of the physiological signals 205. The power may be calculated by different techniques such as multi-taper transform, Fourier transform, or wavelet transform. For each segment of the physiological signal, one or more normalizations may be applied in the time domain and/or in the frequency domain by transformation 220 module. In some instances, the physiological signals 205 may be adjusted to account for differences in power by performing normalization. For example, normalization may be performed by weighing the spectral power of one or more segments (or time intervals) across time. The normalized power of each segment or time interval at one or more frequencies across time may help determine appropriate frequency windows for extracting information. Such normalization can reveal low power and statistically significant shifts in power at one or more frequency bands. The frequency bands may include a band corresponding to Delta band, Theta band, Gamma band, Alpha band, Beta band, or any other frequency range.

The physiological signals 205 may be characterized by different frequency bands associated with specific cognitive and physiological states. For example, the Delta band ranges typically around [0.5-4] Hz, comprising slow waves or frequencies with high amplitudes. Similarly, the Theta band, which may range approximately around [4-8] Hz, comprises moderate frequencies and amplitude. Alpha band may range approximately around [8-12] Hz and may characterize moderate frequencies with lower amplitudes than Delta and Theta band. Various states such as relaxing, wakefulness or closed eyes, maybe associated with Alpha band. Additionally, Alpha band may facilitate the transition between wakefulness and sleep. Followed by Alpha, Beta band approximately ranging from [12-30] Hz may be characterized by higher frequency with lower amplitude that may be associated with active thinking, focus, wakefulness, or similar activities. The frequency band with relatively higher frequencies, Gamma, approximately ranging [30-100] Hz may be characterized by high frequencies of EEG signals with low amplitude. Gamma band may be associated with high-level information processing and perception such as rapid eye movement sleep that may be characterized by vivid dreaming and high brain activity resembling wakefulness. In some instances, when the subject is alert and engaged in a task, gamma activity increases, enhancing the brain's ability to focus, process information rapidly, and maintain attention. which can be elemental for complex cognitive functions, such as problem-solving, memory recall, and conscious awareness. Increased gamma activity can often be observed when the subject appears fully attentive or deeply involved in tasks requiring high-level thinking and concentration. By processing these spectral characteristics of spectral bands, brain activity labels (e.g., various sleep stages, resting state, wakefulness, etc.) may be assigned to segments of the physiological signals 205.

Among these frequencies, one or more frequency bands can be revealed and utilized for further analysis. Feature extraction 225 may be performed on each segment of the physiological signal. Therefore, one or more features may be defined, which may include or be based on the power (or normalized power) in a transformed signal at each of one or more frequency bands. The one or more features may include a statistic that is determined based on one or more power values or weighted power values. For example, a feature may include a maximum or minimum power (or normalized power) in a spectrum corresponding to a segment, or a standard deviation (across frequency bands) of power, etc. As another example, a feature may include a standard deviation of power values associated with a given frequency band (or weighted power values) across segments. As yet another example, a feature may include a z-score, which can include a normalized unit that reflects the amount of power in the signal, relative to the average of the signal. The z-scores can be converted into mean deviation form, by subtracting the mean from each score. The scores can then be normalized relative to standard deviation. The z scored normalized units can have standard deviations that are equal to unity. A feature may include a weighted average of power across multiple frequency bands, for example, the weights can be determined by a component analysis, or a neural network that has been configured or trained to differentiate signals from subjects with low alertness levels versus subjects having alertness levels above the alertness threshold.

Features may be calculated epoch-wise by using each of the one or more epochs of the brain. As one illustration, features may be defined to include normalized power in low frequency bands (e.g., Delta band, Theta band, Alpha band), normalized power in a high frequency band (e.g., Gamma band), standard deviation of normalized power values across frequency bands in an epoch, a maximum normalized power value for the epoch, and the like. In addition, derived features can be generated based on the information (or normalized features) calculated for each of the one or more epochs of the brain. The derived features may include but not limited to Gamma power/Delta power, Gamma power/Alpha power, time derivative of Delta, time derivative of Gamma power/Delta power, time derivative of Gamma power/Alpha power. Time derivatives can be computed over preceding and successive epochs. Afterwards, the derived features can then be normalized across the one or more epochs. A variety of data normalization techniques can be conducted including z-scoring, min-max scaling, quantile transformation, log transformation and other similar techniques. In some instances, normalization is performed by z-scoring that is a statistical technique to standardize the range of independent variables (or features). It may involve transforming the features such that the features have a mean of zero and a standard deviation of one. By applying z-scoring, different derived features of the spectral power data such as Delta power and Gamma power/Delta power may be scaled to a common range, thus eliminating biases.

A variety of features may be calculated of a subject. In some instances, features may be based on segments or individual epochs, while in other instances, the features may be derived based on multiple or all epochs associated with a given time period (e.g., night, day, or set of days). The computing device 115 may retrieve the historical data of the subject from the database(s) 120 to calculate features for the given time period. In this case, feature sets associated with individual epochs may be expanded to include each multi-epoch feature that corresponds to a time period overlapping with the epoch. The variety of physiological features or feature sets generated based on the physiological signals 205 (or pre-processed physiological signals) from a particular epoch or a particular time period may be used to detect irregular sleep patterns, predict restedness level and engagement level, monitor physiological state of the subject. Mind-based vehicle control and the speech facilitation tool may also be initiated based on the generated physiological features.

Figure 3:
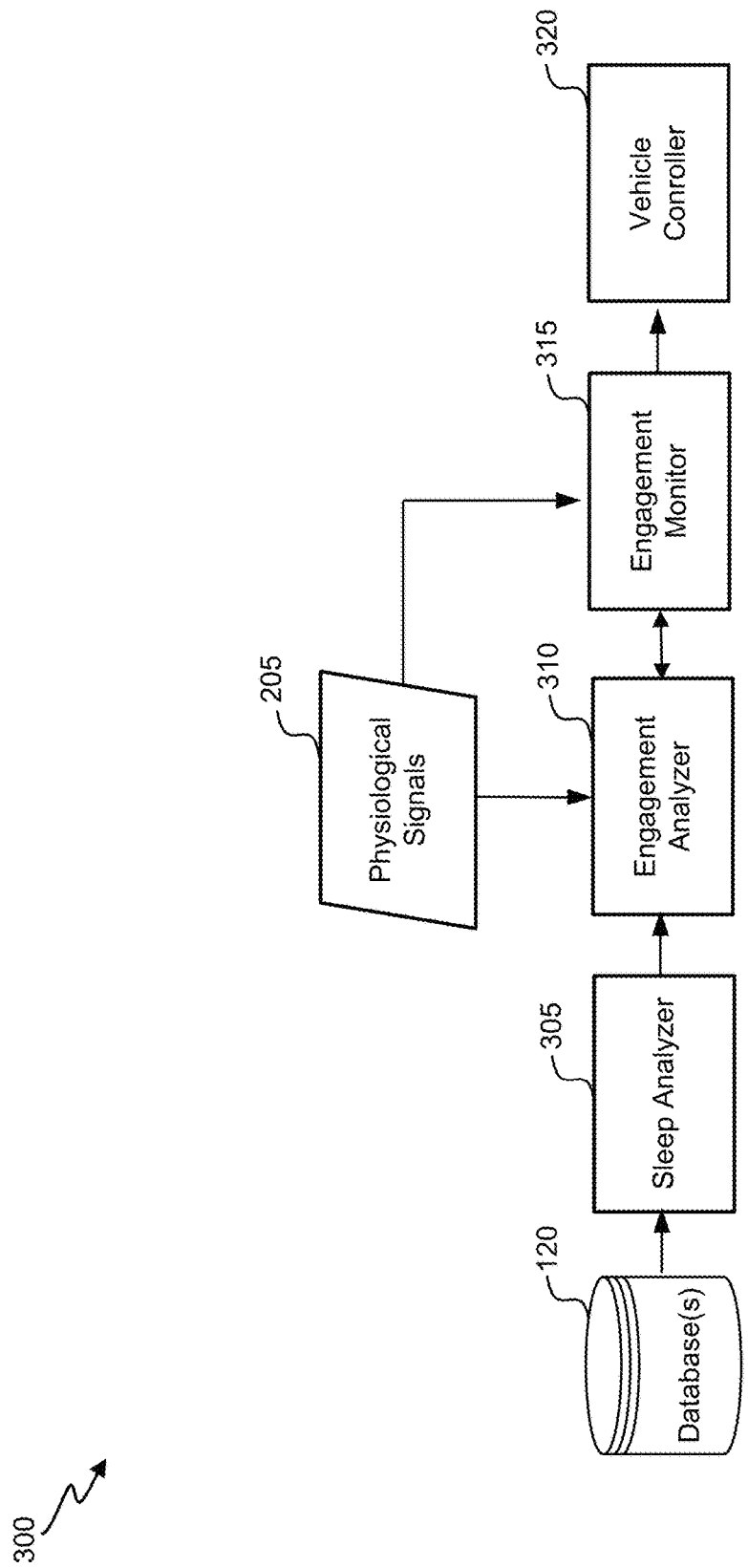
FIG. 3 shows an example implementation of a vehicle engagement conditioning protocol in accordance with some embodiments of the present disclosure.

FIG. 3 shows an example implementation of a vehicle engagement conditioning protocol in accordance with some embodiments of the present disclosure. The one or more database(s) 120 may be directly accessible by a sleep analyzer 305. The sleep analyzer 305 assesses real-time drowsiness, recent sleep patterns, quality and/or duration of sleep of the subject by extracting the physiological data of one or more prior nights, or rest periods from the one or more database(s) 120.

In some embodiments, a subject may wear a first user device prior to entering a vehicle. The first user device may be configured to collect physiological data and/or to include program code that, when executed, evaluates sleep stages. For example, EEG data can be collected using the first user device (e.g., the sensing patch 100-B, a head harness, or a smartwatch etc. with a set of EEG electrodes) and transformed (e.g., on the vehicle computing system, on the first user device or on another user device such as the computing device 115) into data identifying a sleep duration from one or more prior nights using the sleep classification model.

Raw physiological data, such as EEG signals, are often noisy and may contain artifacts. The data preprocessor 230 may include preprocessing 210 to remove noise, normalization to standardize data, and the segmentation 215 to break down the continuous data into smaller epochs (e.g., 30-second intervals) that can be analyzed individually. After the transformation 220 into frequency domain, the preprocessed signals may then be used to extract relevant features, through feature extraction 225 that can help distinguish between different sleep stages. The physiological features may include power spectral densities, signal power in frequency bands (e.g., Delta, Theta, Alpha, Beta, and Gamma), and other statistical measures like variance or coherence between different signals.

In some instances, during segmentation 215, and a sleep stage or state (including an awake state) may be assigned for each segment of the physiological signals 205 in accordance with U.S. application Ser. No. 11/431,425, which is hereby incorporated by reference for all purposes. Furthermore, the sleep pattern, the relative frequency or the duration of each of the one or more sleep stages or the awake state can also be determined using the sleep classification model. The sleep classification model can be a machine learning model which may include but is not limited to regression techniques (e.g., linear regression, polynomial regression), or classification techniques such as decision trees, random forests, support vector machines, neural networks or deep learning models. The training of these models is typically performed using large, labeled datasets obtained from synthetic or augmented data, public sleep datasets or from Polysomnography studies. The standard datasets for sleep pattern analysis may include EEG, EOG, EMG, and often additional channels such as ECG. The physiological signals 205 which may include pre-processed physiological data may further be used to create labeled datasets for training models. The dataset for the training of the sleep classification model may contain epochs of physiological data labeled with the correct sleep stage, which may be determined by experts through manual scoring. In some instances, unsupervised techniques such as clustering techniques e.g., k-means clustering, hierarchical clustering, or Gaussian mixture model may be utilized to categorize each segment of the physiological signals 205.

The output of the sleep analyzer 305 may be a sleep score, microsleep detection results, arousal detection results or a hypnogram categorizing the sleep hours into various stages such as awake, REM, and Non-REM. The output may also include the mean or maximum time between arousals or the fractions of arousals resulting in the overall quality of the sleep. The physiological signals 205 along with the output of the sleep analyzer 305 are processed into feature sets and fed into an engagement analyzer 310.

The engagement analyzer 310 evaluates and interprets the level of engagement and attentiveness of the subject or driver in an activity, task, or environment. The engagement analyzer 310 uses predictive algorithms to anticipate future changes in engagement based on current and historical data and analyzes patterns over time to identify trends in user engagement, helping to predict when focus of the subject might wane. In another instance, the engagement analyzer 310 adjusts the difficulty or presentation of tasks based on the user's current level of engagement to maintain or improve focus. In some other instances, neural signals and/or eye gazes may be used to predict the extent to which a subject is attending to a situation. In some situations, recordings from one or more EEG electrodes are used to assess the power within the one or more frequency bands of the EEG signals. The physiological signals 205 and the results of the engagement analyzer 310 are processed to extract a set of features.

In some instances, the engagement analyzer 310 may present the subject with a set of tasks which can be both visual and/or auditory and assess the engagement level based on the physiological signals 205 corresponding to the response of the subject. The engagement assessment may occur before the subject begins operating the vehicle 125 and/or at one or more points while a driver is operating the vehicle 125.

The variety of features or feature sets (also referred herein as a set of features) may be assessed to predict attentiveness and engagement levels while driving the vehicle 125. The output of the engagement analyzer 310 may be a collective engagement score, engagement level or a probability value, and/or a truth value (e.g., pass or fail and/or true or false). The result of the engagement analyzer 310 is utilized by an engagement monitor 315 for further processing and vehicle-control conditioning.

The engagement monitor 315 takes physiological signals 205 and the output of the engagement analyzer 310 to continuously assess the subject and to detect any changes in focus, alertness or participation using various pattern recognition methods. Engagement is monitored using brain waves obtained from the physiological signals 205. In addition, the engagement may also be monitored based on the blink count or frequency that can be obtained using the capacitively coupled sensors or using the camera recordings. If the subject appears to be drowsy or less engaged, the engagement monitor 315 can conduct one or more actions to adapt vehicle control. In some embodiments, the engagement assessment conducted by the engagement analyzer 310 may be used to control a threshold of when various driving features are engaged or disengaged. For example, if the duration of sleep is lower, the reliable auto-control driving feature (or auto-pilot feature) may activate sooner than otherwise.

In some other embodiments, the control of the vehicle 125 may not be surrendered until the time when the subject passes the engagement assessment. The engagement monitor 315 may also identify specific events or conditions (e.g., drowsiness, distraction) that indicate a decrease or loss of engagement. Similarly, the engagement monitor 315 may also compile and present engagement metrics, such as attention span, reaction time, and level of participation, in a user-friendly format, providing a detailed analysis of the performance of the subject in relation to engagement of the subject. The vehicle-control conditioning may be evaluated (for example) on the wearable device, at the vehicle 125, etc. As another example, the device may include a smartwatch.

Based on the engagement monitor 315 results, various vehicle-control actions may be performed which may be implemented by a vehicle controller 320. The one or more actions to control the vehicle 125 may include transitioning the vehicle 125 to the self-driving mode, pulling over the vehicle 125 to a side of a road, or setting a limit on a speed of the vehicle according to the restedness level.

If a condition for a task assigned by the engagement analyzer 310 is not satisfied, the vehicle controller 320 may forward instructions to refuse to start or move the vehicle 125. Similarly, if a vehicle is in motion and the task is not satisfied, a vehicle with automated driving may be instructed to self-park, administer another test, and/or transition into a fully autonomous driving mode. The vehicle controller 320 may also generate alerts or feedback to the subject when engagement levels fall below a specific threshold, prompting corrective actions (e.g., taking a break, refocusing).

In some embodiments, the subject wears a device prior to entering the vehicle 125 and the device may be configured to collect prior sleep data of last night or last 24 hours. In some other instances, the device may be configured to include program code that, when executed, evaluates sleep stages using the sleep classification model. The device worn by the subject may include an EEG sensor and a transmitter which could be used to continuously transmit single-channel EEG data of the subject to the sleep analyzer 305. The wearable device may also connect with the vehicle 125 or the computing device 115. The sleep analyzer 305 may directly access the one or more database(s) 120 and obtain the sleep data of the subject. The sleep data may include an hourly sleep score, intervals detected between arousals, average sleep duration, and/or a hypnogram. The sleep score can be a numerical value representing the overall quality of sleep, considering factors like duration, depth, and consistency of sleep cycles. The arousal detection results may include instance records where the subject briefly wakes up or is disturbed during sleep, which can negatively impact sleep quality. The hypnogram can be a visual representation of sleep stages over time, categorizing sleep into various phases such as periods when the subject is fully awake, REM stage, and Non-REM including, slow wave sleep (SWS), stage I, and stage II sleep. The hypnogram may further includes microarousals, microsleeps, etc.

EEG signals may be characterized by different frequency bands, each associated with specific cognitive and physiological states. For example, Stage 3 of non-REM sleep may be associated with the Delta band characterized by slow waves (or frequencies) with high amplitudes. Similarly, Gamma band may be characterized by high frequencies of EEG signals with low amplitudes, associated with high-level information processing and perception such as REM sleep. The extracted set of features and/or derived features associated with these one or more frequency bands may include e.g., Delta power, Gamma power, standard deviation, maximum amplitude, Gamma power/Delta power, time derivative of Delta, and time derivative of Gamma power/Delta power. The set of features may further include features that are derived using component analysis (e.g., PCA, ICA) from a spectrogram or a normalized spectrogram of the one or more frequency bands of the one or more physiological signals for the given time interval or the segment of the physiological signals 205.

Raw signal data from the physiological signals 205 can be adjusted to a desired frequency range which can be used in the analysis of a variety of raw signal data. For example, frequency range information within EEG data for a subject from a period of sleep can be used to determine sleep states. Similarly, EEG signal analysis can be useful for customized analysis including assessing sleep quality, detecting pathological conditions, and determining the effect of medication on sleep states.

In some embodiments, the sleep analyzer 305 may predict future trends in the sleep patterns based on the near real-time physiological data and the historical sleep records. The sleep analyzer 305 generates outputs like a sleep score, arousal detection results, and a hypnogram that categorizes sleep into stages such as awake, REM, and Non-REM including, slow wave sleep (SWS), stage I, and stage II sleep. By analyzing sleep quality, duration, and patterns, it also computes metrics like the mean time between arousals. The output of the sleep analyzer 305, along with the physiological signals 205, can be fed into an engagement analyzer 310. The engagement analyzer 310 may assess how sleep quality impacts the subject daytime engagement and alertness and that assessment may allow for proactive interventions to maintain performance and safety.

In some instances, the subject's engagement is assessed by presenting a task upon entering the vehicle 125. The engagement assessment may occur before the subject begins operating a vehicle and/or at one or more points while a driver operates a vehicle. The engagement assessment may also be performed when the subject is not engaged with the vehicle 125 or while the vehicle 125 is in self-driving mode. The assessment may be used to control the threshold of when various driving features are engaged or disengaged. For example, if the duration of sleep is lower, a reliable auto-control driving feature may activate sooner than otherwise. As another example, a maximum speed may be more tightly constrained if the quality of sleep (e.g., as assessed in terms of sleep-stage distribution) is lower than normal for a given subject or population.

The engagement analyzer 310 may present the subject with a plurality of audio/video cues and/or tasks. The tasks may include (for example) requesting that the subject (upon inferring that the subject has entered a vehicle, using, for example, a signal from a weight sensor) provide a responsive action that may be detected by a device disclosed herein. The task may request that a driver attend to a given object (e.g., a depicted object presented at one location versus another depicted object presented at another location). The given object may be projected onto a display in the vehicle 125, such as a windshield or dashboard.

In another instance, the task may request the subject to attend to a specific one of multiple presented visual objects. To illustrate, two dots may be presented-one above the other and with differing colors. An instruction may be presented via text or audio signal that identifies one of the dots (via a relative position or color) to which a driver is to attend or imagine (or to stop attending or imagining). Various physiological signal measurements may be used to assess whether and/or the extent to which a driver accords with the instructions. For example, ocular, muscular, or neural signals may be used to assess whether, an extent to which, and/or how quickly the subject accorded with an instruction.

Based on the response of the subject, an engagement score or engagement level may be produced, which can then be compared with a predefined threshold value or a personalized threshold value of engagement. The outcome of comparing the engagement score with the threshold value decides the amount of control of the vehicle 125 given to the subject.

The engagement monitor 315 performs a continuous assessment of the engagement state in addition to the physiological state of the subject by getting the real-time output of the engagement analyzer 310 and the physiological signals 205.

In some embodiments, if the engagement score/level of the subject falls below the threshold engagement value, the engagement monitor 315 may generate various instructions to the vehicle controller 320, such as pulling-over, switching the vehicle to auto-pilot, generating an alert, notifying the subject to refocus or take a break, and/or instructing the engagement analyzer 310 to reconduct the engagement assessment of the subject.

In some other instances, if the vehicle 125 has been in auto-pilot mode for some period of time and the subject requests to reengage, the engagement monitor 315 may instruct the engagement analyzer 310 to conduct some assessments. The engagement monitor 315 may also forward instructions to the vehicle controller 320 to keep the vehicle 125 in self-driving mode until the subject passes the engagement assessment. Following the results from the engagement analyzer 310, the engagement monitor 315 may either fully permit the subject to operate the vehicle 125 or determine the extent to which control can be allowed.

Figure 4:
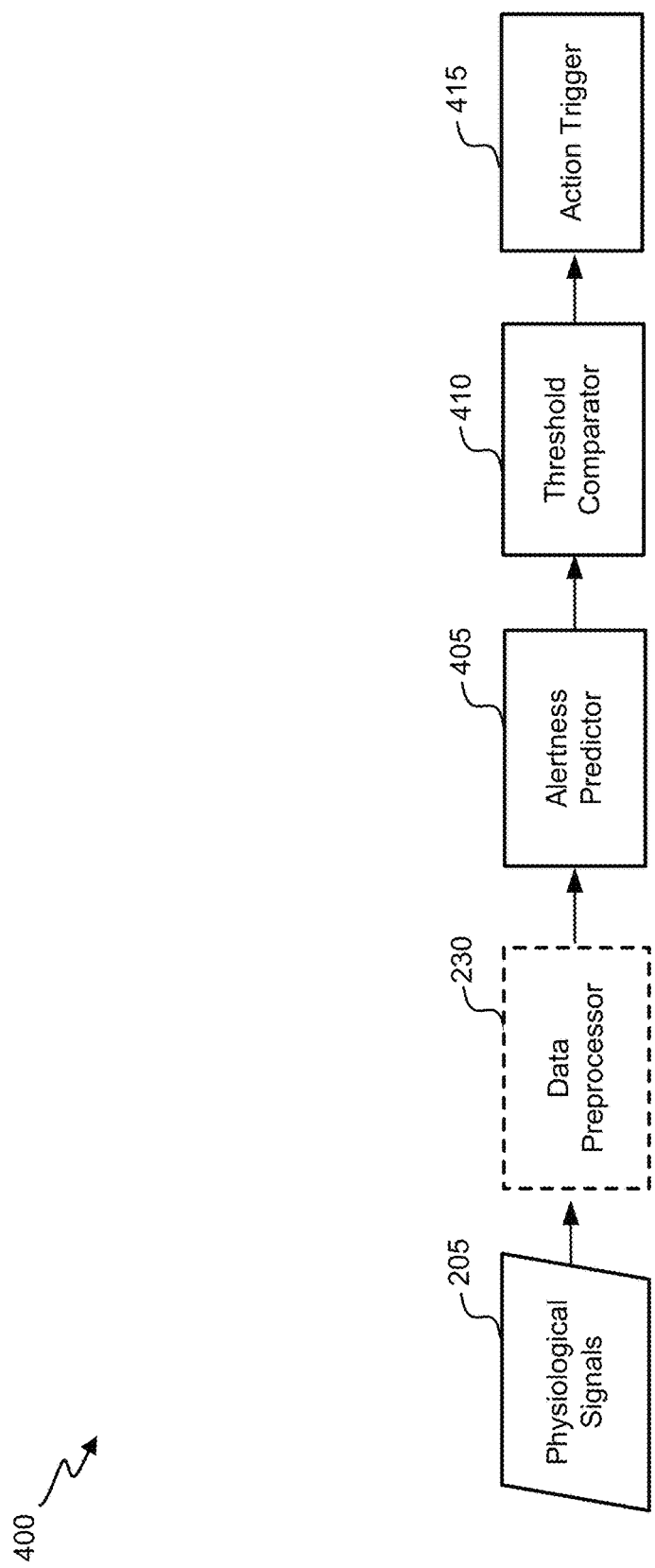
FIG. 4 shows an example implementation of an alertness prediction of a subject in real-time based on the physiological signals.

FIG. 4 shows an example implementation of an alertness prediction of the subject in real-time based on the physiological signals. The physiological signals 205 obtained from the sensors embedded in the sensing patch 100-B and/or the headrest 140 can be processed and converted into physiological features by passing through the data preprocessor 230. The extracted physiological features may then be fed into an alertness predictor 405. The variety of features or feature sets may be assessed using a criterion to predict attentiveness and engagement levels during driving the vehicle 125.

The alertness predictor 405 may comprise of an alertness prediction model. The alertness prediction model may include one or more machine learning models. These models analyze data such as EEG, EOG, EMG, MEG, heart rate, and other biometric indicators to assess and forecast the alertness of the subject. The alertness prediction models may include but are not limited to support vector machines (SVM), random forest (RF), and artificial neural networks (ANNs) which can model complex relationships between inputs such as physiological signals and outputs such as alertness levels. Deep learning variations of ANNs, such as convolutional neural networks (CNNs) and recurrent neural networks (RNNs), can capture temporal patterns and nonlinear relationships in the data. Time-series analysis models such as long short-term memory (LSTM) networks and hidden Markov models (HMMs) may also be utilized.

Additionally, various statistical models or regression techniques such as linear regression can be used to predict the alertness level. The output of the alertness predictor 405 may be a collective alertness score, or an alertness level which may be fed to a threshold comparator 410.

The attentiveness threshold value may be generic or personalized (i.e., subject-specific). Population-based thresholds or subject-specific thresholds may be used to compare and determine the alertness of the subject. The result of the threshold comparator 410 can be further utilized by an action trigger 415 for taking situation-specific actions and vehicle-control conditioning. The action trigger 415 may take one or more actions based upon the output of the threshold comparator 410 such as in the case of drops in predicted alertness, the action trigger 415 may initiate vehicle controls, such as lowering a temperature, increasing a fan speed, increasing a cabin light, increasing an audio volume, initiating automated driving, pulling the vehicle 125 over to stop, or generating visual or auditory alerts on the user device or on the console of the vehicle 125. Additionally, the action trigger 415 may also provide the real-time statistics of the subject such as seatbelt usage, driving speed, distraction level, fatigue indicators on the user device.

In some embodiments, power in a Gamma band of current or recent EEG recordings is used to predict a driver's alertness. Similarly, microsleeps may be detected using EEG recordings and/or drops in attentiveness may be inferred based on camera recordings or capacitively coupled electrodes or sensors embedded in the headrest.

In some embodiments, constraints may be imposed a degree to which a person can control a vehicle (e.g., via motor signals, EEG signals, EOG signals, EMG signals, MEG signals, etc.) irrespective of whether it is detected that the user is looking ahead (e.g., towards a road in front of a car).

In some other embodiments, if the attentiveness value of the subject is predicted to be above the threshold value, the action trigger 415 may allow the subject to fully engage or take control of the vehicle 125.

Figure 5:
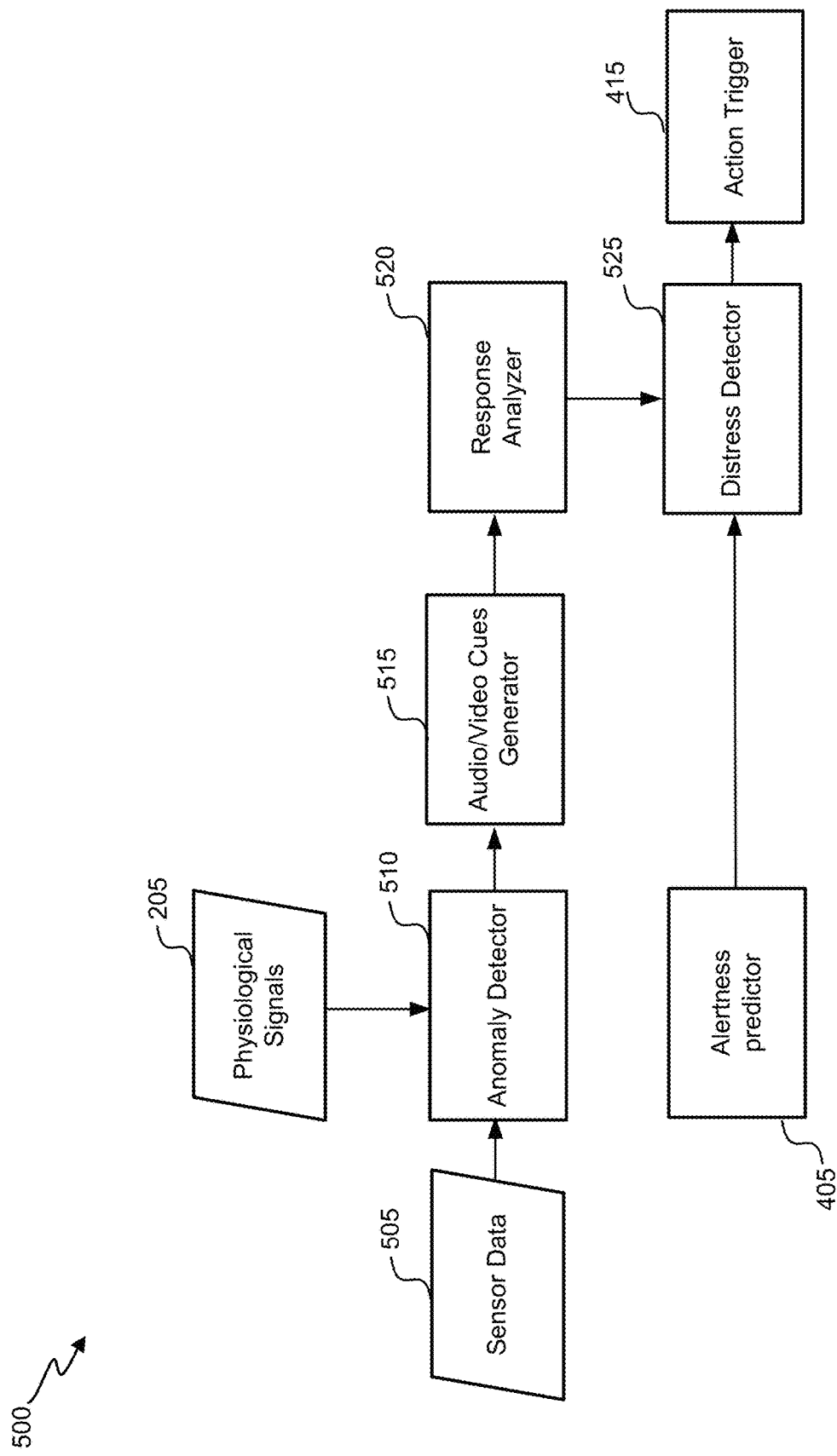
FIG. 5 shows an example implementation of a detection of a distress situation based on sensor data and the physiological signals in accordance with some embodiments of the present disclosure.

FIG. 5 shows an example implementation of a detection of a distress situation based on sensor data 505 and the physiological signals 205 in accordance with some embodiments of the present disclosure. The physiological signals 205 along with the sensor data 505 are fed into an anomaly detector 510 which may detect a signal anomaly indicative of a crash event or a health incident. The sensor data 505 may include measurements from an accelerometer in the vehicle 125, an impact-sensor in the vehicle 125, a pressure sensor in the vehicle 125, or the accelerometer in the user device owned by the subject in the vehicle 125, etc.

The anomaly detector 510 may monitor and analyze the physiological signals 205 and the sensor data 505 at high frequencies to detect anomalies and for timely detection and response. The anomaly detector 510 may utilize one or more anomaly detection techniques to identify patterns in data (e.g., in physiological signals or features) that deviate from recent patterns or baseline data and/or that indicate a crash event or a distress situation. Anomaly detection techniques are particularly useful in fields like medical diagnostics, where detecting unusual patterns can indicate potential problems. For example, an EEG signal anomaly representing abnormal brain activity can be detected using these techniques. Anomaly detection techniques may include but are not limited to statistical methods (e.g., Z-score, Grubbs test), machine learning techniques such as supervised learning (e.g., SVM, NNs), unsupervised learning (e.g., clustering), deep learning techniques (e.g., convolutional neural networks CNNs, recurrent neural networks RNNs, autoencoders), or time-series based analysis such as moving average, auto-regressive models. Threshold-based detection may also be utilized to set thresholds for specific metrics to trigger alerts when these thresholds are exceeded. The anomaly detector 510 may also correlate multiple sensor readings to distinguish between false positives and true anomalies. The vehicle 125 may also include redundant sensors to make the anomaly detector 510 functional even if one or more sensors fail.

Upon the detection of a signal anomaly, such as unusual physiological signals or sudden changes in vehicle dynamics (like a sharp deceleration that might indicate a crash), the anomaly detector 510 may potentially trigger an audio/video cues generator 515. The audio/video cues generator 515 may visually or audibly present the subject with a question or prompt through the infotainment system (or vehicle display device) or a specialized interface of the vehicle 125, to which the subject may respond. The responses provided by the subject can be recorded and analyzed by a response analyzer 520.

In some instances, the anomaly detector 510 may continuously monitors the physiological signals 205 of the subject and may detects a sudden change, including changes in physiology and/or cognition. In some instances, upon detecting a distress situation or a sudden change in physiology, the vehicle 125 may automatically drive to a nearest medical center, unless instructed by the driver not to do so. Similarly, upon detecting a distress situation, one or more alert signals may be generated automatically. The one or more alert signals may be transmitted to emergency services or caregivers if the subject did not interrupt or cancel the one or more alert signals within a specific time period.

In one example, a drop in the heart rate of the subject combined with a sharp turn of the steering wheel, which could indicate the subject may be losing consciousness. The audio/video cues generator 515 may display a message on the dashboard screen, the console, and/or the windshield asking, "Are you feeling unwell?" or "Do you need assistance?". Simultaneously, an audible alarm may sound to get the driver's attention.

In another example, if the anomaly detector 510 senses erratic driving behavior potentially due to drowsiness, the audio/video cues generator 515 may be triggered to audibly ask, "Are you awake?" or "Would you like to pull over for a break?". The system can use the speakers of the vehicle to deliver this message and grab the attention of the subject even if the subject is not looking at the screen. In some instances, the vehicle controller may automatically switch to self-driving mode or park the vehicle to the side of the road.

Once the driver responds in one or more ways, such as by pressing a button, giving a voice command, or interacting with the touchscreen, the response is captured and analyzed by the response analyzer 520 and fed into a distress detector 525 to determine the next course of action. The distress detector 525 takes input from the response analyzer and the alertness predictor 405 to make a more informed and accurate assessment of the driver's condition. For example, the vehicle may take an evasive maneuver that can only be interrupted, in some cases, if the driver pushes a button, etc. In the case of road rage, intoxication, or sudden change of physiology, driver may not be allowed to continue operating the vehicle, and the vehicle may, in the event of life-threatening situation, immediately go to the nearest emergency center, alert authorities, and inform the authorities about the nature of the emergency.

The response analyzer 520 provides insights into the driver's cognitive state based on their responses to prompts. For example, if the driver responds slowly, incoherently, or not at all, it could indicate confusion, fatigue, or a medical issue. The alertness predictor 405 continuously evaluates the driver's alertness based on physiological signals (e.g., EEG, MEG, EOG, EMG) and behavioral patterns (e.g., eye movements, steering patterns). If the predictor detects a declining alertness trend, it could signal potential drowsiness or loss of focus. Combining data from the response analyzer 520 and the alertness predictor 405, the distress detector 525 reduces the risk of false positives or negatives. For instance, even if the subject provides an accustomed response, the alertness predictor 405 may still detect underlying signs of fatigue. Conversely, if the alertness predictor 405 indicates a possible issue, but the subject responds clearly and promptly, the distress detector 525 can take a more measured response. In situations where one input alone may not be enough for decision-making, utilizing both inputs may allow the distress detector 525 to activate an action trigger 415 which can take appropriate safety mechanisms with greater confidence. For example, if both inputs suggest the driver is impaired, the distress detector 525 may immediately instruct the action trigger 415 to initiate emergency protocols, such as alerting emergency services or taking control of the vehicle 125.

In some instances, if a response is not received within a defined period, the action trigger 415 may activate a speech facilitation tool to get a customized message from the subject and communicate the message to the concerned authorities. As another example, a sensor in the vehicle 125 or user device may estimate whether and/or an extent to which eye movements or eye blinks match those of unimpaired humans (e.g., in response to instructions for eye movement or blinks or at a default level).

In some embodiments, neural signatures may be evaluated to predict a state of alertness of the subject, awareness and/or health. Such an assessment may depend on power within a Gamma-band frequency range (i.e., Gamma band signal power). As another example, such an assessment may depend on changes in intensities in each of one or more frequency bands representing neural signals. As yet another example, a mobility-aid device and/or pod may include a sensor that detects a movement signature characteristic of a potential crash injury.

In some other embodiments, if the subject confirms feeling unwell, the action trigger 415 may automatically engage emergency protocols, such as slowing down the vehicle 125, pulling over to a safe spot, or calling emergency services.

In some other embodiments, if the subject does not respond or responds incoherently, indicating possible impairment, the action trigger 415 might escalate the alert, trigger more aggressive interventions (like automatic braking or steering control), or send a distress signal to nearby vehicles and emergency services.

Figure 6:
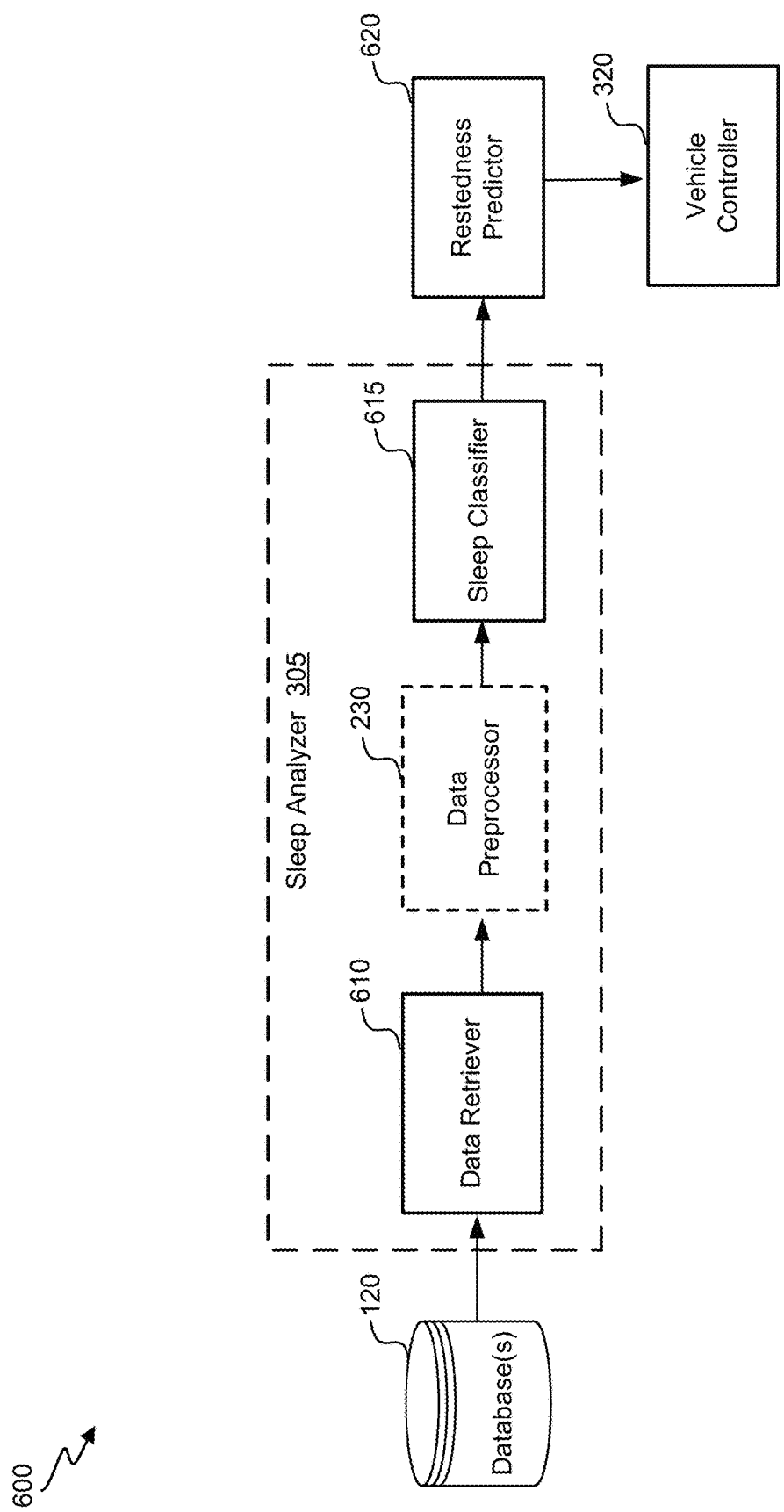
FIG. 6 shows an example implementation of a restedness prediction model and to adapt the vehicle control in accordance with some embodiments of the present disclosure.

FIG. 6 shows an example implementation of a restedness prediction model and to adapt the vehicle control in accordance with some embodiments of the present disclosure. The one or more database(s) 120 can be directly accessible by the sleep analyzer 305, which further includes a data retriever 610, the data preprocessor 230, and a sleep classifier 615.

The sleep data initially stored in the one or more database(s) 120 can extracted by the data retriever 610. The sleep data may include a wide range of physiological metrics that may provide insights into the sleep patterns and overall sleep time duration of the subject such as EEG, EOG, and EMG data. The brainwave activity obtained through EEG sensors may be used to determine the stages of sleep, including the presence of different brainwave frequencies such as Delta, Theta, Alpha, and Beta waves. The muscle activity data obtained through EMG sensors can be useful for detecting muscle tone changes during different sleep stages or identifying conditions like restless legs syndrome. The eye movement data from the EOG sensors may help distinguish between different sleep stages, particularly REM sleep, where rapid eye movement occurs.

In some embodiments, the data retriever 610 may retrieve the sleep data of the subject from the last 24 hours or near real-time to make the restedness prediction more precise and accurate. Once the sleep data and metadata is retrieved, it may be transmitted to the data preprocessor 230. The meta data may include the duration of the sleep data, recording date, time, and the like. The data preprocessor 230 can further prepare the sleep data for subsequent analysis. This preprocessing step may involve cleaning the data to remove noise and artifacts. The data preprocessor 230 then normalizes the data to maintain consistency across different recordings or individuals. Following normalization, the data is segmented into time windows or epochs, allowing for detailed analysis of each segment. These segments can then be transformed as appropriate, and features may be extracted, highlighting important physiological indicators relevant to sleep stages, which may be utilized in further downstream analysis.

Following preprocessing, the refined sleep data is fed into the sleep classifier 615. The sleep classifier 615 may analyze the incoming preprocessed sleep data by dividing it into smaller, manageable time-window frames, such as intervals of 2 minutes or 5 minutes. These time windows, often referred to as "epochs," represent discrete segments of sleep data that can be analyzed individually to determine the sleep stage occurring within each epoch. The sleep classifier 615 may categorize each epoch into one of several predefined sleep stages, including Awake, REM (Rapid Eye Movement), and Non-REM (Non-Rapid Eye Movement) stages including, SWS, stage I, and stage II. The sleep classifier 615 may also detects microarousals and/or microsleeps. Each identified sleep stage within an epoch can be assigned a corresponding sleep level, thereby classifying the sleep data into distinct categories that reflect the sleep patterns of the subject over time. The sleep classifier 615 may also assess additional parameters, such as the duration of each sleep stage, transitions between stages, and the overall architecture of the sleep.

The output of the sleep classifier 615, which may include a comprehensive analysis of the sleep patterns, detailed information on sleep stage duration, and the distribution of sleep stages across the monitored period, can be subsequently forwarded to a restedness predictor 620. The restedness predictor 620 utilizes the classified sleep data to evaluate the overall quality and sufficiency of the sleep quality of the subject.

The restedness predictor 620 assigns a restedness level based on the analysis conducted by the sleep classifier 615. This restedness level can be a quantifiable metric that reflects the readiness of the subject to engage in activities requiring cognitive focus and alertness, such as operating a vehicle. The restedness predictor 620 may consider factors such as the amount of time spent in restorative sleep stages (e.g., REM and deep Non-REM), the frequency and duration of awakenings, and the consistency of the sleep patterns over multiple sleep cycles.

The output of the restedness predictor 620, which evaluates the restedness level of the subject based on sleep data, can be transmitted to the vehicle controller 320. The vehicle controller 320 can make real-time decisions based on the restedness level of the subject. If the restedness predictor 620 indicates that the subject is well-rested, the action trigger may allow the subject full control over the vehicle 125. Conversely, if the restedness level is low, indicating fatigue, the vehicle controller 320 may limit the control of the subject for safety reasons. Additionally, the vehicle controller 320 can display relevant statistics of the subject, such as their current alertness level, sleep quality, or predicted engagement on a user device, such as the dashboard, the user device, and/or the windshield. This ensures that both the driver and the automated systems of the vehicle 125 are aware of the condition of the subject and can take appropriate actions to maintain safety.

In some other embodiments, based on the results of the restedness predictor 620, various vehicle-control actions may be performed which may be implemented by the vehicle controller 320. Such actions can be refusing to give the subject control of the vehicle 125, self-parking, assigning more engagement assessment tasks by referring the system to the engagement analyzer 310 and/or withholding the control of the car until the subject passes the assessment assigned the engagement analyzer 310. If a condition for a task assigned by the engagement analyzer 310 is not satisfied, the vehicle controller 320 may forward instructions to refuse to start or move the vehicle 125. Similarly, if a vehicle is in motion and the task is not satisfied, a vehicle with automated driving may be instructed to self-park and/or administer another test and/or transition into a fully autonomous driving mode. The vehicle controller 320 may also generate alerts or feedback to the subject when engagement levels fall below a specific threshold, prompting corrective actions (e.g., taking a break, refocusing).

In some other embodiments, the restedness predictor 620 may continuously monitor or predict the restedness level of the subject based on the physiological signals, features, blink rate, or microsleeps. For instance, if the restedness predictor 620 confirms drowsiness or a low restedness level, the action trigger 415 may begin to generate frequent reminders, suggesting longer rest breaks, or adapt the vehicle control such as pulling over the vehicle. In some instances, if the autonomous mode is not fully independent of the subject (or human driver) and the subject is not rested (e.g., low restedness level), not paying attention, or is otherwise impaired, then the vehicle may automatically pull over and remain on the side of the road until the driver (or the subject) has regained capacity.

Figure 7:
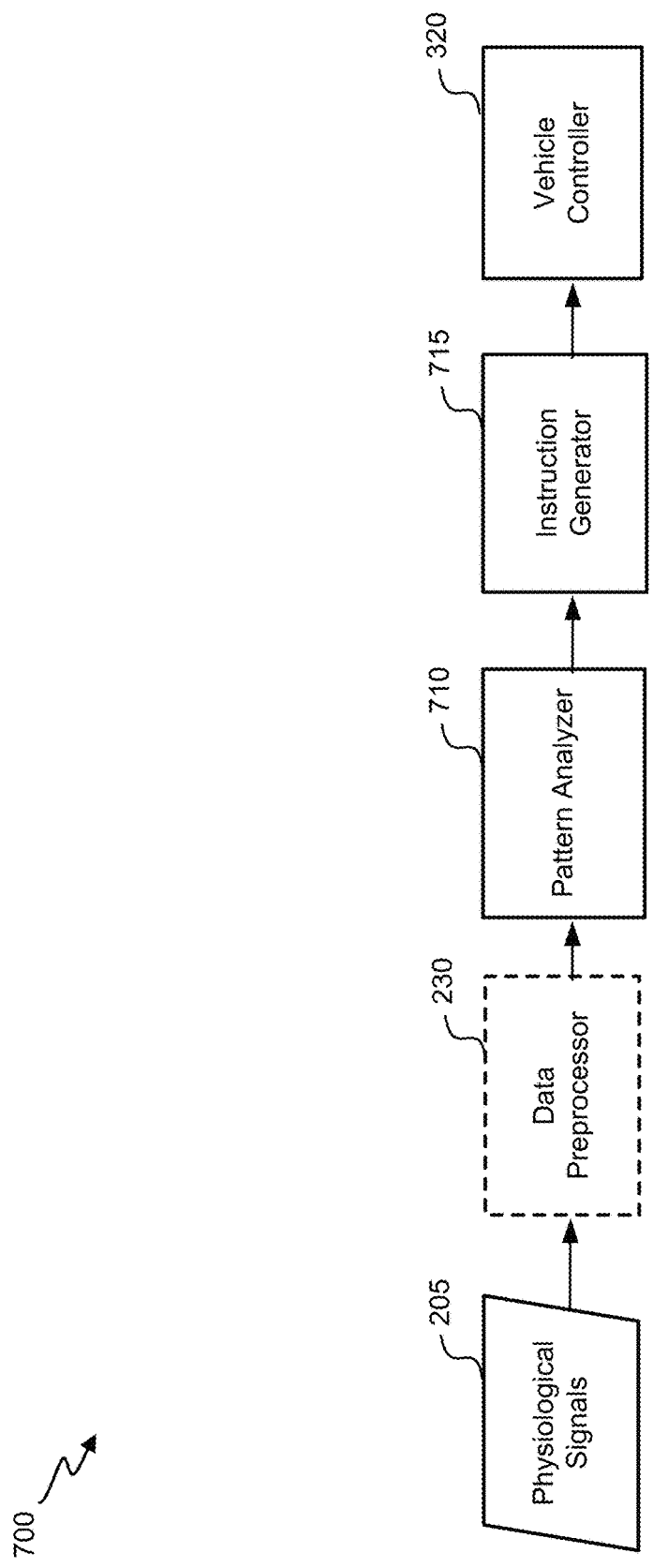
FIG. 7 illustrates an example overview of a system to control a pod, a mobility-aid device, or the vehicle by using the physiological signals in accordance with some embodiments of the present disclosure.

FIG. 7 illustrates an example overview of a system to control a pod, a mobility-aid device, or the vehicle by using the physiological signals in accordance with some embodiments of the present disclosure. The vehicle 125 may include vehicles such as cars, vans, trucks, planes, etc. The mobility-aid device can be a wheelchair, personal transport device and/or an assistive mobility pod that may enhance the mobility of a subject which may want to communicate or control the wheelchair through neural or physiological signals. The mobility-aid device may be customized, motorized model that may incorporate a range of methods for both mobility and communication and allow the subject to control the environment and move independently through the physiological signals. In some instances, the vehicle 125 may be configured to receive, engage and secure the mobility-aid device into the vehicle 125. As one example, the vehicle 125 may be configured to engage and move the mobility-aid device (e.g., secure via one or more latches) into a position within a vehicle, where the pod can then be secured (e.g., across a transportation session via one or more locking mechanisms). The physiological signals 205, which may include EEG, MEG, EOG, and EMG signals, are acquired from the subject and transmitted to the data preprocessor 230.

The data preprocessor 230 comprises multiple units designed to process the raw physiological signals for subsequent analysis. These units may include, but are not limited to, the preprocessing 210 that performs initial signal cleaning to remove noise and artifacts; the segmentation 215 that divides the continuous signal data into discrete time windows or epochs; the transformation 220 that applies mathematical operations to convert the signals into a more usable form; and the feature extraction 225 that identifies and extracts relevant physiological features from the transformed data.

The signals may be processed to detect, for example, neural-signal power in a gamma band, direction and/or velocity of eye movements, intensity of neural features indicative of intention, etc. Any such signal feature (or combination thereof) or other biosignals (may be transformed into movement instruction for driving the vehicle 125, moving the pod, or moving the mobility-aid device. Further, the vehicle, pod, or mobility-aid device may be configured such that biosignals of the subject can be used to determine whether and when a user intends to control or disengage with the vehicle, pod, or mobility-aid device. Such signals may be based on, for example, neural signatures (e.g., Gamma band signal power, alpha band signal power), ocular signatures such as eye-blink signatures or eye-movement signatures, and muscular signatures (e.g., jaw-movement signatures), etc.

The processed physiological features may then be input to a pattern analyzer 710. The pattern analyzer 710 can be configured to analyze the physiological and neural features, discern the intentions of the subject, and generate a feature list that catalogs every single detected neural signature. Each segment of the data is labeled with a corresponding movement or intention. The pattern analyzer 710 may utilize a machine learning model for classifying and mapping the set of features against intended movements. A machine learning model may be trained using the labeled data to recognize patterns associated with each intended movement. The machine learning model may be trained on a large dataset collected from individuals which capture common or standard patterns across subjects. In some instances, a pre-trained population-based model may be adapted to the specific subject by fine-tuning with a smaller set of subject-specific data, which may lead to more precise intention mapping. Each intended movement can be mapped corresponding to the one or more physiological signals in the feature list. The feature list represents a comprehensive record of the neural signals, which may include various characteristics such as neural-signal power in specific frequency bands (e.g., gamma band), direction and velocity of eye movements, and intensity of neural features indicative of the subject's intentions. The feature list generated by the pattern analyzer 710 may be subsequently input into an instruction generator 715. The instruction generator 715 maps each neural signal or combination of signals to a corresponding movement instruction, enabling the translation of the subject's neural activity into actionable commands. The feature list of neural signals and their corresponding movement instructions may be reconfigurable and continuously updated to reflect changes in the neural patterns or intentions of the subject.

In some instances, eye movements and/or blinks from EOG signals may be mapped to the movement instructions through EOG signals. EOG signals corresponding to upward eye movements may be mapped to an upward movement instruction for the vehicle pod or the mobility-aid device by the instruction generator 715. Similarly, EOG signals corresponding to a leftward eye movement may be mapped to leftward movement instruction, and a double blink may be mapped to a braking instruction for the vehicle pod or the mobility-aid device. In other embodiments, EOG signals corresponding to upward-eye movements may be mapped to forward movement instructions for the vehicle pod or the mobility-aid device.

In some other instances, EMG signals indicative of jaw movements may be mapped to movement instructions for the vehicle pod or the mobility-aid device by the instruction generator 715. EMG signals corresponding to upwards jaw movements may be mapped to upward movement instructions, and EMG signals corresponding to a leftward jaw movement may be mapped to a leftward movement instruction. Similarly, EMG signals corresponding to an upward jaw movement may also be mapped to a forward movement instruction for the vehicle pod or the mobility-aid device.

In some other embodiments, EEG signals that represent neural signals (e.g., from the frontal cortex, prefrontal cortex, motor cortex, etc.) may be mapped to movement instructions for the vehicle pod or the mobility-aid device. A training process may be used to associate each of multiple pod-movement intentions with a neural-signal signature and/or one or more neural-signal features. Such association may be learned by collecting a training set that includes, for each of multiple types of movement, a set of EEG signals (collected from a single user or multiple users) that can be generated in response to the subject being instructed to envision moving in accordance with the type of movement. A machine-learning model (e.g., a neural network, a classifier, a transformer model, a deep neural network, a model that uses a component analysis, etc.) can then be trained to learn features of EEG signals that may be predictive of each of the multiple types of movements. The trained model may be specific to one subject or applicable to multiple subjects. In some instances, the model can first be trained using a training data set associated with multiple subjects and then finetuned using data associated with a specific subject. After training the model, EEG signals can be processed in real-time to detect various movement instructions corresponding to movements for the vehicle pod or the mobility-aid device.

Based on the instructions generated by the instruction generator 715, the vehicle 125, mobility pod, or mobility-aid device can be controlled or moved according to the intentions of the subject. The vehicle controller 320 may execute the one or more instructions that are generated by the instruction generator 715 to control the behavior of the vehicle 125, the pod, or the mobility-aid device. The movement of the vehicle 125, the pod, or the mobility-aid device may be controlled by the vehicle controller 320 by controlling the one or more motors or actuators. For example, the system may process signals to detect neural-signal power in the gamma band, analyze the direction and/or velocity of eye movements, or assess the intensity of neural features indicative of the intention to move in a specific direction. The resulting movement instructions are then executed by the vehicle 125 or device, allowing for responsive control based on the near real-time physiological and neural signals.

Figure 8:
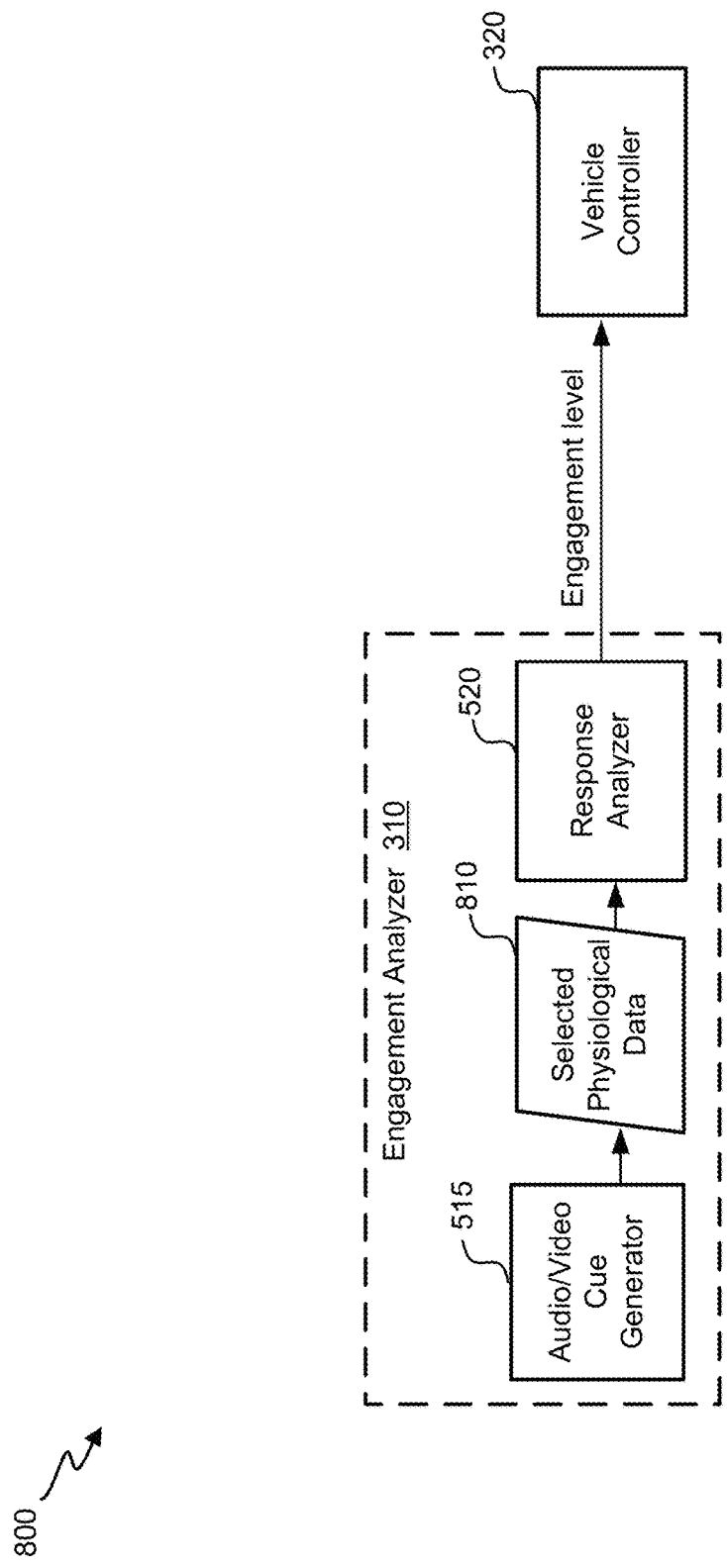
FIG. 8 shows an example implementation of an engagement analyzer of FIG. 3 to assess an engagement level of the subject in accordance with some embodiments of the present disclosure.

FIG. 8 shows an example implementation of an engagement analyzer of FIG. 3 to assess an engagement level of the subject in accordance with some embodiments of the present disclosure. The engagement analyzer 310 evaluates and interprets the level of engagement and attentiveness of the subject or driver in an activity, task, or environment. The components of the engagement analyzer 310 may include, but are not limited to, the audio/video cues generator 515, selected physiological data 810 and the response analyzer 520.

The audio/video cues generator 515 may visually or audibly present the subject with a question or prompt through the infotainment system or a specialized interface of the vehicle 125, to which the subject may respond. These questions or prompts may include audio prompts, visual signals, or a combination thereof, tailored to assess the current cognitive and physiological state of the subject before driving or during the fully autonomous driving mode. The stimuli are designed to elicit a specific response from the subject, allowing the system to gauge the level of attention and engagement of the subject. For example, the generator may present a series of questions, prompts, or scenarios requiring the input or reaction of the subject. Following the presentation of audio and/or visual cues, the selected physiological data 810 of the subject are collected. These physiological signals may have been preprocessed and identified as relevant to the cognitive engagement of the subject and can be recorded after the subject has been presented with the cues. The selected physiological data 810 may include, but not limited to, EEG, MEG, EOG, EMG and visual signals. These signals provide insight into the neural activity, eye movements, muscle responses, and overall physiological state, which are useful for determining the subject's attentiveness and cognitive engagement. The collected signals may then be analyzed and assessed by the response analyzer 520. The response analyzer 520 evaluates the responses' accuracy, timeliness, and relevance, comparing them with expected or normative benchmarks. The response analyzer 520 may also assess the physiological signals captured in the selected physiological data 810 to determine if the cognitive state aligns with the verbal or physical responses of the subject. The response analyzer 520 provides insights into the driver's cognitive state based on their responses to prompts. For example, if the driver responds slowly, incoherently, or not at all, it could indicate confusion, fatigue, or a medical issue.

In some embodiments, if the subject is presented with a visual cue requiring a decision, the response analyzer 520 would assess in addition to the correctness of the decision, the corresponding neural and physiological signals that accompany the decision-making process. Any discrepancies between the physiological data and the subject's responses may indicate reduced engagement or cognitive impairment. The engagement analyzer 310 integrates the outputs from the audio/video cues generator 515, the selected physiological data 810, and the response analyzer 520 to form a comprehensive assessment of the engagement level.

The engagement analyzer 310 uses predictive algorithms to anticipate future changes in engagement based on current and historical data and analyzes patterns over time to identify trends in user engagement, helping to predict when the focus of the subject might wane. In another instance, the engagement analyzer 310 adjusts the difficulty or presentation of tasks based on the user's current level of engagement to maintain or improve focus. Another illustration, neural signals and/or eye gazes may be used to predict the extent to which a subject is attending to a situation. In some situations, recordings from the one or more electrodes 130a-n are used to assess the power within the one or more frequency bands. Both the selected physiological data 810 and the results of the engagement analyzer 310 are processed to extract relevant features or feature sets.

In some instances, the engagement analyzer 310 may present the subject with a set of tasks which can be both visual and/or auditory and assess the engagement level based on the selected physiological data 810 corresponding to the response of the subject. The engagement assessment may occur before the subject begins operating the vehicle 125 and/or at one or more points while a driver is operating the vehicle 125.

The variety of features or feature sets may be assessed to predict attentiveness and engagement levels before or during driving the vehicle 125 using an alertness prediction model.

The output of the engagement analyzer 310 may be a collective engagement score, engagement level, or a probability value, and/or a truth value (e.g., pass or fail and/or true or false). The result of the engagement analyzer 310 is utilized by the vehicle controller 320 for further processing and vehicle-control conditioning. When the driver alertness or engagement level falls below a threshold, the vehicle may take evasive maneuvers and park. The vehicle may proceed thereafter after the driver passes the engagement test (or Hawking test) by the engagement analyzer 310 or can spell with the system. If the driver fails, the vehicle controller may facilitate the driver to get some rest by adapting the configurations of the passenger cabin such as seat angle or seat firmness.

In some instances, the audio/video cues generator 515 may display a message on the dashboard screen, the console and/or the windshield asking, "Are you feeling unwell?" or "Do you need assistance?". Simultaneously, an audible alarm may sound by the vehicle controller 320 to get the driver's attention.

Figure 9:
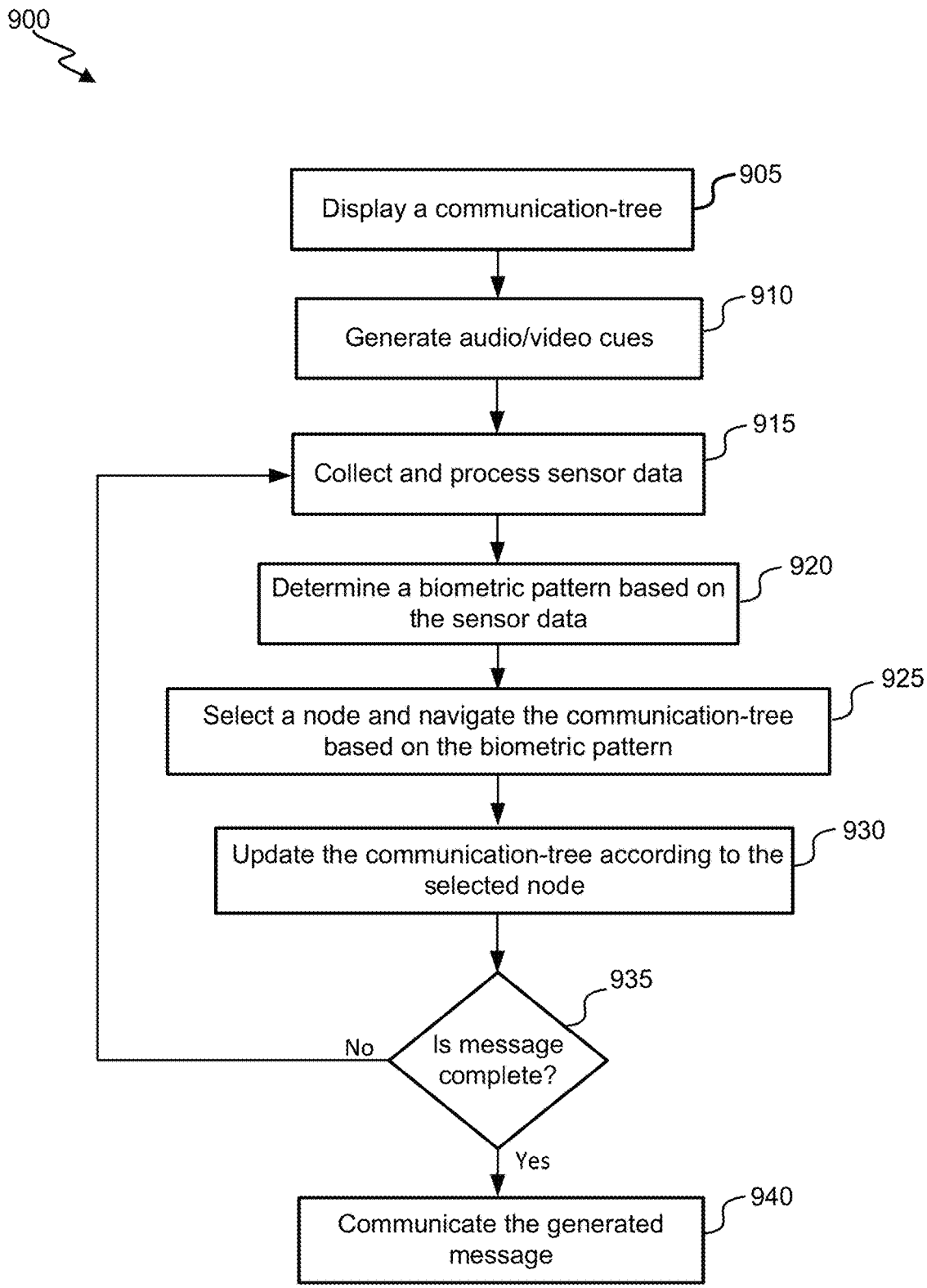
FIG. 9 shows an example flowchart of a system for generating a communication based on the physiological signals.

FIG. 9 shows an example flowchart of a system for generating a communication based on the physiological signals 205. At block 905, a communication-tree or at least a partial communication-tree may be generated and displayed to the subject sitting in the vehicle 125. The communication-tree or the partial communication-tree comprises a plurality of nodes. Each node of the plurality of nodes may represent a letter, a word, a phrase, a sentence, or a command. The communication-tree or the partial communication-tree can be displayed on a windshield of the vehicle 125, a console of the vehicle 125, a vehicle display device (or a dashboard screen), or the user device such as cell phone, smartwatch, an augmented reality/virtual reality (AR/VR) headset. The vehicle display device may further refer to touch screens that are embedded or attached to the seats of the vehicle. In some instances, the communication-tree may be displayed on the windshield by using a projector inside the vehicle 125.

In some instances, an indication of a crash event or a distress situation may be assessed. Based on the indication, one or more alert signals can be generated automatically. The one or more alert signals may be transmitted if the subject did not interrupt or cancel the one or more alert signals within a specific time period. Moreover, a speech facilitation tool may be activated that can initialize or generate the communication-tree or the partial communication-tree for the subject sitting in the vehicle. Moreover, the communication-tree or the partial communication-tree can be configured such that to include a path or a leaf node that corresponds to a request to contact emergency services in response to the indication of the crash event or the distress situation.

One or more cues can be generated to instruct the subject how to navigate through the communication-tree or the partial communication-tree, at block 910. The one or more cues may include an audio cue, or a visual cue. Audio/video cues may be presented to the subject, prompting or instructing the subject to start selecting nodes from the communication-tree.

Sensor data associated with the subject may be accessed and processed for a given time interval, at block 915. The sensor data may be comprised of the one or more physiological signals or signals from a camera (e.g., a dashboard camera or camera of the AR/VR headset). The physiological data may include but not limited to EEG, EOG, EMG, or MEG signals, may be collected and preprocessed.

At block 920, a biometric pattern may be determined in real-time based on the sensor data for the given time interval. The biometric pattern may be comprised of the neural signatures, the ocular signatures, or the muscular signatures corresponding to intentions, intended movements, or movements by the subject (e.g., of limbs, eyes, jaws etc.). By processing and analyzing the sensor data (e.g., using machine learning or pattern recognition techniques), meaningful patterns can be extracted and a signal (or the biometric pattern) corresponding to a movement or intended movements of the subject can be detected.

A node of the plurality of nodes can be selected based on the biometric pattern to navigate through the communication-tree or the partial communication-tree, at block 925. The selected node may result in generation of the word, the sentence, a message, a set of sentences, the command, or a set of commands. The command may include a delete command, the send command, a text to speech conversion command, or a language change command for the communication-tree or the partial communication-tree. In some instances, the subject may have to focus on a particular node for one or more seconds for it to be selected.

At block 930, the communication-tree or the partial communication-tree may be updated at run-time based on the selected node. The communication-tree may update according to the selected node or previously selected nodes. The previously selected nodes may correspond to the nodes that are selected from the top or root of the communication-tree until the selected node or may correspond to the nodes that are selected earlier than the selected node to generate a current communication. The communication-tree or the partial communication-tree, which is a hierarchical structure representing various decision points or options, can be dynamically adjusted based on the selection of specific nodes. Nodes in the communication-tree may correspond to different commands, actions, or choices that a control system of the vehicle 125 can communicate from the subject to the concerned authorities or execute. When a particular node is selected, the communication-tree may evolve or update by either narrowing down the available options, expanding new branches, or reconfiguring to better align with the intentions of the subject. Upon selection of a leaf node, the communication-tree may update to present the subject with more options or nodes to select in the process of completing the communication (or a message). The update may enforce that the communication-tree remains relevant and facilitating seamless interaction using the physiological signals of the subject.

Following the update of the communication-tree at block 930, the decision-making block 935 assesses if the message or the communication being constructed by the subject is fully formed and ready for execution or transmission. In some instances, the speech facilitation tool may determine whether the selected node is a leaf node or whether the selected node corresponds to a send command. Based on the determination that the selected node is the leaf node or representing the send command, outputting the communication or the message using a computing system of the vehicle 125 or the user device of the subject, at block 940. In some instances, if the message is incomplete, the speech facilitation tool may prompt the subject for additional input or guide the subject to select the remaining nodes to finalize the message. The communication or the message corresponds to the selected node (e.g., the leaf node or the send command node) and the previously selected nodes. The communication comprises one or more of alert signals, vehicle-control signals, speech signals, the message, or the command. The vehicle-control signals may include transitioning the vehicle to a self-driving mode or pulling over the vehicle to the side of the road.

In some embodiments, the subject may be disabled or have been in an accident and is unable to move the hands. However, sensors that are embedded in a headrest may then be activated, such that the driver may be able to communicate by controlling navigation through the communication-tree based on the physiological signals.

Figure 10C:
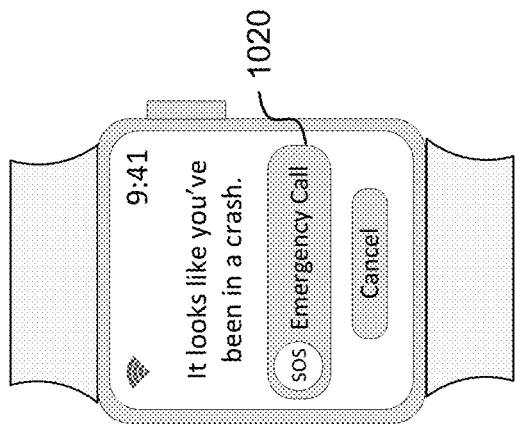
FIG. 10C shows an example interface for crash alert and emergency response management on a smartwatch.
Figure 10B:
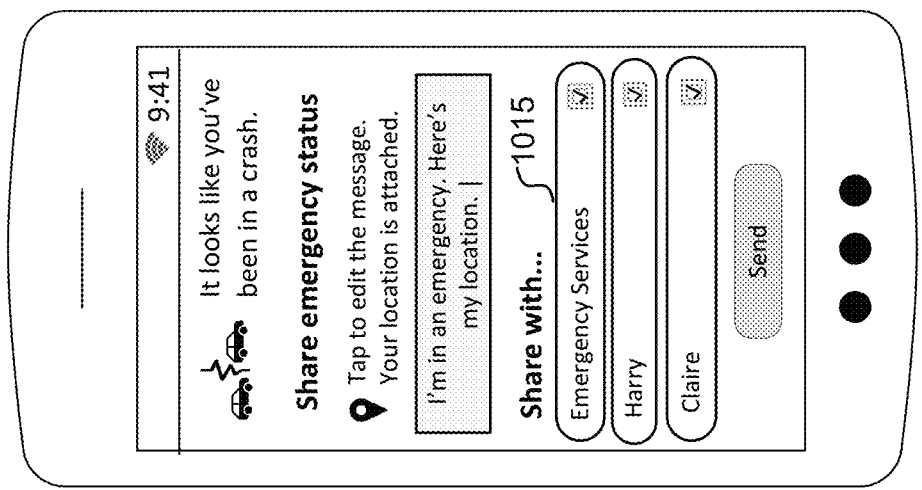
FIG. 10B shows an example interface for emergency response management on the user device.
Figure 10A:
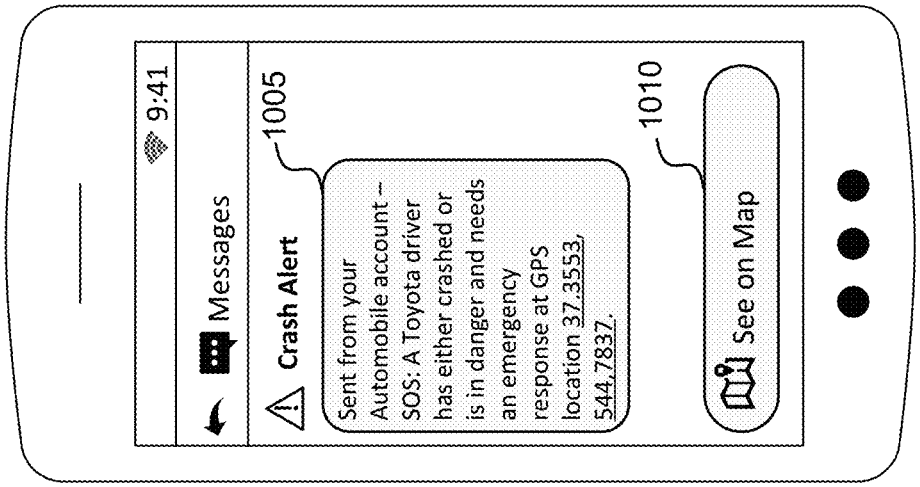
FIG. 10A illustrates an example interface for a crash alert on a user device.

FIG. 10A illustrates an example interface for a crash alert on the user device. The crash alert may be generated as the vehicle 125 detects a signal anomaly (e.g., which may be indicative of crash). The signal anomaly may be detected based on measurements from the accelerometer, the impact-sensor, the pressure sensor, or the accelerometer in the user device owned by the subject in the vehicle 125, etc. Various embodiments can relate to new techniques, methods or systems for generating alerts. Specifically, the computing device 115, such as cell phone, smartwatch, tablet, laptop or the like. The computing device 115 may provide the example interface that is configured to present the crash alert through communication 1005 along with a geolocation 1010 of the vehicle 125. The communication 1005, configured automatically, can include an inference of the crash, title, license number of the vehicle 125, an identifier of the subject, pertinent health information of the subject, and/or a combination thereof. Moreover, the geolocation 1010 attachment can calculate direct routes, thus providing precise geographic coordinates that can be used for navigation or mapping of the vehicle 125.

FIG. 10B shows an example interface for emergency response management on the user device. The example interface for emergency response management mainly includes an emergency contact list 1015 along with the communication 1005 and/or the geolocation 1010. The emergency contact list 1015 comprises of emergency service providers such as emergency medical services (EMS), police, tow service providers, fire or rescue service providers, and the like. Furthermore, the subject can also include some personal or specific contacts (e.g., family, friends, close relatives or colleagues). These contacts may be customized by the subject before or after the crash. In at least one embodiment, the emergency contact list 1015 can be configured by the computing device 115 based on the frequent communications. For the emergency response management, the communication 1005 and/or the geolocation 1010 can be sent to the emergency contact list automatically by the computing device 115 of the subject or the vehicle 125.

In another embodiment, additionally or alternately, the subject may experience a health incident. The driver may call for some assistance as the subject may be unable to move either arm or hand to reach the user device (e.g., smartphone). Therefore, the communication 1005 can be monitored by the passenger sitting next to the subject in the vehicle 125. The passenger can compile the communication 1005 and then send it to the emergency contact list 1015. Some embodiments of the disclosure relate to transforming physiological signals into communication that are transmitted by the vehicle 125 itself. The vehicle 125, the pod, or the mobility-aid device may be in communication with the computing device 115 via a short-range connection (e.g., Bluetooth). Thus, even if wide-range connections are impaired for the vehicle 125, pod, or mobility-aid device, the communication 1005 can be sent. Even if the computing system of the vehicle 125 is not operational, the computing system of the pod or the mobility-aid device or user device can be used to support the communications 1005.

FIG. 10C shows an example interface for crash alert and emergency response management on a smartwatch. The smartwatch can be equipped with a combination of sensors that can work together to provide physiological signals in real-time. These physiological signals can be used to predict the likelihood of crash and generate alerts on the example interface. The interface presents the option to potentially contact the emergency service provider by making an emergency call 1020 and/or notify the contacts in the emergency contact list 1015. In another embodiment, the subject may experience the health incident and/or the subject may have been in the crash. Therefore, the subject may call for some assistance, though depending on the circumstance, the subject may be unable to seek such assistance. Thus, the interface can automatically communicate with the emergency service providers as the subject may be unable to move either arm or hand to reach the user device (e.g., smartphone) or escape from the vehicle 125.

Figure 11:
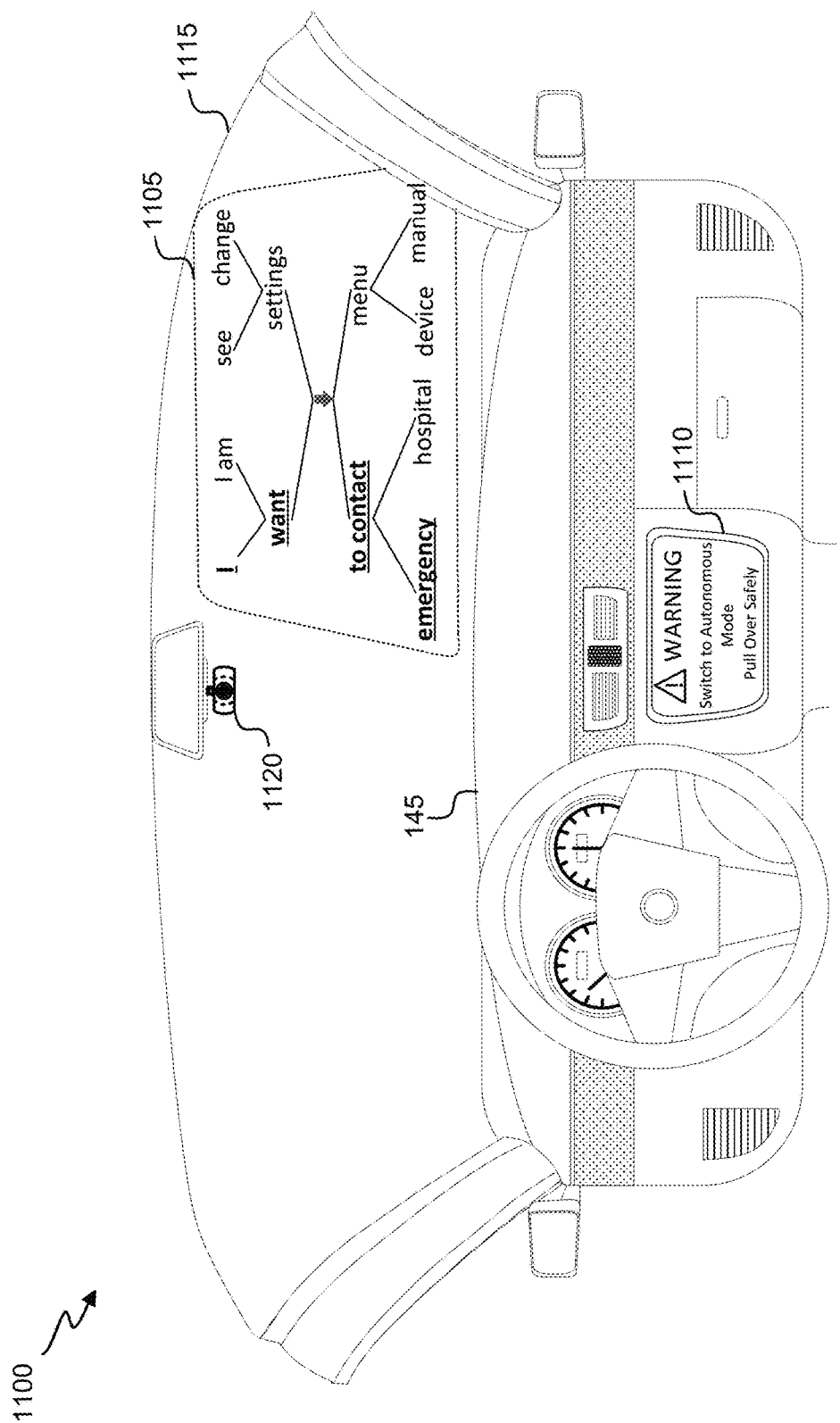
FIG. 11 shows an example illustration of a communication-tree on a windshield of the vehicle in accordance with some embodiments of the present disclosure.

FIG. 11 shows an example illustration of a communication-tree on the windshield of the vehicle 125 through a projector placed in the vehicle 125. In some instances, the anomaly detector 510 may detect the anomaly signal (e.g., which may be indicative of crash), based on measurements from the accelerometer in the vehicle 125, the impact-sensor in the vehicle 125, the pressure sensor in the vehicle 125, or the accelerometer in the computing device 115 owned by the subject in the vehicle 125, etc. The anomaly detector 510 may potentially trigger an interim check on the status of the subject. The audio/video cues generator 515 of the computing device 115 may visually or audibly present a question on the computing device 115. If the response analyzer 520 may not receive an answer to the question within a predetermined amount of time, the distress detector 525 may trigger a distress situation (or condition). In another embodiment, the sensor in the vehicle 125 and/or the computing device 115 may estimate whether and/or an extent to which eye movements or eye blinks match those of unimpaired humans (e.g., in response to instructions for eye movement or blinks or at a default level). In another embodiment, the physiological signals may be evaluated to predict a state of alertness, awareness and/or health of the subject. Such an assessment may depend on power within the Gamma-band frequency range. In at least one embodiment, such assessment may depend on changes in intensities in each of one or more frequency bands representing physiological state. In another embodiment, a mobility-aid device and/or pod may include a sensor that detects a movement pattern indicative of a possible crash.

If the interim check predicts that the response from the response analyzer 520 may suggest that a follow-up action may be called for (e.g., due to the distress-condition be activated, eye movements/blinks not sufficiently matching those of unimpaired humans, physiological signals not sufficiently in accordance with threshold alertness, awareness and/or health), a speech-facilitation tool may be initiated. The speech-facilitation tool may include one or more configurations and/or functionalities. According to at least one embodiment, the speech-facilitation tool may be configured to present a communication-tree 1105 and to record sensor data (EEG signals, EMG signals, MEG signals, EOG signals, etc.) that detects a signal corresponding to the movement or intention from the subject.

In the vehicular context and in accordance with an embodiment of the disclosure, the communication-tree 1105 may be displayed on a vehicle display device 1110 and/or projected on the windshield 1115 of the vehicle 125 through a projector placed in the vehicle 125. The speech-facilitation tool may be configured to present the communication-tree 1105 and to record sensor data (EEG signals, EMG signals, MEG signals, EOG signals, etc.) that can detect and interpret signals corresponding to movements or intentions of the subject. The sensor data captures neural and muscular activity that can be used to navigate through the communication-tree 1105 and can allow the subject to select nodes or options based on their intended movements. Additionally, camera 1120 can be placed on the dashboard and/or below the front mirror of the vehicle 125, that can capture visual cues and/or movements of the subject. The signals corresponding to the movements or intention from the subject can assist in navigating through the path of the communication-tree 1105. Such navigation can result in construction of a sentence, message, set of sentences, command, set of commands, etc.

The communication-tree 1105, according to one configuration of the speech facilitation tool, may be configured to facilitate rapid and effective communication via physiological signals, often in emergency situations (such as a situation where the subject may experience a health incident and/or the subject may have been in a crash). The communication-tree 1105 may assist the subject to generate a customized message by connecting specific words and/or phrases that may be already predefined, relating to different demands or situations of the subject. Therefore, even in stressful situations, the subject can quickly generate messages by piecing together predefined words and/or phrases presented on the communication-tree 1105. The communication 1005 may occur through the computing system of the vehicle 125, pod, mobility-aid device and/or the subject. The computing system can be configured to receive input from the sensor that detects EEG, EMG, MEG, EOG signals, signals from the AR/VR headset or signals from the camera 1120 that can then be used to navigate the communication-tree 1105 to generate the communication 1005 as an output. Even if one or more sensors in the vehicle 125 may fail after the crash, the computing system (e.g., the sensing patch 100-B and/or the headrest 140) may be independently supported, can detect activation, and can support such communications.

In some instances, the communication-tree 1105 may be configured (e.g., each time or upon detection of sensor readings accordant with strong impact) to include the path or leaf node that corresponds to a request that a specific emergency personnel from the emergency contact list 1015 can be contacted. If the path of the communication-tree 1105 completes or the leaf node may be reached, the emergency personnel may be automatically contacted through the computing system of the vehicle 125, pod, mobility-aid device and/or the subject. Instructions for navigating the communication-tree 1105 may be presented visually or audibly by the computing system. In some other instances, the communication-tree 1105 may be projected on the windshield 1115 via the projector, while the vehicle display device 1110 may display warnings, instructions, manual control, autonomous mode or the like. Such an embodiment may provide a clear picture of the communication-tree 1105 along with the visual and/or audible instructions. In some embodiments, upon determining the distress situation, one or more alert signals or distress signals may be transmitted automatically to emergency services by default and can only be stopped if the driver communicates.

Figure 12:
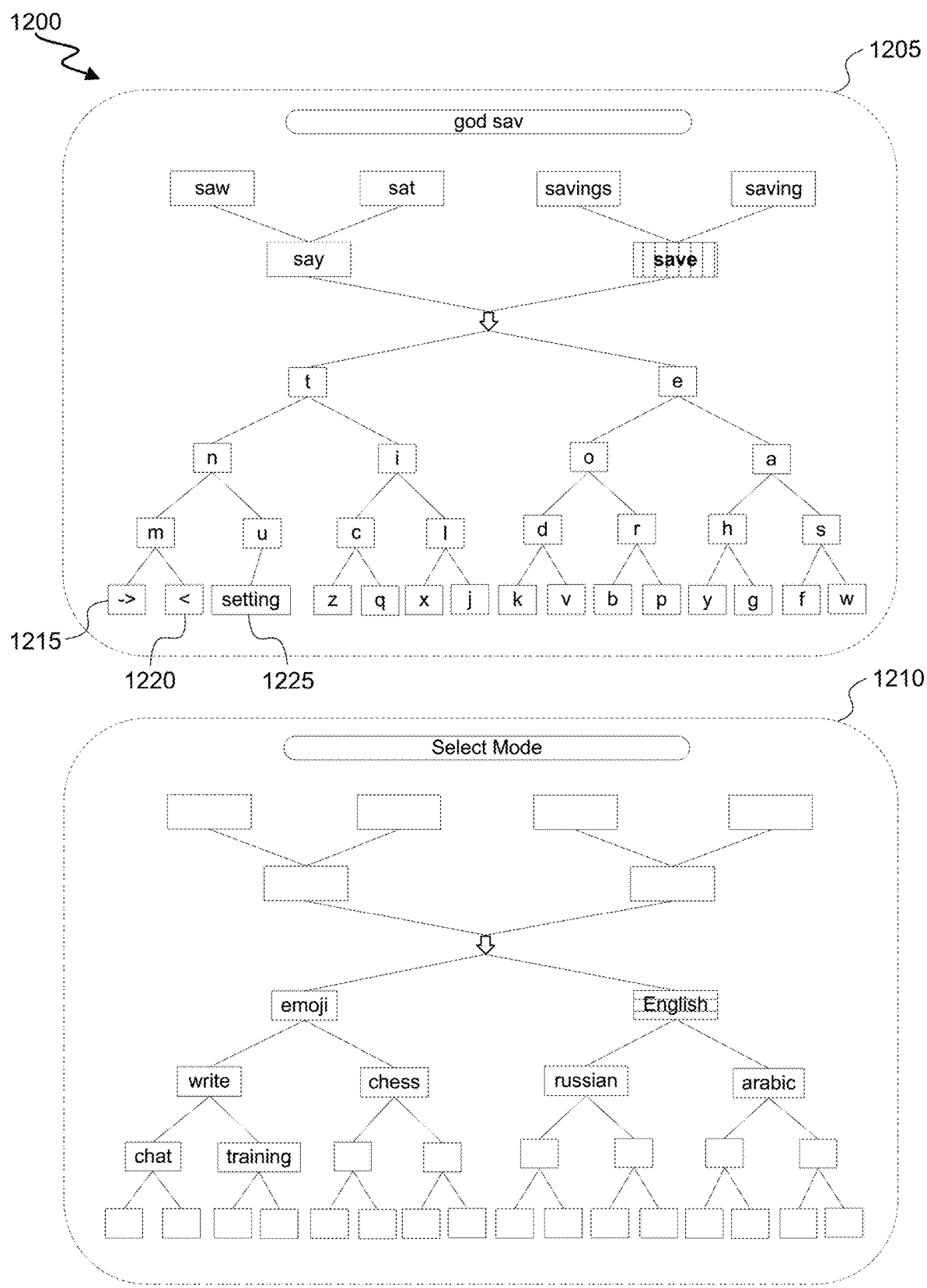
FIG. 12 shows other example illustrations of the communication-tree in accordance with some embodiments of the present disclosure.

FIG. 12 shows other example illustrations of the communication-tree in accordance with some embodiments of the present disclosure. The communication-tree 1105, according to another configuration of the speech facilitation tool, may feature a dynamic character-based interface 1205. The dynamic character-based interface, illustrated in the communication-assistance visuals 1200, may enable the subject to modify and/or customize the phrases by selecting different character nodes. In some instances, the communication-assistance visual of the communication-tree 1105 can comprise of two main sections, the lower part and the upper part. The lower part of the communication-tree 1105 can display the letter or character nodes, probably like a personalized keyboard for the subject. When the subject selects a character node from the lower part, it can trigger the display of related words or phrases in the upper part of the tree. The upper part can show the predicted words or phrases that may correspond to the selected character node, thus can allow the subject to choose from these nodes or options to continue to construct the sentence, message, set of sentences, command, set of commands, etc.

The dynamic character-based interface 1205 may include an interface, may have an interface functionality, and/or may have an interface characteristic disclosed in U.S. Provisional Patent Application 63/452,268, filed on Mar. 15, 2023, which is hereby incorporated by reference in its entirety for all purposes. The dynamic character-based interface 1205 may be configured to dynamically present a portion of a communication tree that includes, at each node of the tree, a character, word, portion of a word, portion of a sentence, emoji, requested virtual movement (e.g., of a cursor, virtual character, virtual game piece, etc.), sentence, requested vehicle movement, requested vehicle instruction, communication instruction (e.g., make phone call, identifying a phone call recipient, etc.), and so on. The dynamic character-based interface 1205 may be configured such that a set of successive signals (e.g., EEG signals, EOD signals, MEG signals, blink signals, etc.) result in a traversal through the tree, so as to form a communication, instruction, command set, request, etc.

The dynamic character-based interface 1205 may include a speak node 1215, a send node 1220 and/or a settings node 1225. The customized message, upon completion, can be spoken by the speech-facilitation tool by selecting the speak node 1215. Similarly, the customized message can be sent by selecting the send node 1220 that executes a send command. The settings node 1225 may open a select mode to help the subject choose between different languages and/or other functionalities (e.g., playing chess, sending an emoji, chatting with the speech-facilitation tool or the like). The communication-assistance visual illustrates a select mode interface 1210, in the form of communication-tree 1105, when the settings node 1225 may be selected by the subject from the dynamic character-based interface 1205.

In some embodiments, eye-gaze of the subject can be used to select the nodes in the communication-tree 1105 by focusing on specific character nodes, words, or phrases displayed on the vehicle display device 1110 and/or projected on the windshield 1115. As the subject gazes at the selection, the sensors in the headrest 140, the sensing patch 100-B or the camera 1120 in the vehicle 125 can interpret their focus to choose one of the many options and construct the message. Similarly, the subject can also customize the message by blinking at specific nodes, wherein each blink can act as a command to either choose or proceed to the next block (node or step) in the communication process. For example, blink right (squeeze right hand/leg or imagine it) can indicate navigate to right or next node. Similarly, blink left (squeeze left hand/leg or imagine it) can indicate navigate to left or previous node. Both blinks may indicate node selection. The subject can also go in reverse and go up the communication-tree for autocorrect and autocomplete. In some other embodiments, specifically for the subjects with limited eye movement but some residual muscle control, jaw movements can be employed to interact with the communication-tree 1105. By moving the jaw, the subject can select different character nodes, word nodes, or activate different functionalities within the communication-tree 1105. The movements can be configured to be received as input from the sensor that detects EEG, EMG, MEG, EOG signals, signals from the AR/VR device and/or signals from the camera 1120 that can then be used to navigate the communication-tree 1105 to generate the communication 1005 as an output.

Figure 13:
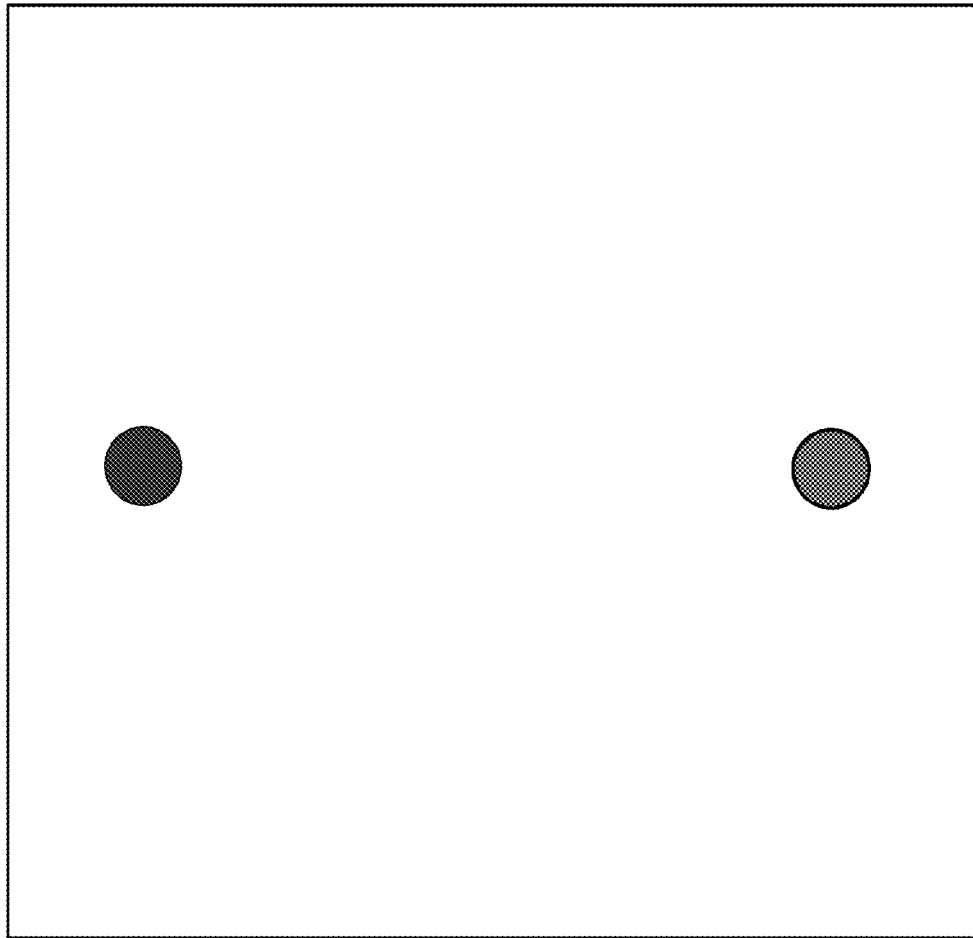
FIG. 13 shows an example illustration of visual cues by the engagement analyzer of FIG. 8 on the console or the windshield of the vehicle.

FIG. 13 shows an example illustration of visual cues by the engagement analyzer of FIG. 8 on the vehicle display device 1110 or the windshield of the vehicle 125. Some of the embodiments of the disclosure relate to accessing an engagement of the subject by presenting a task and/or an activity, thereby evaluating the adequate state of alertness and engagement of the subject. The engagement assessment may occur before the subject begins operating the vehicle 125 and/or at one or more points while the subject is operating the vehicle 125. In at least one embodiment, the task may include requesting the subject (upon inferring that the subject has entered the vehicle 125, using, for example, a signal from a weight sensor or a signal from the camera 1120) to provide a responsive action that can be detected by the sensing patch 100-B and/or the sensors embedded in the headrest 140. The task may request that the subject attend to a given object (e.g., a depicted object presented at one location versus another depicted object presented at another location). The given object may be projected onto a display in the vehicle 125, such as the vehicle display device 1110 and/or the windshield 1115. The task may then request the subject to attend to a specific one of the multiple presented visual objects.

To illustrate, in accordance with the present embodiment, two dots may be presented one above the other and with differing colors (namely red and green). An instruction may be given via text and/or an audio signal that identifies one of the dots (via a relative position or color) to which the subject is to attend or imagine (or to stop attending or imagining). In some instances, on representation of the green dot on the vehicle display device 1110 and/or the windshield 1115, the subject is instructed to imagine something or perform a task such as squeezing right hand, foot, etc. The dot, when turned red, instructs the subject to stop imagining or performing the task. Various sensor measurements may be used to assess whether and/or an extent to which the subject accords with the instructions. For example, ocular, muscular, or neural signals may be used to assess whether, an extent to which, and/or how quickly the subject accorded with the instruction. The engagement assessment can be monitored using brain waves and/or eye gazes (on top of facial emotional recognition). If the subject is not engaged, the car will conduct evasive maneuvers and park itself, control of the car may not be surrendered until the subject passes the engagement assessment. The engagement assessment can include (e.g., using a brain-computer interface disclosed herein) spelling something with the above system (i.e., the speech facilitation tool), playing a quick game (e.g., of chess), solving a puzzle, etc.

In at least one embodiment, multiple visual presentations can be presented, and the subject may be instructed via the text and/or the audio signal to associate each one of the multiple visual presentations with a mental image. A series of one or more of the visual presentations may then be presented, and recorded physiological signals (e.g., EEG, EMG, MEG, EOG signals) may be used to determine the extent to which the physiological signals accord with baseline signals. In another embodiment, a series of visual presentations illustrating the object from different angles can be presented as the task. Instructions may be presented visually or audibly on the vehicle display device 1110 and/or the windshield 1115 to mentally piece together a 3D shape from one or more of the 2D views provided. Recorded physiological signals (e.g., EEG, EMG, MEG, EOG signals) from the sensing patch 100-B and/or the sensors embedded in the headrest 140 can then be used to evaluate the adequate state of alertness and engagement of the subject. Furthermore, the predefined condition can be checked to determine whether to allow and/or the extent to which the subject can be allowed to operate the vehicle 125.

In another embodiment, the physiological signals and/or eye gazes may be used to predict the extent to which the subject is attending to a situation. In some instances, recordings from the one or more one or more electrodes 130*a-n* and/or the sensing patch 100-B can be used to assess the power within the one or more frequency bands of the physiological signals. If the predefined condition for the task may not be satisfied, the vehicle 125 may refuse to start or move. Similarly, if the vehicle 125 is in motion and the task may not be satisfied, the vehicle 125 with automated driving may self-park and/or administer another test and/or transition into a fully autonomous driving mode.

Figure 14:
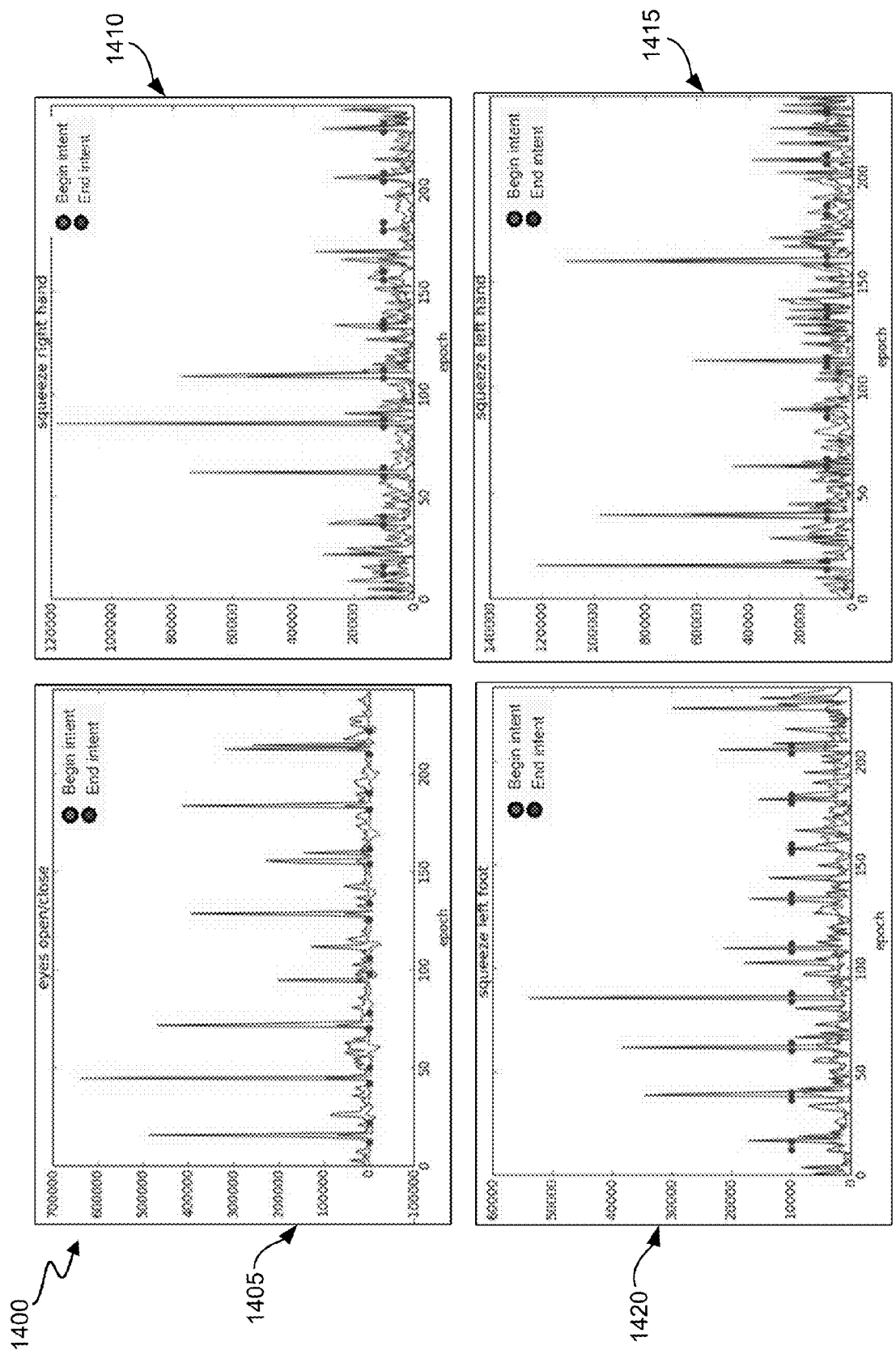
FIG. 14 illustrates example plots of the physiological signals corresponding to different intended movements of the subject based on the visual cues.

FIG. 14 illustrates example plots of the physiological signals corresponding to different intended movements of the subject based on the visual cues. The example plots represent EEG recordings generated from the sensing patch 100-B and/or the sensors embedded in the headrest 140, wherein the subject can be a high functioning amyotrophic lateral sclerosis (ALS) patient, psychomotor agitation (PMA) patient, multiple sclerosis (MS) patient, and/or any patient suffering from neurodegenerative disorder. In at least one embodiment, instructions may be provided to the subject to intend to blink eyes and/or to move one of the four limbs (such as, left and/or right hand or foot).

In some instances, EEG signals may be examined in time series increments called epochs. The epochs can be segmented into different sections using a scanning window, where the scanning window defines different sections of the time series increment. The scanning window can move via a sliding window (where sections of the sliding window have overlapping time series sequences) or via a jumping window (where sections are non-overlapping). An epoch can alternatively span a whole time series, for example.

In some embodiment, for detection of the attempted intended movements, recorded raw EEG signals can be analyzed by converting them into high frequency/low spectral power signals using SPEARS algorithm. The sleep parametric EEG automated recognition system algorithm (SPEARS Algorithm) can leverage the epochs and/or the scanning windows to improve the analysis of data from the EEG signals. By dividing continuous EEG recordings into distinct time segments or epochs, the SPEARS algorithm can efficiently quantify, analyze, and classify the brain activity, thereby eliminating the purpose for manual analysis of the subject.

The EEG signals may be characterized by different frequency bands, each associated with specific cognitive and physiological states. For example, Delta band that ranges typically around [0.5-4] Hz comprising slow waves or frequencies with high amplitudes. Similarly, Theta band that may range approximately around [4-8] Hz, comprises moderate frequencies and amplitude. Alpha band may typically range from around [8-12] Hz and can be associated with relaxed and calm states, often noted when the subject may be awake but relaxed with closed eyes (such as during meditation or light sleep). Followed by Alpha, beta band approximately ranges from [12-30] Hz and can be commonly associated with active thinking, focused mental tasks and decision making. Furthermore, the gamma band may encompass higher frequencies from approximately around [30-100] Hz and can be linked to high-level cognitive functions that may include attention, memory, and information processing. Gamma bands can become prominent during periods of intense mental activity, concentration and/or problem-solving. By processing these spectral characteristics of spectral bands, brain activity labels (e.g., various sleep stages, deep relaxation, resting state, wakefulness, consciousness, concentration etc.) may be assigned to segments of the EEG signals.

To illustrate, in accordance with the present embodiment, the attempted intended movements can include eye blinking 1405, squeezing right hand 1410, squeezing left hand 1415, squeezing left foot 1420, and the like. The plots show the example implementation of the visual representation of the engagement analyzer 310, wherein the green dot presentation can instruct the subject to initiate an intended movement and the red dot presentation can indicate the cessation of the intention. During the attempted intended movements, the brain activity of the subject demonstrated distinct broad-spectrum pulses extending to Gamma and ultra-high Gamma ranges. Such pulses may be presented in the absence of actual movement and absent when the subject may not be attempting intended movements. The plots illustrate multiple pulses corresponding to each of the attempted intended movements. In some instances, EEG recordings and/or the pulses can be aggregated and decisions can be made based on the majority of the detected pulses. This can demonstrate an overview intention of the subject over multiple engagement assessments. In some other instances, EEG recordings can be evaluated based on instantaneous recordings, wherein the focus can be on specific pulses associated with each individual instruction. Unlike aggregation, instantaneous recordings may emphasize more on capturing immediate neural responses. In some embodiments, the results 1400 may illustrate an example implementation, wherein the demonstrated broad-spectrum pulses may represent multiple periodic engagement assessments of the subject during drive time. For example, the engagement assessment may occur before the subject begins operating the vehicle 125 and/or at one or more points while the subject is operating the vehicle 125.

In the present embodiment, the engagement analyzer 310 may stick to the predefined threshold value and/or the personalized threshold value of engagement, to which the comparison can be made. Based on the comparison, the vehicle controller 320 determines whether to allow and/or the extent to which the subject can be allowed to operate the vehicle 125. Similarly, if the vehicle 125 is in motion and the predefined threshold value may not be satisfied, the vehicle 125 with automated driving may self-park and/or administer another engagement assessment and/or transition into a fully autonomous driving mode.

Figure 15:
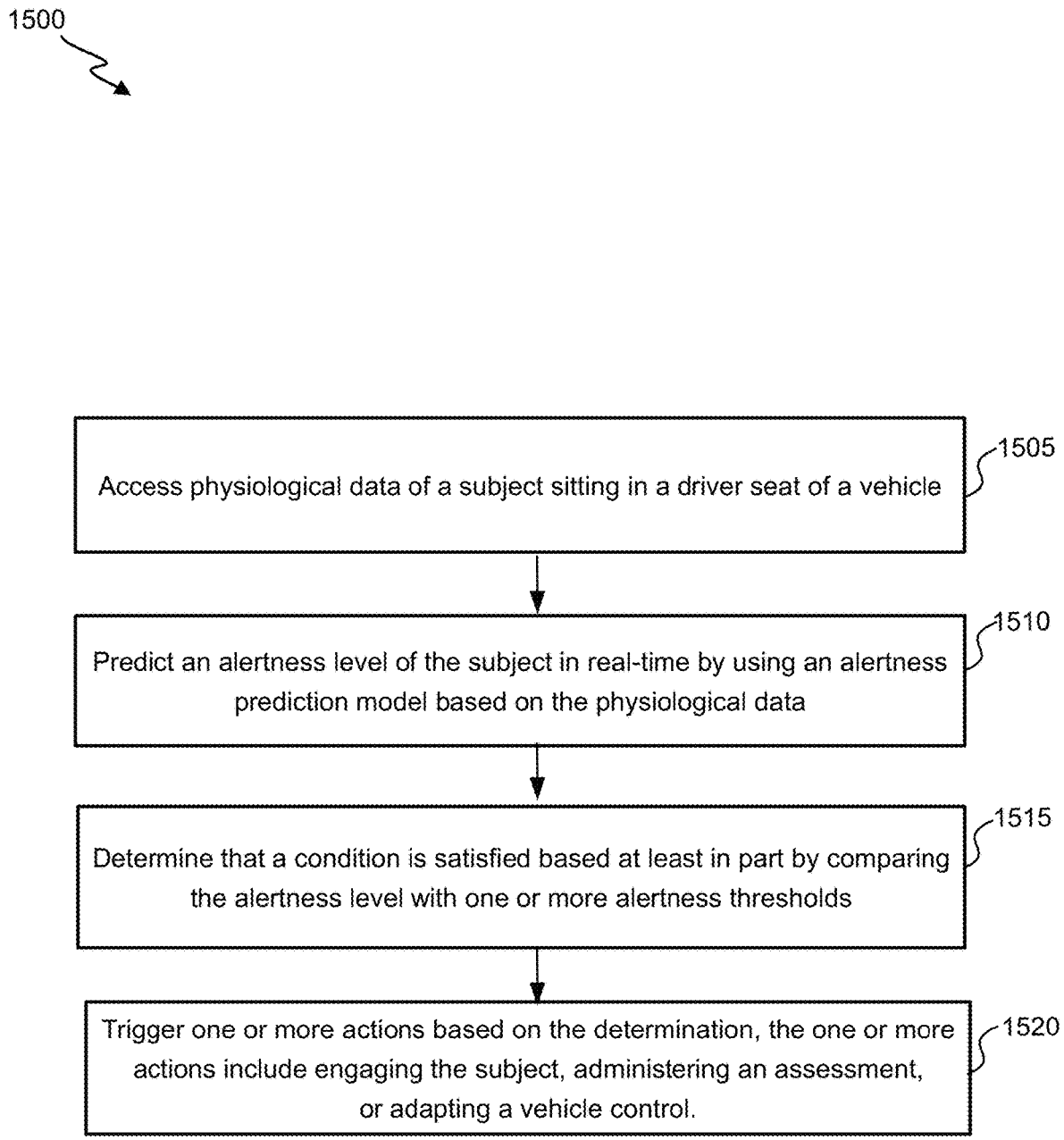
FIG. 15 shows an example flowchart of a system for predicting an alertness level of the subject based on the physiological signals in accordance with some embodiments of the present disclosure.

FIG. 15 shows an example flowchart of a system for predicting an alertness level of the subject based on the physiological signals in accordance with some embodiments of the present disclosure. The blocks in flowchart 1500 are illustrated in a specific order, while the order can be modified, for example, some blocks may be performed before other, and some blocks may be performed simultaneously. The blocks can be performed by hardware or software or a combination thereof. The process at block 1505 may include accessing the physiological data of the subject sitting in the driver seat of the vehicle 125. The physiological data may be collected by the physiological data acquisition assembly that comprises the sensing device 105 and the one or more clusters of electrodes. Each cluster of one or more clusters of electrodes comprises at least one active electrode. In some instances, the electrodes can be EEG, EMG, EOG, or MEG electrodes to record the physiological signals 205 of the subject. The one or more components of the physiological data acquisition assembly may be embedded in the driver seat of the vehicle, for example, in the headrest 140. The physiological data acquisition assembly may be worn by the subject as the sensing patch 100-B. The physiological data may be comprised of one or more physiological signals, or one or more pre-processed physiological signals.

The alertness level of the subject may be predicted in real-time based on the physiological data by using the alertness prediction model, at block 1510. The alertness prediction model can be a machine learning model that may be trained on a dataset that comprises the alertness level for a plurality of time intervals and corresponding physiological data of one or more subjects. The process at block 1515 may include determining that a condition is satisfied based at least in part by comparing the alertness level with one or more alertness thresholds. The one or more alertness thresholds may be comprised of a population-based threshold or a subject-specific threshold. The population-based threshold can be lower than the subject-specific threshold. The condition can be such that whether the predicted alertness level of the subject is lower than the subject-specific threshold, and/or whether the predicted alertness level is even lower than the population-based threshold.

Based on the determination that the condition is satisfied, one or more actions may be triggered, at block 1520. The one or more actions may include engaging the subject, administering an assessment to the subject, or adapting the vehicle control. Adapting the vehicle control may include transitioning the vehicle to a self-driving mode or pulling over the vehicle to a side of a road. The output of the alertness prediction model may indicate that the subject has an increased likelihood of low alertness level in near future. The output can be presented on the computing device 115 or transmitted to another device such as vehicle controller 320. For engaging the subject, the one or more actions may include lowering the temperature of passenger cabin of the vehicle, increasing a fan speed, increasing light in the passenger cabin, increasing audio volume, generating audio warnings, or generating seat vibrations.

Figure 16:
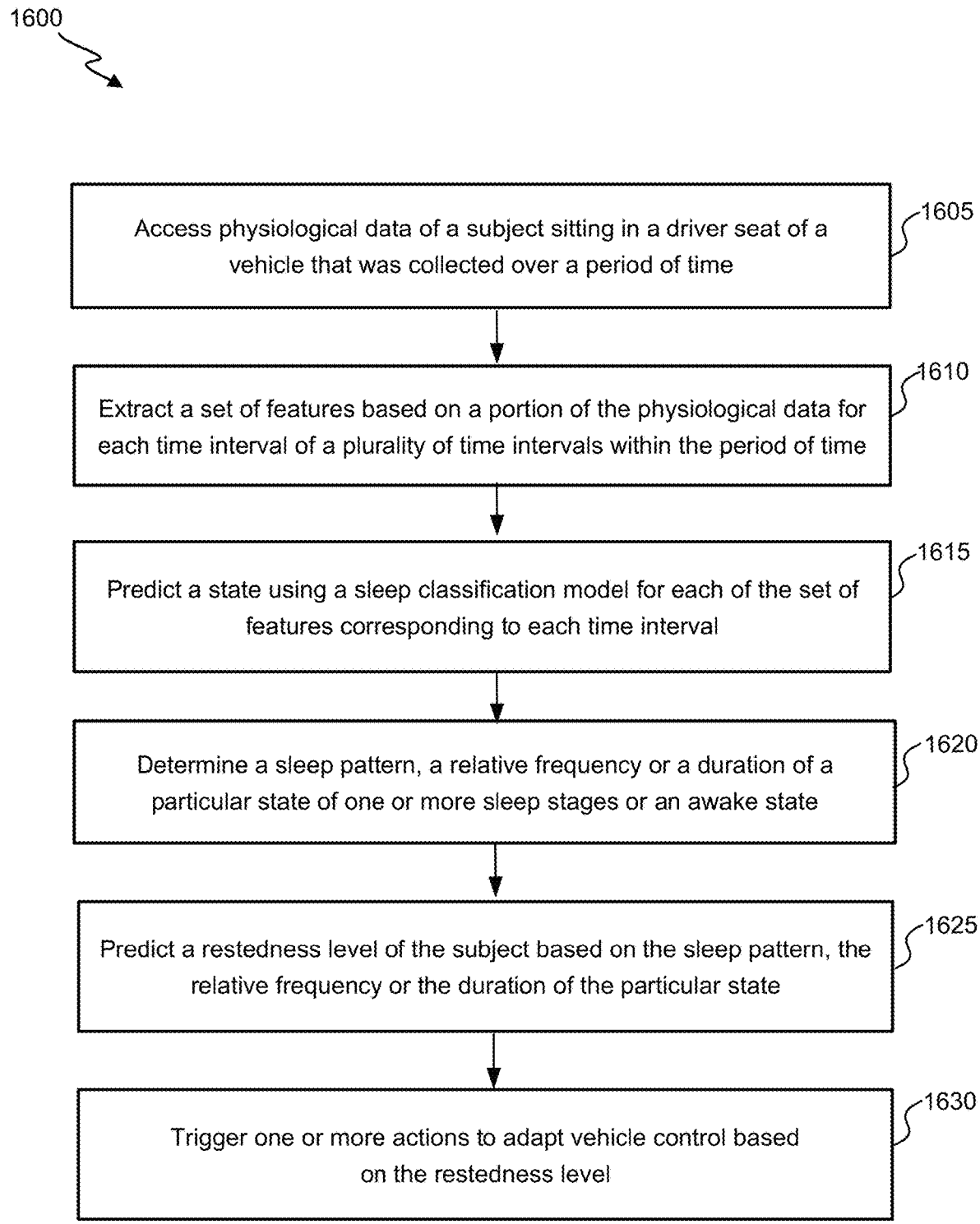
FIG. 16 shows an example flowchart of a system for predicting a restedness level of the subject in accordance with some embodiments of the present disclosure.

FIG. 16 shows an example flowchart of a system for predicting a restedness level of the subject in accordance with some embodiments of the present disclosure. The blocks in flowchart 1600 are illustrated in a specific order, while the order can be modified, for example, some blocks may be performed before other, and some blocks may be performed simultaneously. The blocks can be performed by hardware or software or a combination thereof. The process at block 1605 may include accessing the physiological data of the subject sitting in the driver seat of the vehicle 125. The physiological data was collected over a period of time by the physiological data acquisition assembly. The physiological data that was collected over the period of time may correspond to the physiological signals 205 that were collected across a 24-hour period prior to driving the vehicle, or a previous night-time period. The physiological data of the subject may be comprised of a single-channel EEG data. In some instances, the physiological data acquisition assembly is worn by the subject as the sensing patch 100-B.

A set of features based on a portion of the physiological data may be extracted for each time interval of a plurality of time intervals within the period of time, at block 1610. The set of features may be associated with one or more frequency bands of the physiological signals 205 corresponding to each time interval. The set of features may include one or more of Delta power, Gamma power, standard deviation, maximum amplitude, Gamma power/Delta power, time derivative of Delta, and time derivative of the Gamma power/Delta power. The set of features may further include features that are derived using component analysis (e.g., PCA, ICA) from a spectrogram or a normalized spectrogram of the one or more frequency bands of the physiological signals for the time interval.

A state can be predicted for each of the set of features corresponding to each time interval, at block 1615. The state may correspond to any of one or more sleep stages or an awake state. The one or more sleep stages may include the REM stage and one or more non-REM stages. In some instances, a sleep classification model may be used to predict the state. The sleep classification model may include supervised machine learning techniques such as decision trees, support vector machine (SVM), random forest, or neural networks that are trained on labeled sleep data. In some other instances, clustering techniques, for example, k-means clustering, hierarchical clustering or Gaussian mixture model (GMM) can be utilized to predict the state for each time interval.

Based on the prediction of the state corresponding to each time interval, the sleep pattern, the relative frequency of a particular state of the one or more sleep stages or the awake state, or a duration of the particular state of the one or more sleep stages or the awake state may be determined, at block 1620. The restedness level of the subject may be predicted based on the sleep pattern, the relative frequency of the particular state, or the duration of the particular state of the one or more sleep stages or the awake state by using a restedness prediction model, at block 1625.

Based on the restedness level, one or more actions can be triggered to adapt the vehicle control, at block 1630. The one or more actions may include control whether to allow the vehicle 125 to move or not. The one or more actions further include transitioning the vehicle 125 to the self-driving mode or an auto-pilot mode, pulling over the vehicle 125 to the side of the road, or setting a limit on a speed of the vehicle according to the restedness level. Adapting the vehicle control may also include giving the subject full or partial control over the vehicle 125 according to the restedness level.

Figure 17:
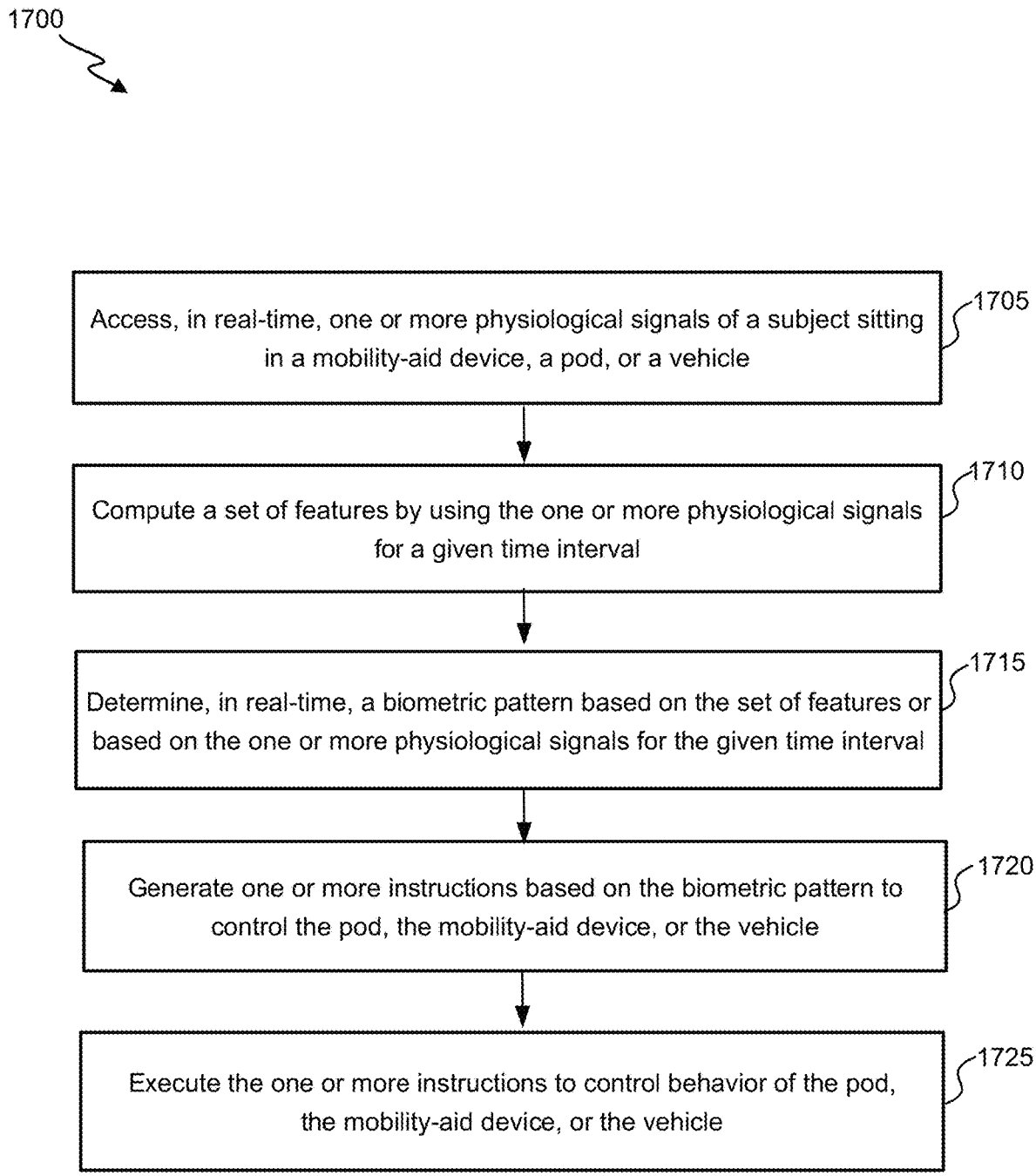
FIG. 17 shows an example flowchart of a system for generating movement instructions for the mobility-aid device, the pod, or the vehicle in accordance with some embodiments of the present disclosure.

FIG. 17 shows an example flowchart of a system for generating movement instructions for the mobility-aid device, the pod, or the vehicle 125 in accordance with some embodiments of the present disclosure. The blocks in flowchart 1700 are illustrated in a specific order, while the order can be modified, for example, some blocks may be performed before other, and some blocks may be performed simultaneously. The blocks can be performed by hardware or software or a combination thereof. The process at block 1705 may include accessing, in real-time, one or more physiological signals (or the physiological signals 205) of the subject sitting in the driver seat of the vehicle 125. The physiological signals 205 can be acquired using the sensing patch 100-B or by using sensors embedded in the pod, the mobility-aid device, or the vehicle 125 (e.g., in the headrest 140). The vehicle, the pod, and the mobility-aid device may be in communication with each other and with a user device (e.g., the sensing patch 100-B, smartwatch, or smartphone) via a short-range connection. A set of features may be computed by using the one or more physiological signals for a given time interval, at block 1710. The given time interval may correspond to a scanning window that is used to segment the one or more physiological signals. The set of features is associated with one or more frequency bands of the one or more physiological signals for the given time interval. The set of features may include a Gamma band signal power and an Alpha band signal power. The Gamma band and the Alpha band correspond to the one or more frequency bands of the one or more physiological signals. The set of features may further include features that are derived using component analysis from a spectrogram or a normalized spectrogram of the one or more frequency bands of the one or more physiological signals for the given time interval.

A biometric pattern may be determined in real-time based on the set of features or based on the one or more physiological signals for the given time interval, at block 1715. In some instances, the biometric pattern may be comprised of neural signatures corresponding to each of intended movements of the vehicle 125, the pod, or the mobility-aid device. The biometric pattern may be further comprised of neural signatures corresponding to intended movements of a left hand, a right hand, a left foot, or a right foot. In some other instances, the biometric pattern may be comprised of ocular signatures corresponding to eye movements or blinks including a left eye blink, a right eye blink, or a double blink. In some other instances, the biometric pattern may be comprised of muscular signatures including an upper jaw movement, or a lower jaw movement, and the like.

One or more instructions may be generated based on the biometric pattern to control one or more of the pod, the mobility-aid device, or the vehicle 125, at block 1720. The one or more instructions may include a driving instruction, a movement instruction, or a latching instruction. In some instances, the one or more instructions can be generated by selecting one or more predefined instructions from a list or a table according to the biometric pattern. Finally, the one or more instructions may be executed to control a behavior of the vehicle 125, the pod or the mobility-aid device by controlling one or more motors or actuators, at block 1725. In some instances, the pod may be configured to transport the subject, or to transport the subject inside the vehicle with the mobility-aid device. Similarly, the vehicle can be configured to receive, engage, and secure the mobility-aid device or the pod substantially close to a driver position. The vehicle 125 may include one or more latching elements configured to secure a connection with the pod or the mobility-aid device in response to executing the latching instruction.

Figure 18:
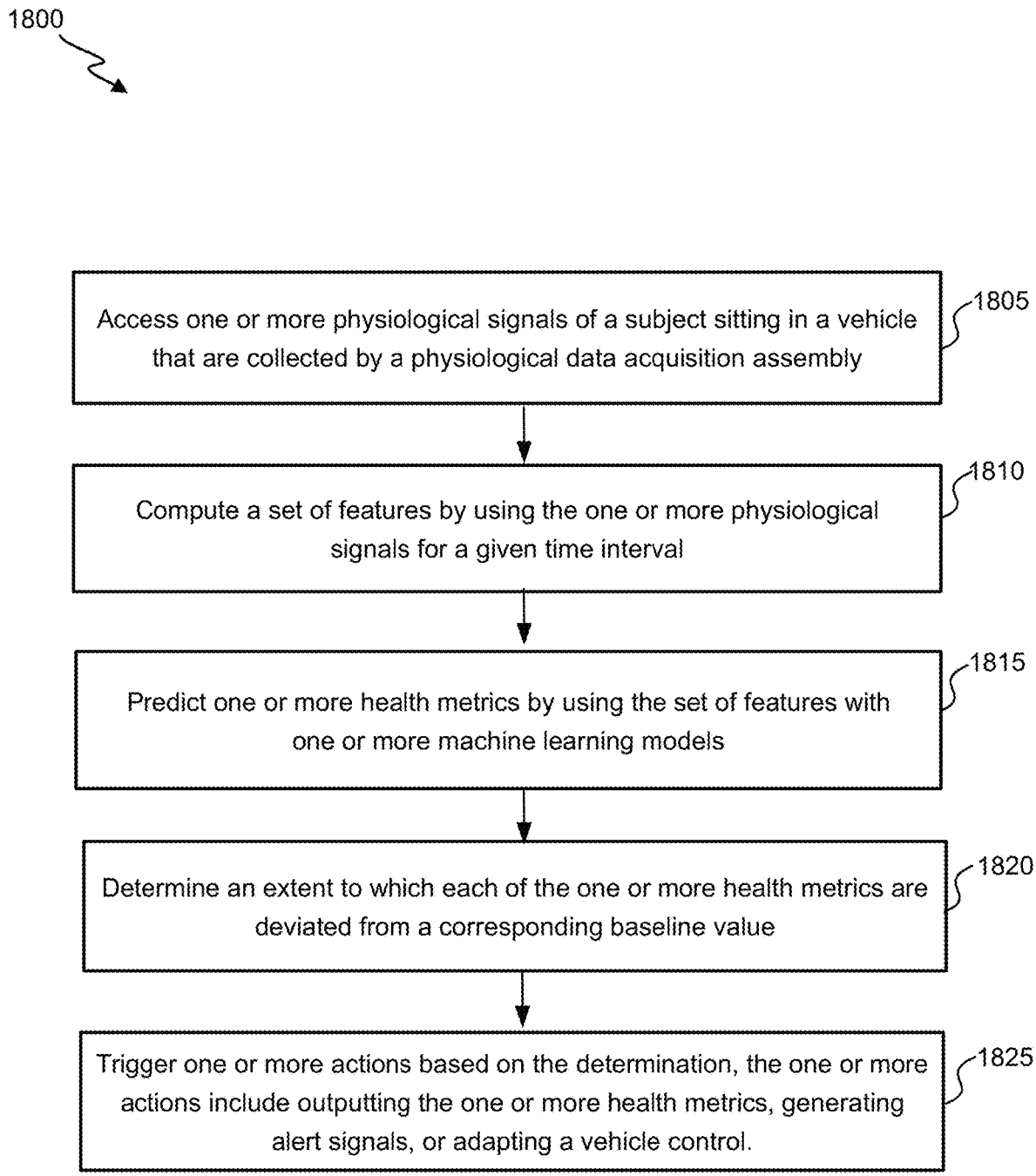
FIG. 18 shows an example flowchart of a system for monitoring and predicting one or more health metrics of the subject or a passenger in accordance with some embodiments of the present disclosure.

FIG. 18 shows an example flowchart of a system for monitoring and predicting one or more health metrics of the subject or a passenger in accordance with some embodiments of the present disclosure. The blocks in flowchart 1800 are illustrated in a specific order, while the order can be modified, for example, some blocks may be performed before other, and some blocks may be performed simultaneously. The blocks can be performed by hardware or software or a combination thereof. The process at block 1805 may include accessing one or more physiological signals of the subject sitting in the vehicle 125, the pod, or the mobility-aid device. The one or more physiological signals may be collected by the physiological data acquisition assembly that comprises the sensing device 105 and one or more clusters of electrodes. Each cluster of the one or more clusters of electrodes comprises at least one active electrode.

The set of features may be computed by using the one or more physiological signals for the given time interval, at block 1810. The given time interval may correspond to a scanning window that is used to segment the one or more physiological signals. The set of features may be comprised of values that are derived from the one or more frequency bands of the one or more physiological signals for the given time interval. The set of features may include features such as one or more of Delta power, Gamma power, standard deviation, maximum amplitude, Gamma power/Delta power, time derivative of Delta, and time derivative of the Gamma power/Delta power. The set of features may further include features that are derived using component analysis from a spectrogram or a normalized spectrogram of the one or more frequency bands of the one or more physiological signals for the given time interval.

The one or more health metrics may be predicted using the set of features with one or more machine learning models, at block 1815. The one or more health metrics may correspond to measures indicating a health status of the subject. One or more health metrics may include a stress level, a cognitive impairment, a sleep disorder, a sudden change in physiology, or a neurodegenerative abnormality. The cognitive impairment may include but not limited to road rage.

At block 1820, an extent to which each of the one or more health metrics are deviated from a corresponding baseline value may be determined. The baseline value (or the corresponding baseline value) may represent a population-based average (or normal range) of a health metric of the one or more health metrics. Based on the determination of the extent, the one or more actions may be triggered, at block 1825. The one or more actions may include outputting the one or more health metrics, generating an alert signal to the subject or a caregiver, or adapting the vehicle control.

Figure 19:
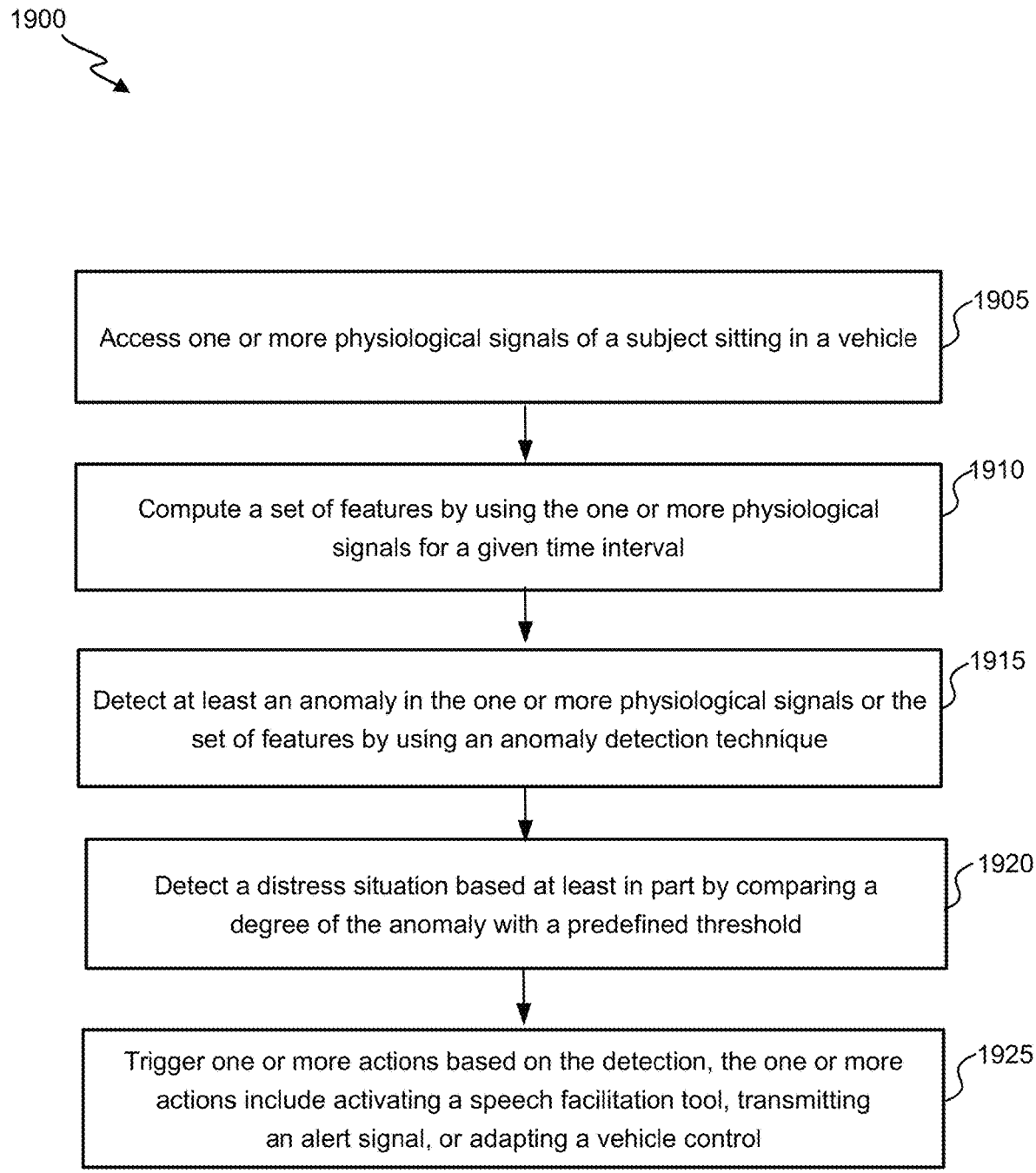
FIG. 19 shows an example flowchart of a system for detecting a distress situation in accordance with some embodiments of the present disclosure.

FIG. 19 shows an example flowchart of a system for detecting a distress situation in accordance with some embodiments of the present disclosure. The blocks in flowchart 1900 are illustrated in a specific order, while the order can be modified, for example, some blocks may be performed before other, and some blocks may be performed simultaneously. The blocks can be performed by hardware or software or a combination thereof. The process at block 1905 may include accessing, in real-time, the physiological data of the subject sitting in the seat of the vehicle 125, the pod, or the mobility-aid device. The set of features may be computed by using the one or more physiological signals for the given time interval, at block 1910. The set of features may be comprised of values that are derived from the one or more frequency bands of the one or more physiological signals.

An anomaly in the one or more physiological signals or the set of features may be detected by using an anomaly detection technique, at block 1915. Anomaly detection techniques may include but are not limited to statistical methods (e.g., Z-score, Grubbs test), machine learning techniques such as supervised learning (e.g., SVM, NNs), unsupervised learning (e.g., clustering), deep learning techniques (e.g., convolutional neural networks CNNs, recurrent neural networks RNNs, autoencoders), or time-series based analysis such as moving average, auto-regressive models.

A distress situation may be detected based at least in part by comparing a degree of the anomaly with a predefined threshold, at block 1920. The predefined threshold can be set using multiple variables corresponding to the set of features or the one or more physiological signals. In case, the anomaly detection technique may detect n-dimensional anomaly (e.g., n individual anomalies in the set of features), then the predefined threshold may represent a n−1 dimensional plane in a n-dimensional space. In addition, based on the degree of the anomaly, one or more configurations of a passenger cabin can be adapted. The one or more configurations may include adjusting a firmness of the seat of the vehicle and adjusting an angle of the seat of the vehicle.

The distress situation may correspond to a health incident or a crash event. The health incident may include various medical emergencies such as a stroke, an epileptic seizure, or a heart attack. The distress situation may further be detected by accessing the sensor data, in real-time, from the vehicle 125 or the user device and detecting a crash event based on the sensor data. The sensor data of the vehicle 125 or the user device may include data from an accelerometer or a gyroscope. Further, detection of the distress situation may include generating one or more audio or visual cues for the subject and collecting the physiological data for a specific time period after the one or more audio or visual cues may be executed. Following the collection of the physiological data, an extent to which the physiological data is deviated from baseline physiological data may be determined. The baseline physiological data may represent average or normalized values of the physiological data that was collected from the subject or from a plurality of subjects in response to the one or more audio or visual cues.

One or more actions may be triggered based on the detection of the distress situation, at block 1925. The one or more actions may include activating a speech facilitation tool for the subject, transmitting an alert signal to emergency services, or adapting the vehicle control. The alert signal that is sent to the emergency services includes data indicating an inference of the crash event, an identifier of the subject, an emergency contact, health information, and the like. Adapting the vehicle control may include transitioning the vehicle to the self-driving mode or pulling over the vehicle to the side of the road.

Figure 20:
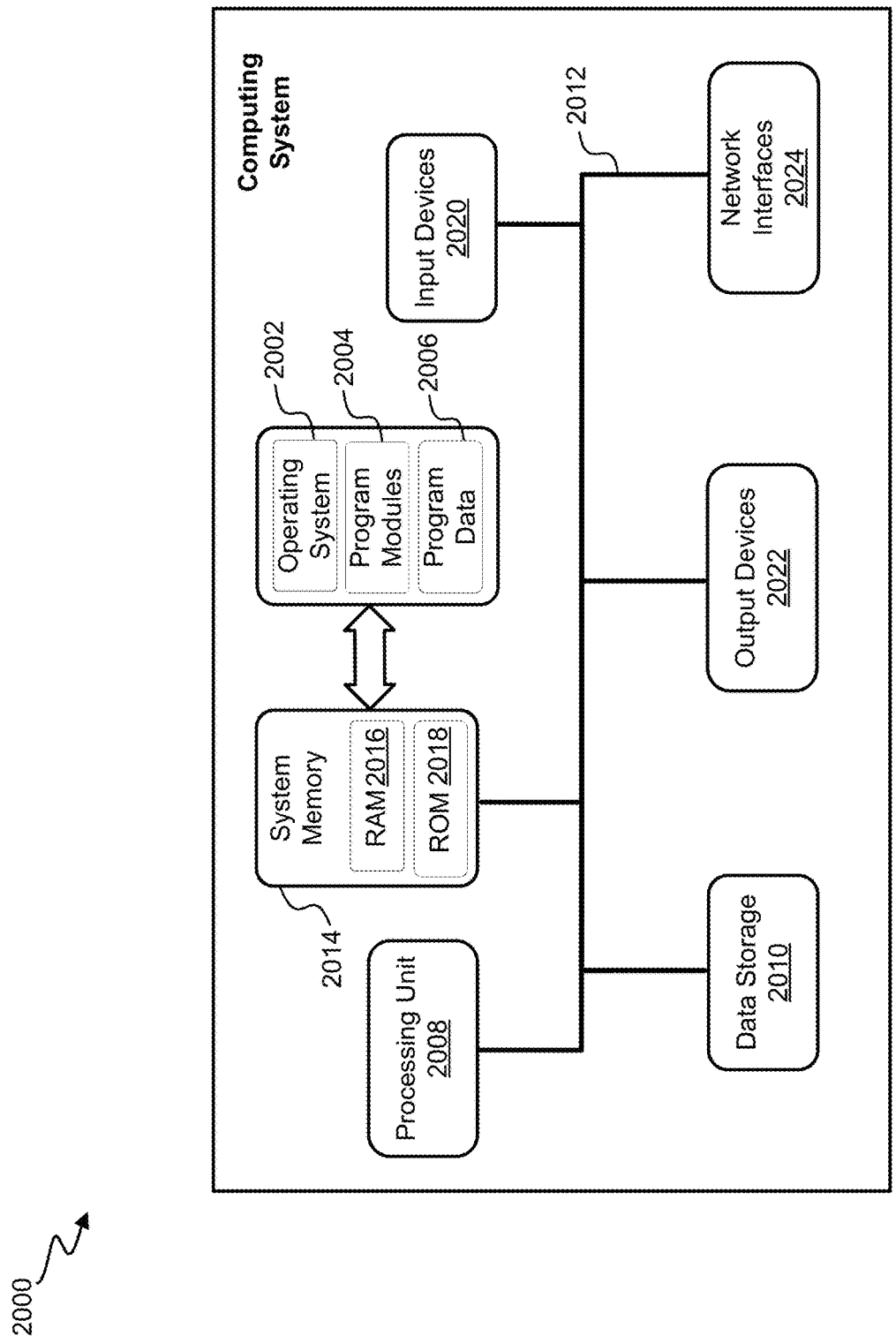
FIG. 20 shows an example illustration of a computing system in which various embodiments of the present disclosure may be implemented.

FIG. 20 shows an example illustration of the computing system 2000 in which various embodiments of the present disclosure may be implemented. The computing system 2000 can be used as the computing device 115 as explained in FIG. 1. For example, the techniques as disclosed above in the present disclosure, for monitoring and predicting physiological state of the subject or passengers in the vehicle based on the biosignals, can be implemented in computer-executable instructions (e.g., organized in program modules 2004). The program modules 2004 can include the routines, programs, objects, components, and data structures that perform the tasks and implement the data types for implementing the techniques described above. The functionality described herein can be performed, at least in part, by one or more hardware logic components.

To provide additional context for various aspects thereof, FIG. 20 and the following description are intended to provide a brief, general description of the computing system 2000 in which the various aspects can be implemented. While the description above is in the general context of computer-executable instructions that can run on one or more computers, those skilled in the art will recognize that a novel implementation also can be realized in combination with other program modules and/or as a combination of hardware and software. Computing system 2000 or computer system for implementing various aspects includes a processing unit 2008 having one or more processors (also referred to as microprocessors), a computer-readable storage medium (where the medium is any physical device or material on which data can be electronically and/or optically stored and retrieved) such as a data storage 2010 unit (computer-readable storage medium/media also include magnetic disks, optical disks, solid state drives, external memory systems, and flash memory drives), and a system bus 2012. The system bus 2012 may provide an interface for system components including, but not limited to, system memory 2014, to the processing unit 2008. Such a system bus 2012 can be of any of several types of bus structure that can further interconnect to memory bus (with or without controller), and a peripheral bus (e.g., Peripheral Component Interconnect (PCI), Peripheral Component Interconnect Express (PCIe), Accelerated Graphics Port (AGP), Low Pin Count (LPC), etc.), using any of a variety of commercially available bus architectures.

FIG. 20 shows an example configuration of a typical computer that may be other commercially available microprocessors such as single-processor, multi-processor, single-core units, and multi-core units of processing and/or storage circuits. Moreover, those skilled in the art will appreciate that the novel system and methods can be practiced with other computer system configurations, including minicomputers, mainframe computers, as well as personal computers (e.g., desktop, laptop, tablet PC, etc.), hand-held computing devices, microprocessor-based or programmable consumer electronics, and the like, each of which can be cooperatively coupled to one or more associated devices.

In some aspects, the computing system 2000 can be one of several computers employed in a datacenter and/or computing resources (hardware and/or software) in support of cloud computing services for portable and/or mobile computing systems such as wireless communications devices, cellular telephones, and other mobile-capable devices. Cloud computing services, include, but are not limited to, infrastructure as a service, platform as a service, software as a service, storage as a service, desktop as a service, data as a service, security as a service and APIs (application program interlaces) as a service, for example. In some instances, the system memory 2014 can include computer-readable storage (physical storage) medium such as a volatile memory (e.g. random-access memory (RAM) 2016) and a non-volatile memory (e.g., read only memory (ROM) 2018). A basic Input/output system (BIOS) can be stored in the non-volatile memory and includes the basic routines that facilitate the communication of data and signals between components within the computing system 2000, such as during startup. The volatile memory also includes a high-speed RAM such as static RAM for caching data.

By way of example, and not limitation, the system memory 2014 also may also include program modules 2004, which may include client applications, Web browsers, mid-tier applications, relational database management systems (RDBMS), etc., program data 2006, and an operating system 2002. By way of example, operating system 2002 may include various versions of Microsoft Windows®, Apple Macintosh®, and/or Linux operating systems, a variety of commercially-available UNIX® or UNIX-like operating systems (OS) (including without limitation the variety of Gnu's Not Unix (GNU)/Linux operating systems, the Google Chrome OS, and the like) and/or mobile operating systems such as iOS, Windows® Phone, Android OS, BlackBerry® OS, and Palm® OS operating systems. All or portions of operating system 2002, program modules 2004, and/or program data 2006 can also be cached in memory such as the volatile memory and/or non-volatile memory, for example (RAM 2016 or ROM 2018). It is to be appreciated that the disclosed architecture can be implemented with various commercially available operating systems or combinations of operating systems (e.g., virtual machines).

In some other examples, the computing system 2000 may have additional features or functionality. For example, the computing system 2000 may also include additional data storage devices (removable and/or non-removable) such as, for example, magnetic disks, optical disks, or tape. Computer-readable media may include, at least, two types of computer-readable media, namely computer storage media and communication media. Computer storage media may include volatile and non-volatile, removable, and non-removable media implemented in any method or technology for storage of information, such as computer-readable instructions, data structures, program modules, or other data.

The system memory 2014, and the data storage 2010 including removable storage, and non-removable storage are all examples of computer storage media. Apart from RAM 2016 and ROM 2018, computer storage media includes, but is not limited to, electrically erasable programmable ROM (EEPROM), flash memory or other memory technology, compact disc (CD)-ROM, digital versatile disks (DVD), or other optical storage, magnetic cassettes, magnetic tape, magnetic disk storage or other magnetic storage devices, or any other non-transmission medium that can be used to store the targeted information and which can be accessed by the computing system 2000. Moreover, the computer-readable media may include computer-executable instructions that, when executed by the processing unit 2008, perform various functions and/or operations described herein. The communication media may embody computer-readable instructions, data structures, program modules, or other data in a modulated data signal, such as a carrier wave, or other transmission mechanism.

The computing system 2000 may also include one or more input devices 2020 such as keyboard, mouse, pen, voice input device, touch input device, etc. One or more output devices 2022 such as a display, speakers, printers, etc. may also be included. These devices are well known in the art and are not discussed at length here. The computing system 2000 may also include one or more network interfaces 2024 to establish communication that may allow computing system 2000 to communicate with other system or devices, such as over a network. These networks may include wired networks as well as wireless networks. Here, the computing system 2000 is one example of a suitable device or system and is not intended to suggest any limitation as to the scope of use or functionality of the various embodiments described.

Other well-known computer systems, environments and/or configurations that may be suitable for use with the embodiments include, but are not limited to personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, and/or the like. For example, some or all of the components of computing system 2000 may be implemented in a cloud computing environment, such that resources and/or services are made available via a computer network for selective use by the user devices.

Some embodiments of the present disclosure include a system including one or more data processors. In some embodiments, the system includes a non-transitory computer-readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification, and variation of the concepts herein disclosed may be resorted to by those skilled in the art, and that such modifications and variations are considered to be within the scope of this invention as defined by the appended claims.

The present description provides preferred exemplary embodiments only, and is not intended to limit the scope, applicability or configuration of the disclosure. Rather, the description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the following description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

What is claimed is:

1. A computer-program product tangibly embodied in a non-transitory machine-readable storage medium, including instructions configured to cause one or more data processors to perform a set of operations comprising:
   accessing one or more physiological signals of a subject sitting in a vehicle, wherein the one or more physiological signals are collected by a physiological data acquisition assembly that comprises a sensing device and one or more clusters of electrodes, and wherein each cluster of the one or more clusters of electrodes comprises at least an active electrode;
   computing a set of features by using the one or more physiological signals for a given time interval, wherein the set of features comprises values that are derived from one or more frequency bands of the one or more physiological signals;
   predicting one or more health metrics by using the set of features with one or more machine learning models, wherein the one or more health metrics corresponds to measures indicating a health status of the subject;

determining an extent to which the one or more health metrics are deviated from a corresponding baseline value; and triggering one or more actions based on the determination, wherein the one or more actions include outputting the one or more health metrics, generating an alert signal to the subject or a caregiver, or adapting a vehicle control, wherein the given time interval corresponds to a scanning window that is used to segment the one or more physiological signals;

the set of features is associated with the one or more frequency bands of the one or more physiological signals for the given time interval;

the set of features includes one or more of Delta power, Gamma power, standard deviation, maximum amplitude, Gamma power/Delta power, time derivative of Delta, and time derivative of the Gamma power/Delta power; and the set of features further includes features that are derived using component analysis from a spectrogram or a normalized spectrogram of the one or more frequency bands of the one or more physiological signals for the given time interval.

2. The computer-program product of claim 1, wherein the one or more health metrics include a stress level, a cognitive impairment, a sleep disorder, or a neurodegenerative abnormality.

3. The computer-program product of claim 1, wherein adapting the vehicle control includes transitioning the vehicle to a self-driving mode or pulling over the vehicle to a side of a road.

4. The computer-program product of claim 1, wherein the one or more clusters of electrodes include electroencephalogram (EEG) electrodes, electromyography (EMG) electrodes, magnetoencephalography (MEG) electrodes, and/or electrooculogram (EOG) electrodes.

5. The computer-program product of claim 1, wherein: the set of features includes a spectral fragmentation metric or a temporal fragmentation metric.

6. The computer-program product of claim 1, wherein the physiological data acquisition assembly is worn by the subject as a sensing patch.

7. The computer-program product of claim 1, wherein one or more components of the physiological data acquisition assembly are embedded in a seat of the vehicle, wherein the one or more components of the physiological data acquisition assembly include the sensing device and the one or more clusters of electrodes.

8. A computer-implemented method comprising:
accessing one or more physiological signals of a subject sitting in a vehicle, wherein the one or more physiological signals are collected by a physiological data acquisition assembly that comprises a sensing device and one or more clusters of electrodes, and wherein each cluster of the one or more clusters of electrodes comprises at least an active electrode;

computing a set of features by using the one or more physiological signals for a given time interval, wherein the set of features comprises values that are derived from one or more frequency bands of the one or more physiological signals;

predicting one or more health metrics by using the set of features with one or more machine learning models, wherein the one or more health metrics corresponds to measures indicating a health status of the subject;

determining an extent to which the one or more health metrics are deviated from a corresponding baseline value; and triggering one or more actions based on the determination, wherein the one or more actions include outputting the one or more health metrics, generating an alert signal to the subject or a caregiver, or adapting a vehicle control, wherein:

the given time interval corresponds to a scanning window that is used to segment the one or more physiological signals;

the set of features is associated with the one or more frequency bands of the one or more physiological signals for the given time interval;

the set of features includes one or more of Delta power, Gamma power, standard deviation, maximum amplitude, Gamma power/Delta power, time derivative of Delta, and time derivative of the Gamma power/Delta power; and the set of features further includes features that are derived using component analysis from a spectrogram or a normalized spectrogram of the one or more frequency bands of the one or more physiological signals for the given time interval.

9. The computer-implemented method of claim 8, wherein the one or more health metrics include a stress level, a cognitive impairment, a sleep disorder, or a neurodegenerative abnormality.

10. The computer-implemented method of claim 8, wherein adapting the vehicle control includes transitioning the vehicle to a self-driving mode or pulling over the vehicle to a side of a road.

11. The computer-implemented method of claim 8, wherein the one or more clusters of electrodes include electroencephalogram (EEG) electrodes, electromyography (EMG) electrodes, magnetoencephalography (MEG) electrodes, and/or electrooculogram (EOG) electrodes.

12. A computer-program product, tangibly embodied in a non-transitory machine-readable storage medium, including instructions configured to cause one or more data processors to perform a set of operations comprising:
accessing one or more physiological signals of a subject sitting in a vehicle, wherein the one or more physiological signals are collected by a physiological data acquisition assembly that comprises a sensing device and one or more clusters of electrodes, and wherein each cluster of the one or more clusters of electrodes comprises at least an active electrode;

computing a set of features by using the one or more physiological signals for a given time interval, wherein the set of features comprises values that are derived from one or more frequency bands of the one or more physiological signals;

predicting one or more health metrics by using the set of features with one or more machine learning models, wherein the one or more health metrics corresponds to measures indicating a health status of the subject;

determining an extent to which the one or more health metrics are deviated from a corresponding baseline value; and triggering one or more actions based on the determination, wherein the one or more actions include outputting the one or more health metrics, generating an alert signal to the subject or a caregiver, or adapting a vehicle control;

accessing other physiological data of the subject sitting in the vehicle, wherein the other physiological data was collected over a period of time by the physiological data acquisition assembly;

extracting, for each time interval of a plurality of time intervals within the period of time, a set of features based on a portion of the other physiological data;

predicting a state for each of the set of features corresponding to each time interval, wherein the state corresponds to any of one or more sleep stages or an awake state;

determining, based on predicting the state:
  a sleep pattern;
  a relative frequency of a particular state of the one or more sleep stages or the awake state; or
  a duration of the particular state of the one or more sleep stages or the awake state;

predicting a restedness level of the subject based on the sleep pattern, the relative frequency of the particular state, or the duration of the particular state of the one or more sleep stages or the awake state by using a restedness prediction model; and triggering, based on the restedness level, one or more other actions to adapt vehicle control, wherein the one or more other actions include control whether to allow the vehicle to move or not.

13. The computer-program product of claim 12, wherein the one or more other actions further include transitioning the vehicle to a self-driving mode, pulling over the vehicle to a side of a road, or setting a limit on speed of the vehicle according to the restedness level.

14. The computer-program product of claim 12, wherein the other physiological data corresponds to physiological signals that were collected across a 24-hour period prior to driving the vehicle or a previous night-time period.

15. The computer-program product of claim 12, wherein the one or more sleep stages include a rapid eye movement (REM) stage and one or more non-REM stages.

16. The computer-program product of claim 12, wherein the other physiological data of the subject comprises a single-channel EEG data.

17. The computer-program product of claim 12, wherein:
the set of features are associated with the one or more frequency bands of physiological signals and includes one or more of Delta power, Gamma power, standard deviation, maximum amplitude, Gamma power/Delta power, time derivative of Delta, and time derivative of the Gamma power/Delta power; and
the set of features further includes features that are derived using component analysis from a spectrogram or a normalized spectrogram of the one or more frequency bands of the physiological signals for each time interval.

18. The computer-program product of claim 12, wherein:
the set of features includes a spectral fragmentation metric or a temporal fragmentation metric.

19. The computer-program product of claim 12, wherein the physiological data acquisition assembly is worn by the subject as a sensing patch.

20. A computer-program product tangibly embodied in a non-transitory machine-readable storage medium, including instructions configured to cause one or more data processors to perform a set of operations comprising:
accessing one or more physiological signals of a subject sitting in a vehicle, wherein the one or more physiological signals are collected by a physiological data acquisition assembly that comprises a sensing device and one or more clusters of electrodes, and wherein each cluster of the one or more clusters of electrodes comprises at least an active electrode;

computing a set of features by using the one or more physiological signals for a given time interval, wherein the set of features comprises values that are derived from one or more frequency bands of the one or more physiological signals;

predicting one or more health metrics by using the set of features with one or more machine learning models, wherein the one or more health metrics corresponds to measures indicating a health status of the subject;

determining an extent to which the one or more health metrics are deviated from a corresponding baseline value; and triggering one or more actions based on the determination, wherein the one or more actions include outputting the one or more health metrics, generating an alert signal to the subject or a caregiver, or adapting a vehicle control;

accessing, in real-time, one or more other physiological signals of the subject or of another subject sitting in a mobility-aid device, a pod, or a vehicle, wherein the one or more other physiological signals are collected by the physiological data acquisition assembly or by another physiological data acquisition assembly that comprises another sensing device and one or more other clusters of electrodes, and wherein each cluster of the one or more other clusters of electrodes comprises at least a corresponding active electrode;

computing another set of features by using the one or more other physiological signals for a given time interval;

determining, in real-time, a biometric pattern based on the other set of features or based on the one or more other physiological signals for the given time interval;

generating one or more instructions based on the biometric pattern to control one or more of the pod, the mobility-aid device, or the vehicle, wherein the one or more instructions include a driving instruction, a movement instruction, or a latching instruction; and executing the one or more instructions to control behavior of the pod, the mobility-aid device, or the vehicle by controlling one or more motors or actuators.

21. The computer-program product of claim 20, wherein:
the pod is configured to transport the subject, or to transport the subject or the other subject inside the vehicle with the mobility-aid device;
the vehicle is configured to receive, engage, and secure the mobility-aid device or the pod substantially close to a driver position; and
the vehicle, the pod, and the mobility-aid device are in communication with each other and with a user device via a short-range connection.

22. The computer-program product of claim 20, wherein the vehicle includes one or more latching elements configured to secure a connection with the pod or the mobility-aid device in response to executing the latching instruction.

23. The computer-program product of claim 20, wherein generating the one or more instructions includes selecting one or more predefined instructions from a list or a table according to the biometric pattern.

24. The computer-program product of claim 20, wherein:
the given time interval corresponds to a scanning window that is used to segment the one or more other physiological signals;

the set of features is associated with the one or more frequency bands of the one or more other physiological signals for the given time interval;

the set of features includes one or more of Delta power, Gamma power, standard deviation, maximum amplitude, Gamma power/Delta power, time derivative of Delta, and time derivative of the Gamma power/Delta power; and the set of other features further includes features that are derived using component analysis from a spectrogram or a normalized spectrogram of the one or more frequency bands of the one or more other physiological signals for the given time interval.

25. The computer-program product of claim 20, wherein the biometric pattern comprises neural signatures corresponding to each of intended movements of the vehicle, the pod, or the mobility-aid device.

26. The computer-program product of claim 20, wherein the biometric pattern comprises neural signatures corresponding to intended movements of a left hand, a right hand, a left foot, or a right foot.

27. The computer-program product of claim 20, wherein the biometric pattern comprises ocular signatures corresponding to eye movements or blinks including a left eye blink, a right eye blink, or a double blink.

28. The computer-program product of claim 20, wherein the biometric pattern comprises muscular signatures including an upper jaw movement, or a lower jaw movement.

* * * * *